(12) United States Patent
Kawasaki et al.

(10) Patent No.: US 11,405,492 B2
(45) Date of Patent: Aug. 2, 2022

(54) TERMINAL DEVICE, TWAG, EPDG, AND PGW

(71) Applicant: SHARP KABUSHIKI KAISHA, Sakai (JP)

(72) Inventors: Yudai Kawasaki, Sakai (JP); Yoko Kuge, Sakai (JP); Masafumi Aramoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 191 days.

(21) Appl. No.: 15/565,101

(22) PCT Filed: Apr. 6, 2016

(86) PCT No.: PCT/JP2016/061288
§ 371 (c)(1),
(2) Date: Oct. 6, 2017

(87) PCT Pub. No.: WO2016/163410
PCT Pub. Date: Oct. 13, 2016

(65) Prior Publication Data
US 2018/0124862 A1    May 3, 2018

(30) Foreign Application Priority Data

Apr. 7, 2015  (JP) .............................. JP2015-078102

(51) Int. Cl.
| | |
|---|---|
| *H04L 69/24* | (2022.01) |
| *H04W 76/10* | (2018.01) |
| *H04W 88/06* | (2009.01) |
| *H04W 8/24* | (2009.01) |
| *H04W 4/00* | (2018.01) |
| *H04W 40/24* | (2009.01) |
| *H04W 76/22* | (2018.01) |
| *H04W 76/16* | (2018.01) |
| *H04W 12/06* | (2021.01) |

(Continued)

(52) U.S. Cl.
CPC .............. *H04L 69/24* (2013.01); *H04W 4/00* (2013.01); *H04W 8/24* (2013.01); *H04W 12/06* (2013.01); *H04W 40/246* (2013.01); *H04W 40/34* (2013.01); *H04W 76/10* (2018.02); *H04W 76/16* (2018.02); *H04W 76/22* (2018.02); *H04W 88/06* (2013.01); *H04W 28/08* (2013.01);

(Continued)

(58) Field of Classification Search
CPC ......... H04W 4/00; H04W 8/24; H04W 88/06; H04W 76/22; H04W 76/16; H04W 76/18; H04W 76/15; H04W 76/10; H04W 12/06; H04W 40/34; H04W 28/08; H04W 80/00; H04W 84/12; H04W 40/246; H04L 69/24
See application file for complete search history.

(56) References Cited

U.S. PATENT DOCUMENTS

2017/0026824 A1*  1/2017  Kim .................... H04W 64/00

OTHER PUBLICATIONS

3GPP TR 23,861, v1.14.1, Mar. 2015.*

(Continued)

*Primary Examiner* — Jianye Wu
(74) *Attorney, Agent, or Firm* — Birch, Stewart, Kolasch & Birch, LLP

(57) ABSTRACT

Provided is communication control accompanied with establishment of a multi-access PDN connection or with rejection of establishment of a multi-access PDN connection, on the basis of a response to a PDN connectivity establishment request from a terminal device. This provides a method of communication control and the like accompanied with a multi-access PDN connectivity establishment request from the terminal device.

11 Claims, 18 Drawing Sheets

(51) Int. Cl.
  *H04W 40/34* (2009.01)
  *H04W 76/15* (2018.01)
  *H04W 84/12* (2009.01)
  *H04W 76/18* (2018.01)
  *H04W 28/08* (2009.01)
  *H04W 80/00* (2009.01)
(52) U.S. Cl.
  CPC ............ *H04W 76/15* (2018.02); *H04W 76/18* (2018.02); *H04W 80/00* (2013.01); *H04W 84/12* (2013.01)

(56) References Cited

OTHER PUBLICATIONS

International Preliminary Report on Patentability and English translation of the Written Opinion of the International Searching Authority (PCT/IB/338, PCT/IB/373 and PCT/ISA/237) for International Application No. PCT/JP2016/061288, dated Oct. 19, 2017.
3GPP TR 23.861 V1.14.1 (Mar. 2015), 3rd Generation Partnership Project; Technical Specification Group Services and System Aspects; Network based IP flow mobility (Release 13), total of 23 pages.
3GPP TS 23.402 V13.1.0 (Mar. 2015), 3rd Generation Partnership Project; Technical Specification Group Services and System Aspects; Architecture enhancements for non-3GPP accesses (Release 13), total of 5 pages.
3GPP TSG SA WG2 Meeting #104, TD S2-142606, "Solution for NBIFOM", Dublin, Ireland, Jul. 7-Jul. 11, 2014, pp. 1-3.
3GPP SA WG2 Meeting #107, "IP flow mobility using the IFMP protocol", Jan. 26-30, 2015, Sorrento, Italy (10 pages).
SA WG2 Meeting #105, UE-Initiated NBIFOM solution for S2b with explicit signalling, Oct. 13-17, 2014, Sapporo, Japan (10 pages).

* cited by examiner

FIG. 4A

| TWAG ID | NBIFOM capability |
|---|---|

FIG. 4B

| PGW ID 1 | NBIFOM capability |
|---|---|
| PGW ID 2 | NBIFOM capability |

FIG. 4C

| UE NBIFOM capability |
|---|
| NBIFOM allowed |

FIG. 4D

| PDN connection ID |
|---|
| Network allowed mode |
| Operation mode |
| User Plane Connection ID |
| TWAG MAC address |
| NBIFOM permission |

FIG. 4E

| Transfer path identification information |
|---|
| Routing rule |

FIG. 6A

| IMSI |
|---|
| MSISDN |
| IMEI / IMEISV |
| Access Restriction |
| UE NBIFOM capability |

FIG. 6B

| Context ID |
|---|
| PDN Address |
| PDN Type |
| Access Point Name (APN) |
| WLAN offload ability |
| PDN GW ID |
| NBIFOM permission |

FIG. 8A

| IMSI |
|---|
| EMM State |
| GUTI |
| ME Identity |
| UE NBIFOM capability |

FIG. 8B

| PDN connection id |
|---|
| APN in Use |
| IP Address |
| Default Bearer |
| WLAN offload ability |
| UE allowed mode |
| Operation mode |

FIG. 8C

| Transfer path identification information |
|---|
| routing rule |

FIG. 8D

| TWAG ID | NBIFOM capability |
|---|---|

FIG. 8E

| PGW ID 1 | NBIFOM capability |
|---|---|
| PGW ID 2 | NBIFOM capability |

FIG. 10A

| IMSI |
|---|
| ME Identity |
| MSISDN |
| UE NBIFOM capability |

FIG. 10B

| IP Address |
|---|
| PDN type |
| APN |
| Network allowed mode |
| Operation mode |

FIG. 10C

| Transfer path identification information |
|---|
| routing rule |

FIG. 10D

| TWAG ID | NBIFOM capability |
|---|---|

FIG. 10E

| PGW ID 1 | NBIFOM capability |
|---|---|
| PGW ID 2 | NBIFOM capability |

FIG. 12A

| Subscriber ID |
|---|
| UE NBIFOM capability |

FIG. 12B

| APN |
|---|
| Operation mode |
| Network Policy |
| Charging rule |
| PCC rule |
| QoS rule |

FIG. 12C

| routing rule |
|---|

FIG. 12D

| TWAG ID | NBIFOM capability |
|---|---|

FIG. 12E

| PGW ID 1 | NBIFOM capability |
|---|---|
| PGW ID 2 | NBIFOM capability |

TERMINAL DEVICE, TWAG, EPDG, AND PGW

TECHNICAL FIELD

The present invention relates to a terminal device and the like.

BACKGROUND ART

The 3rd Generation Partnership Project (3GPP), which undertakes activities for standardizing recent mobile communication systems, is in the process of creating specifications for the Evolved Packet System (EPS), which realizes an all-IP architecture (see NPL 1). The EPS is a mobile communication system through which mobile operators and the like provide mobile telephone services, and is structured including a core network called the Evolved Packet Core (EPC), an access network based on the radio communication standard called the Long Term Evolution (LTE), and the like.

Furthermore, in the process of creating specifications for the EPS by the 3GPP, the Network-based IP Flow Mobility (NBIFOM) has been discussed (see NPL 1). The NBIFOM is a technical item that allows one device to simultaneously utilize a 3GPP interface and an interface other than the 3GPP interface (for example, WLAN).

In the related art, one PDN connection accommodates a communication path, a bearer, or a transfer path through either a 3GPP access network (for example, LTE access network) or a non-3GPP access network (for example, WLAN access network).

With the NBIFOM, a state can be maintained in which one PDN connection simultaneously accommodates a bearer, a communication path, or a transfer path through the 3GPP access network and a bearer, a communication path, or a transfer path through the non-3GPP access network. Such a PDN connection is defined as a multi-access PDN connection.

It has also been discussed for the NBIFOM to stipulate an operation mode indicating an endpoint node that is capable of initiating switching of a communication path. Specifically, it has been discussed for the NBIFOM to classify an operation mode into a UE-initiated mode and a Network-initiated mode.

A terminal device and each device included in a core network and an access network are capable of transmitting/receiving data on a communication path through an appropriate access network for each application by using an NBIFOM function.

Furthermore, an endpoint node configured to initiate switching a flow of the multi-access PDN connection established by using the NBIFOM function can be configured on the basis of the operation mode.

CITATION LIST

Non Patent Literature

NPL 1: 3GPP TR 23.861 Technical Specification Group Services and System Aspects, Network-based IP Flow Mobility (Release 13)

SUMMARY OF INVENTION

Technical Problem

For the NBIFOM, a detailed procedure for establishing a multi-access PDN connection has not been stipulated. Specifically, details of successful procedure and failure procedure in the multi-access PDN connectivity establishment procedure have not been stipulated.

More specifically, details of accept means and reject procedure from a network for a request of establishing the multi-access PDN connection in which a terminal device supports an NBIFOM function, have not been clarified.

In light of the foregoing, an object of the present invention is to provide a suitable way of implementing a communication control procedure in response to a PDN connectivity establishment request from a terminal device.

Solution to Problem

To address the above issues, a terminal device of the present invention includes a WLAN interface unit configured to transmit a Packet Data Network (PDN) connectivity request message to a Trusted WLAN Access Gateway (TWAG) and receive a PDN connectivity accept message from the TWAG, in order to establish a PDN connection. The PDN connectivity request message includes first information indicating a Network-based IP Flow Mobility (NBIFOM) mode to be requested (for example, fifth identification information), and the PDN connectivity accept message is a response message to the PDN connectivity request message and includes second information indicating an NBIFOM mode (for example, seventh identification information).

A Trusted WLAN Access Gateway (TWAG) of the present invention includes an IP mobile communication network interface unit configured to receive a Packet Data Network (PDN) connectivity request message from a terminal device and transmit a PDN connectivity accept message to the terminal device. The PDN connectivity request message includes first information indicating a Network-based IP Flow Mobility (NBIFOM) mode to be requested (for example, fifth identification information), and the PDN connectivity accept message is a response message to the PDN connectivity request message and includes second information indicating an NBIFOM mode (for example, seventh identification information).

A terminal device of the present invention includes a WLAN interface unit configured to transmit an authentication request message to an enhanced Packet Data Gateway (ePDG) and receive an authentication response message from the ePDG, in order to establish a Packet Data Network (PDN) connection. The authentication request message includes first information indicating a Network-based IP Flow Mobility (NBIFOM) mode to be requested (for example, fifth identification information), and the authentication response message is a message to be received after transmission of the authentication request message and includes second information indicating an NBIFOM mode (for example, seventh identification information).

An enhanced Packet Data Gateway (ePDG) of the present invention includes an IP mobile communication network interface unit configured to receive an authentication request message from a terminal device and transmit an authentication response message to the terminal device. The authentication request message includes first information indicating a Network-based IP Flow Mobility (NBIFOM) mode to be requested (for example, fifth identification information), and the authentication response message is a message to be transmitted after reception of the authentication request message and includes second information indicating an NBIFOM mode (for example, seventh identification information).

A PDN Gateway (PGW) of the present invention includes an IP mobile communication network interface unit configured to receive a create session request message from a Trusted WLAN Access Gateway (TWAG) or an enhanced Packet Data Gateway (ePDG) and transmit a create session response message to a transmission source of the create session request message. The create session request message includes first information indicating a Network-based IP Flow Mobility (NBIFOM) mode (for example, fifth identification information), and the create session response message is a response message to the create session request message and includes second information indicating an NBIFOM mode (for example, seventh identification information).

Advantageous Effects of Invention

The present invention enables a communication control procedure accompanied with a multi-access PDN connectivity establishment request from a terminal device to be implemented.

Specifically, according to the present invention, a successful procedure in establishing a multi-access PDN connection and/or a failure procedure in establishing the multi-access PDN connection can be supported.

BRIEF DESCRIPTION OF DRAWINGS

FIGS. 2A and 2B are diagrams illustrating a configuration of an IP mobile communication network, and the like.

FIGS. 4A to 4E are diagrams illustrating a configuration of a storage of the TWAG.

FIGS. 6A and 6B are diagrams illustrating a configuration of a storage of the HSS.

FIGS. 8A to 8E are diagrams illustrating a configuration of a storage of the UE.

FIGS. 10A to 10E are diagrams illustrating a configuration of a storage of the PGW.

FIGS. 12A to 12E are diagrams illustrating a configuration of a storage of the PCRF.

DESCRIPTION OF EMBODIMENTS

1. First Embodiment

Hereinafter, a radio communication technology according to an embodiment of the present invention will be described in detail with reference to the drawings.

1.1. System Overview

Figure 1:
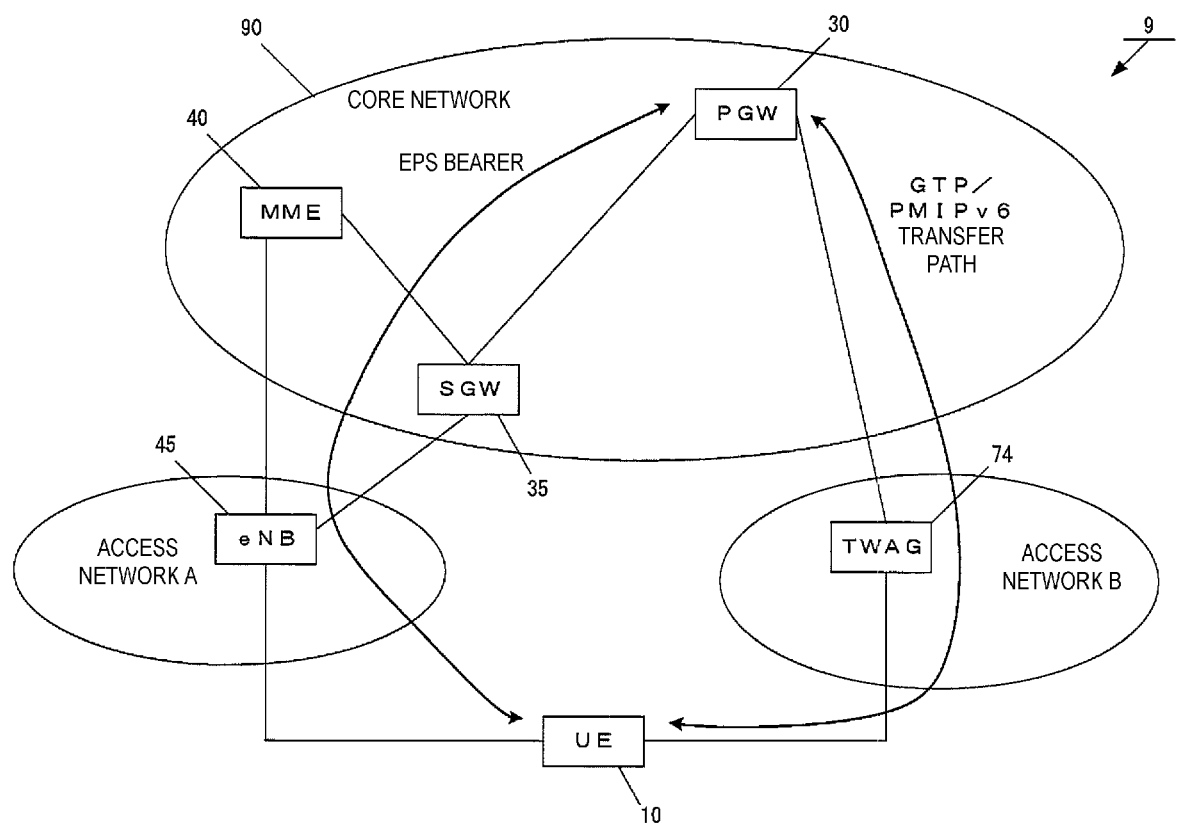
FIG. 1 is a diagram illustrating an overview of a mobile communication system.

FIG. 1 is a diagram illustrating an overview of a mobile communication system according to the present embodiment. As illustrated in FIG. 1, a mobile communication system 9 is constituted of a mobile terminal device UE 10, an LTE base station eNB 45 included in an access network A, a Trusted WLAN Access Gateway (gateway TWAG) 74 included in an access network B, a Mobility Management Entity (MME) 40 included in a core network 90, a Serving Gateway (SGW) 35, and a PDN Gateway (PGW) 30.

Here, the UE 10 may be any mobile terminal device, and may be a User Equipment (UE), a Mobile Equipment (ME), or a Mobile Station (MS).

Furthermore, the access network A may be an LTE access network, and the eNB 45 included in the access network A may be an LTE radio base station. Note that the access network A may include multiple radio base stations.

Furthermore, the access network B may be a WLAN access network. The TWAG 74 may be a gateway that connects to the PGW 30 in the core network 90 to connect the core network 90 and the WLAN access network.

In the present embodiment, the UE 10 can establish a PDN connection using an EPS bearer through the access network A.

Furthermore, the UE 10 can establish a PDN connection by using a GTP/PMIPv6 transfer path between the PGW 30 and the UE 10. Note that the transfer path may be a bearer.

Here, the core network 90 refers to an IP mobile communication network run by a mobile operator.

For example, the core network 90 may be a core network 90 for the mobile operator that runs and manages the mobile communication system 9, or may be a core network 90 for a virtual mobile operator such as a Mobile Virtual Network Operator (MVNO).

The MME 40 is a control device configured to perform, through the access network A, location management and access control of the UE 10. Details of the MME 40 will be described later.

Furthermore, the SGW 35 is a gateway device between the core network 90 and the access network A, and is configured to transfer user data between the UE 10 and the PGW 30.

The PGW 30 is a gateway device of a packet data service network (Packet Data Network (PDN)) that provides a communication service to the UE 10.

In the present embodiment, the UE 10 can establish a first PDN connection and/or a second PDN connection.

Furthermore, in the present embodiment, the NBIFOM is a technology that allows establishment of a multi-access PDN connection.

Furthermore, in the present embodiment, the multi-access PDN connection refers to a PDN connection capable of accommodating, in one PDN connection, a transfer path and/or a bearer over 3GPP access and/or WLAN access. In other words, the multi-access PDN connection can accommodate both a transfer path through the 3GPP access and a transfer path through the WLAN access. Note that the multi-access PDN connection may be a PDN connection accommodating only a bearer through the 3GPP access or may be a PDN connection accommodating only a transfer path through the WLAN access. In other words, the multi-access PDN connection refers to a PDN connection capable of constituting one or multiple transfer paths.

In the present embodiment, to clearly distinguish from a PDN connection established on the basis of an IP Flow Mobility (IFOM), a PDN connection in which a transfer path of a certain flow can be selected on the basis of the NBIFOM is defined as "multi-access PDN connection."

Note that the IFOM is a technology for switching a communication path of a certain IP flow by using a Dual Stack Mobile IPv6 (DSMIPv6) protocol, and in the present embodiment, a PDN connection capable of switching, on the basis of the IFOM, a communication path of a certain IP flow is described as a PDN connection for the IFOM.

Furthermore, the first PDN connection may be the above-described multi-access PDN connection.

In detail, the first PDN connection is a PDN connection in which, as one PDN connection, a communication path EPS bearer through the access network A and a communication path constituted of a GTP/PMIPv6 tunnel through the access network B can be used. That is, this PDN connection can transmit/receive data through the 3GPP access, the WLAN access, or both thereof. The first PDN connection may be the multi-access PDN connection.

Furthermore, the second PDN connection may be the PDN connection of the related art, rather than the multi-access PDN connection. Note that the second PDN connection may be a single-access PDN connection.

Here, the single-access PDN connection refers to one PDN connection constituted of only a transfer path through either the 3GPP access or the WLAN access, unlike the multi-access PDN connection. In detail, the single-access PDN connection refers to a PDN connection established by the attach of the related art.

That is, the second PDN connection is a PDN connection constituted of the EPS bearer through the access network A or a PDN connection constituted of the GTP/PMIPv6 transfer path through the access network B. The second PDN connection accommodates a transfer path and/or a communication path through either one of the access networks.

As described above, the single-access PDN connection refers to a PDN connection that is different from the multi-access PDN connection and the PDN connection for the IFOM. Moreover, the single-access PDN connection refers to a PDN connection that is also different from a PDN connection for a Local IP Access (LIPA). Here, the LIPA refers to communication control for performing offload to a home network. More specifically, the base station to which the terminal device connects performs the offload by transmitting, to a home network to which the base station connects, user data that is conventionally delivered via the core network 90. The PDN connection for LIPA refers to a PDN connection for such communication based on the LIPA.

Figure 2A:
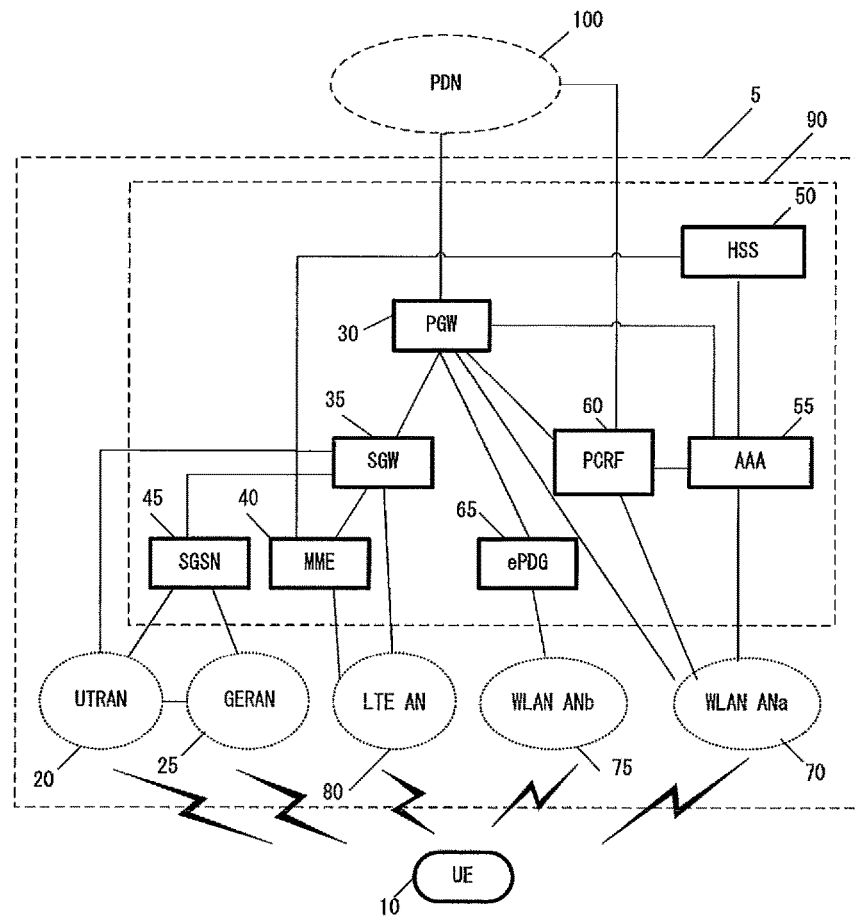

Next, an example of a configuration of the core network 90 will be described. FIG. 2A illustrates an example of a configuration of the IP mobile communication network. As illustrated in FIG. 2A, the core network 90 is constituted of a Home Subscriber Server (HSS) 50, an Authentication, Authorization, Accounting (AAA) 55, a Policy and Charging Rules Function (PCRF) 60, the PGW 30, an enhanced Packet Data Gateway (ePDG) 65, the SGW 35, the MME 40, and a Serving GPRS Support Node (SGSN) 45.

Furthermore, the core network 90 is capable of connecting to multiple radio access networks (an LTE AN 80, a WLAN ANb 75, a WLAN ANa 70, a UTRAN 20, and a GERAN 25).

Such a radio access network may be constituted of multiple different access networks, or may be constituted of either one of the access networks. Moreover, the UE 10 can wirelessly connect to the radio access network.

Moreover, a WLAN access network b (WLAN ANb 75) that connects to the core network 90 via the ePDG 65 and a WLAN access network a (WLAN ANa 75) that connects to the PGW 30, the PCRF 60, and the AAA 55 can be configured as access networks connectable in a WLAN access system.

Note that each device has a similar configuration to those of the devices of the related art a mobile communication system using EPS, and thus detailed descriptions thereof will be omitted. Each device will be described briefly hereinafter.

The PGW 30 is connected to a PDN 100, the SGW 35, the ePDG 65, the WLAN ANa 70, the PCRF 60, and the AAA 55 and is a relay device configured to transfer user data by functioning as a gateway device between the PDN 100 and the core network 90.

The SGW 35 is connected to the PGW 30, the MME 40, the LTE AN 80, the SGSN 45, and the UTRAN 20 and is a relay device configured to transfer user data by functioning as a gateway device between the core network 90 and the 3GPP access network (the UTRAN 20, the GERAN 25, and the LTE AN 80).

The MME 40 is connected to the SGW 35, the LTE AN 80, and the HSS 50 and is an access control device configured to perform location information management and access control for the UE 10 via the LTE AN 80. Furthermore, the core network 90 may include multiple location management devices. For example, a location management device different from the MME 40 may be constituted. The location management device different from the MME 40 may be connected to the SGW 35, the LTE AN 80, and the HSS 50, as with the MME 40.

Furthermore, when multiple MMEs 40 are included in the core network 90, the MMEs 40 may be connected to each other. With this configuration, the context of the UE 10 may be transmitted/received among the MMEs 40.

The HSS 50 is connected to the MME 40 and the AAA 55 and is a managing node configured to manage subscriber information. The subscriber information of the HSS 50 is referenced during access control for the MME 40, for example. Moreover, the HSS 50 may be connected to the location management device different from the MME 40.

The AAA 55 is connected to the PGW 30, the HSS 50, the PCRF 60, and the WLAN ANa 70 and is configured to perform access control for the UE 10 connected via the WLAN ANa 70.

The PCRF 60 is connected to the PGW 30, the WLAN ANa 75, the AAA 55, and the PDN 100 and is configured to perform QoS management on data delivery. For example, the PCRF 60 manages QoS of a communication path between the UE 10 and the PDN 100.

The ePDG 65 is connected to the PGW 30 and the WLAN ANb 75 and is configured to deliver user data by functioning as a gateway device between the core network 90 and the WLAN ANb 75.

The SGSN 45 is connected to the UTRAN 20, the GERAN 25, and the SGW 35 and is a control device for location management between a 3G/2G access network (UTRAN/GERAN) and the LTE access network (E-UTRAN). In addition, the SGSN 45 has functions of: selecting the PGW 30 and the SGW 35; managing a time zone of the UE 10; and selecting the MME 40 at the time of handover to the E-UTRAN.

Figure 2B:
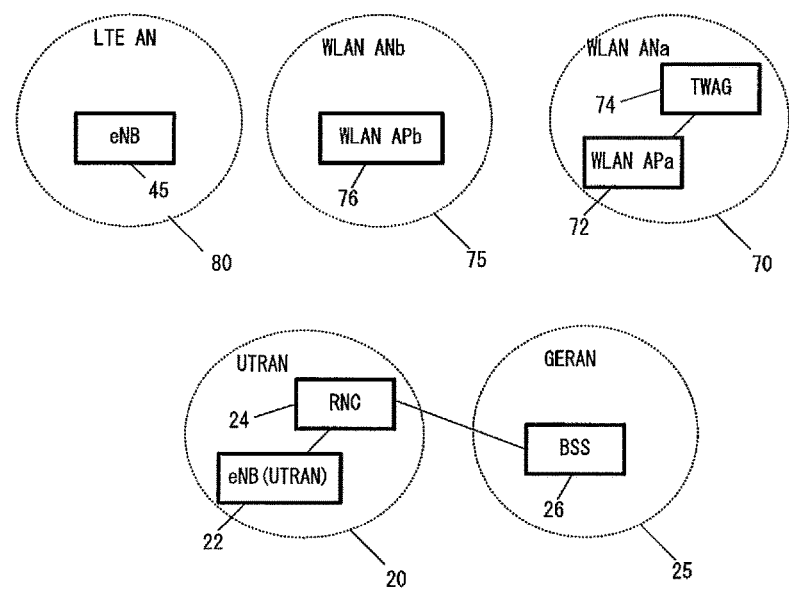

Also, as illustrated in FIG. 2B, each radio access network includes devices to which the UE 10 is actually connected (for example, a base station device and an access point device), and the like. The devices used in these connections are assumed to adapt to the radio access networks.

In the present embodiment, the LTE AN 80 includes the eNB 45. The eNB 45 is a radio base station to which the UE 10 connects in an LTE access system, and the LTE AN 80 may include one or multiple radio base stations.

The WLAN ANa 70 includes a WLAN APa 72 and the TWAG 74. The WLAN APa 72 is a radio base station to which the UE 10 connects in a WLAN access system trusted by the operator running the core network 90, and the WLAN ANa 70 may include one or multiple radio base stations. The GW 74 is a gateway device between the core network 90 and the WLAN ANa 70. Furthermore, the WLAN APa 72 and the GW 74 may be constituted as a single device.

Even in a case where the operator running the core network 90 and the operator running the WLAN ANa 70 are different, such a configuration can be implemented through contracts and agreements between the operators.

Furthermore, the WLAN ANb 75 includes a WLAN APb 76. The WLAN APb 76 is a radio base station to which the UE 10 connects in the WLAN access system in a case where no trusting relationship is established with the operator running the core network 90, and the WLAN ANb 75 may include one or multiple radio base stations.

In this manner, the WLAN ANb 75 is connected to the core network 90 via the ePDG 65, which is a device included in the core network 90, serving as a gateway. The ePDG 65 has a security function for ensuring the security of communication.

The UTRAN 20 includes a Radio Network Controller (RNC) 24 and an eNB (UTRAN) 22. The eNB (UTRAN) 22 is a radio base station to which the UE 10 connects through a UMTS Terrestrial Radio Access (UTRA), and the UTRAN 20 may include one or multiple radio base stations. Furthermore, the RNC 24 is a control unit configured to connect the core network 90 and the eNB (UTRAN) 22, and the UTRAN 20 may include one or multiple RNCs. Moreover, the RNC 24 may be connected to one or multiple eNBs (UTRANs) 22. In addition, the RNC 24 may be connected to a radio base station (Base Station Subsystem (BSS) 26) included in the GERAN 25.

The GERAN 25 includes the BSS 26. The BSS 26 is a radio base station to which the UE 10 connects through GSM/EDGE Radio Access (GERA), and the GERAN 25 may be constituted of one or multiple radio base station BSSs. Furthermore, the multiple BSSs may be connected to each other. Moreover, the BSS 26 may be connected to the RNC 24.

Note that, herein, the UE 10 being connected to radio access networks refers to the UE 10 being connected to a base station device, an access point, or the like included in each of the radio access networks, and data, signals, and the like being transmitted/received also pass through those base station devices, access points, or the like.

1.2. Device Configuration

The configuration of each device will be described below.

1.2.1. TWAG Configuration

Figure 3:
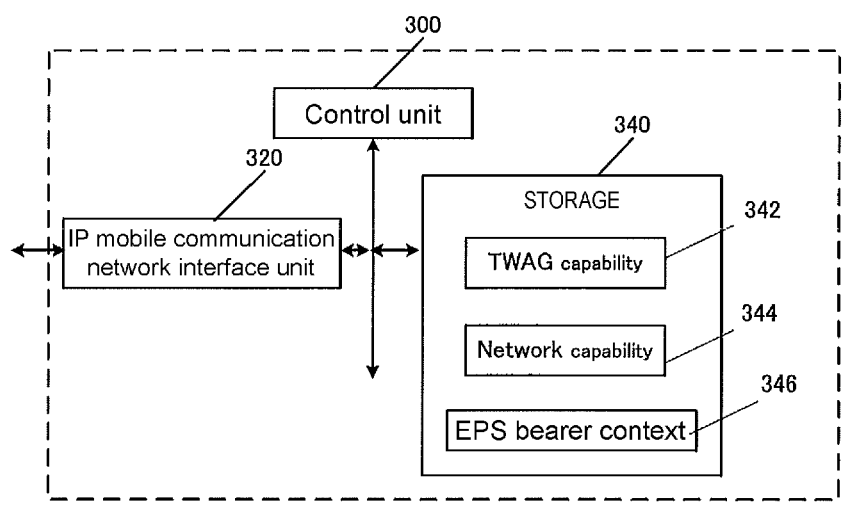
FIG. 3 is a diagram illustrating a functional configuration of a TWAG.

FIG. 3 illustrates a device configuration of the TWAG 74. As illustrated in FIG. 3, the TWAG 74 is constituted of an IP mobile communication network interface unit 320, a control unit 300, and a storage 340. The IP mobile communication network interface unit 320 and the storage 340 are connected to the control unit 300 via a bus.

The control unit 300 is a function unit for controlling the TWAG 74. The control unit 300 implements various processes by reading out and executing various programs stored in the storage 340.

The IP mobile communication network interface unit 320 is a function unit through which the TWAG 74 is connected to the PGW 30.

The storage 340 is a function unit for storing programs, data, and the like necessary for each operation of the TWAG 74. The storage 340 is constituted of, for example, a semiconductor memory, a Hard Disk Drive (HDD), or the like.

As illustrated in FIG. 3, the storage 340 stores a TWAG capability 342, a Network capability 344, and an EPS bearer context 346. Hereinafter, information elements stored in the storage 340 will be described.

FIGS. 4A to 4E illustrate the information elements stored in the storage 340. FIG. 4A illustrates an example of the TWAG capability stored by the TWAG 74. In the TWAG capability, identification information (NBIFOM capability) is stored for each TWAG 74, the information indicating whether or not capability of establishing the first PDN connection is supported. In other words, the identification information indicates whether or not the TWAG 74 supports an NBIFOM function. Specifically, the NBIFOM capability may include "allowed" or "Not allowed."

Note that the NBIFOM function may be information indicating the possession of the function of establishing the multi-access PDN connection.

Alternatively, the NBIFOM capability may be identification information indicating the possession of the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

As illustrated in FIG. 4A, the NBIFOM capability may be stored being associated with a TWAG ID that is the identification information on the TWAG 74. If not associated with the TWAG ID, the NBIFOM capability may mean capability of the TWAG 74 to be stored.

If the TWAG ID and the NBIFOM capability are stored being associated with each other, the TWAG 74 may store the TWAG capability of multiple TWAGs 74.

In this case, when the UE 10 performs a handover to another TWAG 74, the TWAG 74 may select a TWAG 74 to which the handover is made, on the basis of the TWAG capability.

Next, the Network capability 344 will be described. FIG. 4B illustrates an example of the Network capability stored by the TWAG 74. In the Network capability, the NBIFOM capability is stored for each network, i.e., for each PGW 30.

Here, the NBIFOM capability is identification information for each network indicating whether or not capability of establishing the first PDN connection is supported. In other words, the identification information indicates whether or not the PGW 30 supports the NBIFOM function. More specifically, for example, the NBIFOM capability may include "allowed" or "Not allowed."

Note that the NBIFOM function may be information indicating the possession of the function of establishing the multi-access PDN connection.

Alternatively, the NBIFOM capability may be identification information indicating the possession of the capability of establishing the first PDN connection. In other words, the NBIFOM capability may be identification information indicating that a gateway supports the NBIFOM function. That is, the existence of the NBIFOM capability in the storage may mean that the PGW 30 is a gateway having the function of establishing the first PDN connection. In other words, the existence of the NBIFOM capability in the storage may mean that the PGW 30 is a gateway supporting the NBIFOM function.

As illustrated in FIG. 4B, the TWAG 74 stores the NBIFOM capability associated with a PGW ID. Furthermore, as illustrated in FIG. 4B, the NBIFOM capability may be stored being associated with each of the multiple PGWs 30.

The PGW ID may be any information for identifying the PGW 30, and may be an Access Point Name (APN), for example.

Next, the EPS bearer context will be described. The EPS bearer context may be classified into an EPS bearer context for each UE 10 stored for each UE 10, an EPS bearer context for each PDN connection, and an EPS bearer context for each bearer and/or transfer path.

FIG. 4C illustrates information elements included in the EPS bearer context for each UE 10. As is obvious from FIG. 4C, the TWAG 74 stores, for each UE 10, a UE NBIFOM capability and an NBIFOM allowed.

The UE NBIFOM capability is the NBIFOM capability of the UE 10. The UE NBIFOM capability is identification information for each UE 10 indicating whether or not capability of establishing the first PDN connection is supported. In other words, the UE NBIFOM capability is identification information indicating whether or not the UE 10 supports the NBIFOM function. More specifically, for example, the UE NBIFOM capability may include "allowed" or "Not allowed."

Note that the NBIFOM function may be information indicating the possession of the function of establishing the multi-access PDN connection.

Alternatively, the UE NBIFOM capability may be identification information indicating that the UE 10 is capable of establishing the first PDN connection. That is, the existence of the UE NBIFOM capability may mean that the UE 10 has the function of establishing the first PDN connection.

In other words, the UE NBIFOM capability may be identification information indicating that the UE 10 supports the NBIFOM function. That is, the existence of the UE NBIFOM capability in the storage may mean that the UE 10 supports the NBIFOM function.

Furthermore, the NBIFOM allowed is identification information indicating an APN that is allowed to establish a PDN connection using the NBIFOM. The NBIFOM may be associated with at least the APN. The NBIFOM allowed may be associated with multiple APNs.

In the present embodiment, an APN 1 is associated with the NBIFOM allowed. That is, the APN 1 is allowed to establish the multi-access PDN connection. In other words, in the present embodiment, the UE 10 is allowed to establish the multi-access PDN connection by using the APN 1. Note that the APN 1 is also allowed to establish the PDN connection of the related art, rather than the multi-access PDN connection.

In addition, in the present embodiment, an APN 2 is not associated with the NBIFOM allowed. That is, in the present embodiment, the APN 2 is not allowed to establish the multi-access PDN connection. That is, in the present embodiment, the UE 10 cannot establish the multi-access PDN connection by using the APN 2.

The NBIFOM allowed may be stored before the PDN connection is established. The TWAG 74 may access the HSS 50 to acquire the NBIFOM allowed before the PDN connection is established and/or during the establishment procedure.

Furthermore, the EPS bearer context for each UE 10 may include identification information on the UE 10. The identification information on the UE 10 may be an IMSI.

Furthermore, FIG. 4D illustrates the EPS bearer context for each PDN connection. The EPS bearer context for each PDN connection includes a PDN connection ID, a Network allowed mode, an Operation mode, a User plane connection ID, a TWAG MAC address, and an NBIFOM Permission.

The PDN connection ID is identification information for identifying a PDN connection. The UE 10, the TWAG 74, and the PGW 30 may store the same identification information.

The Operation mode is identification information on a mode that indicates which of the UE 10 and the network takes an initiative in transmitting/receiving data or is allowed to initiate communication control when the PDN connection is the first PDN connection. More specifically, for example, an Operation mode that allows the UE 10 to initiate the communication control may be a UE initiated mode.

Furthermore, an Operation mode that allows the network and/or the PGW 30 and/or the PCRF 60 to initiate the communication control may be a Network initiated mode.

The Network allowed mode indicates an Operation mode allowed by the network. The Network allowed mode may include the UE initiated mode, the Network initiated mode, or both thereof.

The User plane connection ID is identification information for identifying a connection used for transmission of user data when the UE 10 establishes a transfer path via the TWAG 74. The TWAG MAC address is a physical address of the TWAG 74.

The NBIFOM permission is information indicating that this PDN connection has established the multi-access PDN connection. In other words, the NBIFOM permission indicates that the first PDN connection has established.

That is, the fact that the TWAG 74 has stored the NBIFOM permission means that this PDN connection is the first PDN connection.

The NBIFOM permission is identification information that is stored by the TWAG 74 upon the PDN connection being established.

The TWAG 74 may access the HSS 50 to acquire the NBIFOM permission during the establishment of the PDN connection. Alternatively, the TWAG 74 may store the NBIFOM Permission, on the basis of the fact that the multi-access PDN connection has been established.

Next, the EPS bearer context for each bearer and/or transfer path will be described. As illustrated in FIG. 4E, the EPS bearer context for each bearer and/or transfer path may include transfer path identification information and a Routing Rule.

The transfer path identification information is information for identifying a transfer path and/or bearer. The transfer path identification information may be an EPS bearer ID, for example.

The Routing Rule indicates an association of a Routing Filter and a Routing address or Routing access type. On the basis of this association, whether using a communication path through the 3GPP access network or using a communication path through the WLAN access network is determined.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the PGW 30 or the PCRF 60, or may be notified from the UE 10. Alternatively, the Routing rule may be a value that the TWAG 74 prestores as a default value.

The Routing Filter may include an IP header so that an IP flow can be switched. Alternatively, the Routing Filter may include an application ID so that the flow can be switched for each application. Alternatively, the Routing Filter may include the TFT.

The Routing Rule may store multiple rules. Furthermore, the Routing Rule may include priority for each rule.

The TWAG capability and the Network capability may be included in the EPS bearer context.

1.2.2. HSS Configuration

Figure 5:
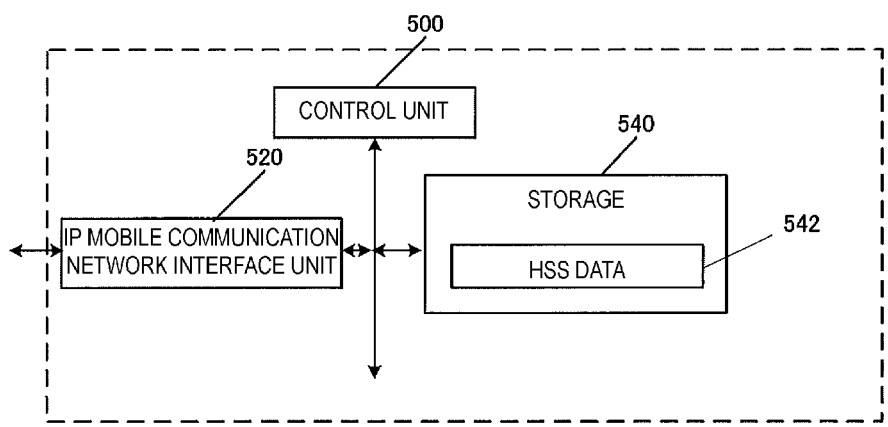
FIG. 5 is a diagram illustrating a functional configuration of an HSS.

Next, the configuration of the HSS 50 will be described. FIG. 5 illustrates a device configuration of the HSS 50. As illustrated in FIG. 5, the HSS 50 is constituted of an IP mobile communication network interface unit 520, a control unit 500, and a storage 540. The IP mobile communication network interface unit 520 and the storage 540 are connected to the control unit 500 via a bus.

The control unit 500 is a function unit for controlling the HSS 50. The control unit 500 implements various processes by reading out and executing various programs stored in the storage 540.

The IP mobile communication network interface unit 520 is a function unit through which the HSS 50 is connected to the MME 40 and/or another MME 40, and the AAA 55.

The storage 540 is a function unit for storing programs, data, and the like necessary for each operation of the HSS 50. The storage 540 is constituted of, for example, a semiconductor memory, a Hard Disk Drive (HDD), or the like.

As illustrated in FIG. 5, the storage 540 stores HSS data 542. Hereinafter, information elements stored in the storage 540 will be described.

FIGS. 6A and 6B illustrate the information elements stored in the storage 540. FIG. 6A illustrates an example of HSS data for each UE 10 stored by the HSS 50.

As illustrated in FIG. 6A, the HSS data for each UE 10 includes an IMSI, an MSISDN, an IMEI/IMEISV, an Access Restriction, a UE NBIFOM capability, and an NBIFOM allowed.

The IMSI is identification information assigned to a user (subscriber) using the UE 10.

The MSISDN represents the phone number of the UE 10. The IMEI/IMISV is identification information assigned to the UE 10. The Access Restriction indicates registration information for access restriction.

The UE NBIFOM capability indicates the NBIFOM capability of the UE 10. The UE NBIFOM capability is identification information for each UE 10 indicating whether or not capability of establishing the first PDN connection is supported. In other words, the UE NBIFOM capability indicates whether or not the UE 10 supports the NBIFOM function. More specifically, for example, the NBIFOM capability may include "allowed" or "Not allowed."

Alternatively, the UE NBIFOM capability may be identification information indicating that the UE 10 is capable of establishing the first PDN connection. That is, the existence of the UE NBIFOM capability may mean that the UE 10 has the function of establishing the first PDN connection.

Furthermore, the NBIFOM allowed is identification information indicating an APN that is allowed to establish a PDN connection using the NBIFOM. The NBIFOM may be associated with at least the APN. The NBIFOM allowed may be associated with multiple APNs.

In the present embodiment, the APN 1 is associated with the NBIFOM allowed. That is, the APN 1 is allowed to establish the multi-access PDN connection. In other words, in the present embodiment, the UE 10 is allowed to establish the multi-access PDN connection by using the APN 1. Note that the APN 1 is also allowed to establish the PDN connection of the related art, rather than the multi-access PDN connection.

In addition, in the present embodiment, the APN 2 is not associated with the NBIFOM allowed. That is, in the present embodiment, the APN 2 is not allowed to establish the multi-access PDN connection. That is, in the present embodiment, the UE 10 cannot establish the multi-access PDN connection by using the APN 2. The NBIFOM allowed may be stored before the PDN connection is established.

FIG. 6B illustrates an example of HSS data for each PDN connection stored by the HSS 50. As is obvious from FIG. 6B, the HSS data for each PDN connection includes at least a Context ID, a PDN Address, a PDN Type, an Access Point Name (APN), a WLAN offload ability, a PDN GW ID, and an NBIFOM Permission.

The Context ID is identification information on the context storing the HSS data for each PDN connection.

The PDN Address represents a registered IP address. The PDN Address is an IP address of the UE 10.

The PDN Type indicates the type of PDN Address. That is, the PDN Type is identification information for identifying IPv4, IPv6, or IPv4v6, for example. The APN is a label indicating an access destination in the network, in accordance with DNS naming convention.

The WLAN offload ability is identification information indicating whether traffic connected through this APN can perform offload to the WLAN by utilizing a cooperative function between the WLAN and the 3GPP, or maintains the 3GPP connection. The WLAN offload ability may vary for each RAT type. Specifically, the LTE (E-UTRA) and the 3G (UTRA) may have different WLAN offload ability.

The PDN GW identity is identification information for identifying the PGW 30 utilized in this APN. This identification information may be a Fully Qualified Domain Name (FQDN) or an IP address.

The NBIFOM permission is information indicating that this PDN connection has established the multi-access PDN connection. In other words, the NBIFOM permission indicates that the first PDN connection has been established.

That is, the fact that the TWAG 74 has stored the NBIFOM permission means that this PDN connection is the first PDN connection.

The NBIFOM permission is identification information that is stored by the TWAG 74 upon the PDN connection being established.

Specifically, for example, the HSS data for each PDN connection including the APN 1 may include the NBIFOM Permission, and the HSS data for each PDN connection including the APN 2 need not include the NBIFOM Permission.

In other words, the PDN connection based on the APN 1 may be the first PDN connection, and the PDN connection based on the APN 2 cannot be the first PDN connection.

1.2.3. UE Configuration

Figure 7:
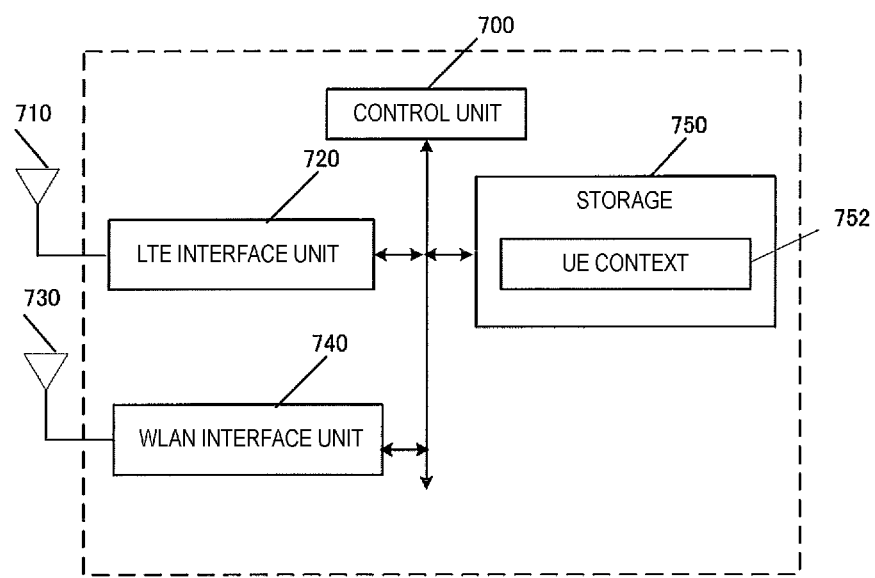
FIG. 7 is a diagram illustrating a functional configuration of a UE.

Next, the configuration of the UE 10 will be described. FIG. 7 illustrates a device configuration of the UE 10. As illustrated in FIG. 7, the UE 10 is constituted of an LTE interface unit 720, a WLAN interface unit 740, a control unit 700, and a storage 750.

The LTE interface unit 720, the WLAN interface unit 740, and the storage 750 are connected to the control unit 700 via a bus.

The control unit 700 is a function unit for controlling the UE 10. The control unit 700 implements various processes by reading out and executing various programs stored in the storage 750.

The LTE interface unit 720 is a function unit through which the UE 10 connects to an IP access network via an LTE base station. Furthermore, an external antenna 710 is connected to the LTE interface unit 720.

The WLAN interface unit 740 is a function unit through which the UE 10 connects to the IP access network via a WLAN AP. Furthermore, an external antenna 730 is connected to the WLAN interface unit 740.

The control unit 700 is a function unit for controlling the UE 10. The control unit 700 implements various processes by reading out and executing various programs stored in the storage 750.

The storage 740 is a function unit for storing programs, data, and the like necessary for each operation of the UE 10. The storage 750 is constituted of, for example, a semiconductor memory, a Hard Disk Drive (HDD), or the like.

As illustrated in FIG. 7, the storage 750 stores a UE context 752. Hereinafter, information elements stored in the storage 750 will be described. Note that the UE context 752 is classified into a UE context for each UE 10, a UE context for each PDN connection, and a UE context for each transfer path and/or bearer.

FIG. 8A is an example of the UE context stored for each UE 10. As illustrated in FIG. 8A, the UE context for each UE 10 includes an IMSI, an EMM State, a GUTI, an ME Identity, and a UE NBIFOM capability.

The IMSI is identification information to be assigned to a user (subscriber) using the UE 10.

The EMM State indicates a mobility management state of the UE 10. For example, the EMM State may be EMM-REGISTERED in which the UE 10 is registered with the network (registered state) or EMM-DEREGISTERD in which the UE 10 is not registered with the network (deregistered state).

The GUTI is an abbreviation of "Globally Unique Temporary Identity," and is temporary identification information on the UE 10. The GUTI is constituted of identification information on the MME 40 (Globally Unique MME Identifier (GUMMEI)) and identification information on the UE 10 in a specific MME 40 (M-TMSI).

The ME Identity is an ID of ME, and may be the IMEI/IMISV, for example.

The UE NBIFOM capability is the NBIFOM capability of the UE 10. The UE NBIFOM capability is identification information indicating whether or not capability of establishing the first PDN connection is supported for each UE 10. In other words, the UE NBIFOM capability is identification information indicating whether or not the NBIFOM function is supported for each UE 10. More specifically, for example, the NBIFOM capability may include "allowed" or "Not allowed."

Note that the NBIFOM function may be information indicating the possession of the function of establishing the multi-access PDN connection.

Alternatively, the UE NBIFOM capability may be identification information indicating that the UE 10 has capability of establishing the first PDN connection. That is, the existence of the UE NBIFOM capability in the storage of the UE 10 may mean that the UE 10 has the function of establishing the first PDN connection.

In other words, the UE NBIFOM capability may be identification information indicating that the UE 10 supports the NBIFOM function. That is, the existence of the UE NBIFOM capability in the storage of the UE 10 may mean that the UE 10 supports the NBIFOM function.

FIG. 8B illustrates an example of the UE context for each PDN connection. As illustrated in FIG. 8B, the UE context for each PDN connection includes at least a PDN connection ID, an APN in Use, an IP address, a Default Bearer, a WLAN offload ability, a UE allowed mode, and an Operation mode.

The PDN connection ID is identification information for identifying a PDN connection. The UE 10, the TWAG 74, and the PGW 30 may store the same identification information.

The APN in Use is an APN utilized by the UE 10 most recently. This APN may be constituted of identification information on the network and identification information on a default operator.

The IP Address is an IP address assigned to the UE 10 for the PDN connection, and may be an IPv4 address or an IPv6 prefix.

The Default Bearer is EPS bearer identification information for identifying a default bearer in this PDN connection.

The WLAN offloadability is WLAN offload permission information indicating whether or not to allow a communication associated with the PDN connection to perform offload to the WLAN by using an interworking function between the WLAN and the 3GPP, or whether or not to maintain the 3GPP access.

The UE allowed mode is an Operation mode allowed by the UE 10. This identification information may indicate the UE initiated mode, the Network initiated mode, or both thereof.

The Operation mode is identification information on a mode that indicates which of the UE 10 and the network takes an initiative in transmitting/receiving data or is allowed to initiate communication control when the PDN connection is the first PDN connection.

FIG. 8C illustrates the UE context for each bearer. The UE context for each bearer includes transfer path identification information and a Routing Rule.

The transfer path identification information is information for identifying a transfer path and/or bearer. The transfer path identification information may be an EPS bearer ID, for example.

Furthermore, the transfer path identification information may be associated with a TFT.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of the Mobile Access Gateway (MAG).

The Routing Rule may be notified from the PGW 30 or the PCRF 60. Alternatively, the Routing Rule may be a value that the UE 10 prestores as a default value.

The Routing Filter may include an IP header so that an IP flow can be switched. Alternatively, the Routing Filter may include an application ID so that the UE 10 can switch the flow for each application. Alternatively, the Routing Filter may include a TFT.

The Routing Rule may store multiple rules (regulations). Furthermore, the Routing Rule may include priority for each rule.

FIG. 8D illustrates the TWAG capability. The TWAG capability stores identification information (NBIFOM capability) indicating whether or not capability of establishing the first PDN connection is supported for each TWAG 74. In other words, the identification information indicates whether or not the TWAG 74 supports the NBIFOM function. Specifically, the NBIFOM capability may include "allowed" or "Not allowed."

Note that the NBIFOM function may be information indicating the possession of the function of establishing the multi-access PDN connection.

Alternatively, the NBIFOM capability may be identification information indicating the possession of the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

The UE 10 may store the NBIFOM capability associated with the TWAG ID. Furthermore, the NBIFOM capability of multiple TWAGs 74 may be stored.

FIG. 8E illustrates an example of the Network capability. In the Network capability, the NBIFOM capability is stored for each network, i.e., for each PGW 30.

Here, the NBIFOM capability is identification information indicating whether or not capability of establishing the first PDN connection is supported for each network. More specifically, for example, the NBIFOM capability may include "allowed" or "Not allowed."

Alternatively, the NBIFOM capability may be identification information indicating the possession of the capability of establishing the first PDN connection. That is, the existence of the NBIFOM capability may mean that the PGW 30 and/or the network is a gateway having the function of establishing the first PDN connection.

As illustrated in FIG. 8E, the TWAG 74 stores the NBIFOM capability associated with the PGW ID. Furthermore, as illustrated in FIG. 4B, the NBIFOM capability may be stored being associated with each of the multiple PGWs 30.

The PGW ID is information for identifying the PGW 30. The PGW ID may be an APN, for example.

The TWAG capability and the Network capability may be included in the UE context, or may be information separated from the UE context.

That is, the UE 10 may store the TWAG capability and the Network capability included in the UE context, or may store the TWAG capability and the Network capability separately from the UE context.

1.2.4. PGW Components

Figure 9:
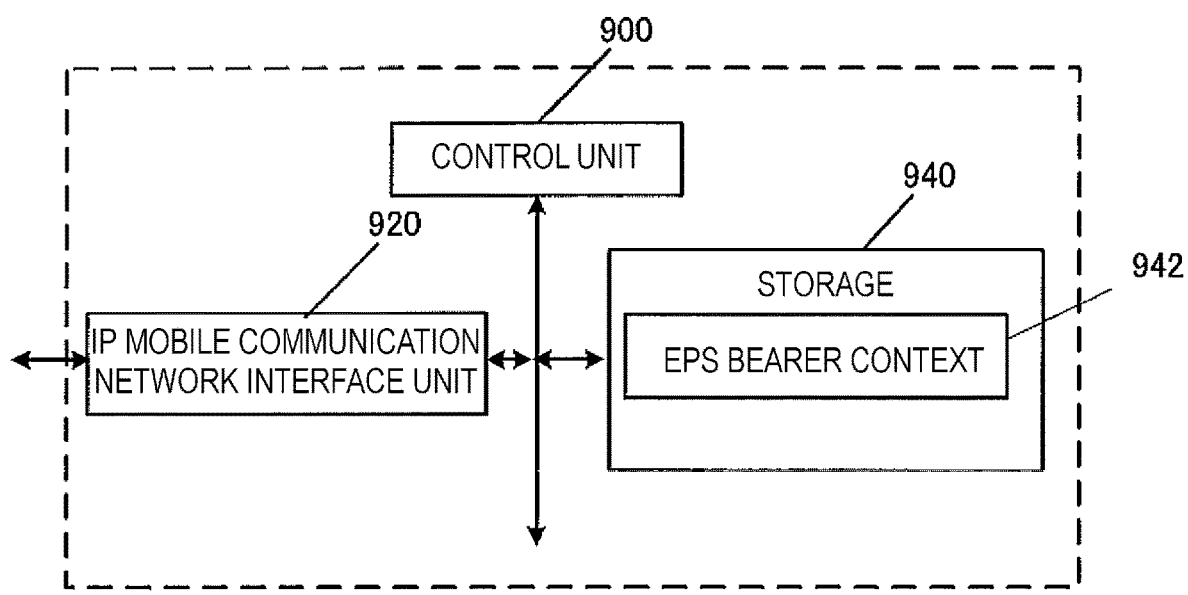
FIG. 9 is a diagram illustrating a functional configuration of a PGW.

Next, the components of the PGW 30 will be described. FIG. 9 illustrates a device configuration of the PGW 30. As illustrated in FIG. 9, the PGW 30 is constituted of an IP mobile communication network interface unit 920, a control unit 900, and a storage 940. The IP mobile communication network interface unit 920 and the storage 940 are connected to the control unit 900 via a bus.

The control unit 900 is a function unit for controlling the PGW 30. The control unit 900 implements various processes by reading out and executing various programs stored in the storage 940.

The IP mobile communication network interface unit 920 is a function unit through which the PGW 30 is connected to the SGW 35 and/or the PCRF 60 and/or the ePDG 65 and/or the AAA 55 and/or the GW 74.

The storage 940 is a function unit for storing programs, data, and the like necessary for each operation of the PGW 30. The storage 940 is constituted of, for example, a semiconductor memory, a Hard Disk Drive (HDD), or the like.

As illustrated in FIG. 9, the storage 940 stores an EPS bearer context 942. Note that the EPS bearer context includes an EPS bearer context stored for each UE 10, an EPS bearer context stored for each APN, an EPS bearer context stored for each PDN connection, and an EPS bearer context stored for each transfer path and/or bearer.

First, the EPS bearer context for each UE 10 will be described. FIG. 10A illustrates an example of the EPS bearer context for each UE 10. As illustrated in FIG. 10A, the EPS bearer context includes at least an IMSI, an ME identity, an MSISDN, and a UE NBIFOM capability.

The IMSI is information for identifying a user of the UE 10.

The ME identity is an ID of an ME, and may be an IMEI/IMISV, for example.

The MSISDN represents the phone number of the UE 10.

The UE NBIFOM capability is the NBIFOM capability of the UE 10. The UE NBIFOM capability is identification information indicating whether or not each UE 10 has capability of establishing the first PDN connection. More specifically, for example, the NBIFOM capability may include "allowed" or "Not allowed."

Alternatively, the UE NBIFOM capability may be identification information indicating that the UE 10 has the capability of establishing the first PDN connection. That is, the existence of the UE NBIFOM capability may mean that the UE 10 has the function of establishing the first PDN connection.

Next, the EPS bearer context for each PDN connection will be described. FIG. 10B illustrates an example of the EPS bearer context for each PDN connection.

As illustrated in FIG. 10B, the context includes at least a PDN connection ID, an IP address, a PDN type, an APN, a Network allowed mode, and an Operation mode.

The PDN connection ID is identification information for identifying a PDN connection. The UE 10, the TWAG 74, and the PGW 30 may store the same identification information.

The IP Address indicates an IP address assigned to the UE 10 for this PDN connection. The IP address may be an IPv4 and/or an IPv6 prefix.

The PDN type indicates the type of the IP address. The PDN type indicates IPv4, IPv6 or IPv4v6, for example.

The APN is a label indicating an access destination in the network, in accordance with DNS naming convention.

The Network allowed mode indicates an operation mode allowed by the network. The Network allowed mode may include the UE initiated mode, the Network initiated mode, or both thereof.

The Operation mode is identification information on a mode that indicates which of the UE 10 and the network takes an initiative in transmitting/receiving data or is allowed to initiate communication control when the current PDN connection is the first PDN connection.

More specifically, for example, the UE initiated mode in which the UE 10 is allowed to initiate the communication control or the Network initiated mode in which the network is allowed to initiate the communication control may be identified.

Next, an example of the EPS bearer context for each transfer path and/or bearer will be described with reference to FIG. 10C. As illustrated in FIG. 10C, the context includes at least transfer path identification information and a Routing Rule.

The transfer path identification information is information for identifying a transfer path and/or bearer. The transfer path identification information may be an EPS bearer ID, for example.

Furthermore, the transfer path identification information may be associated with a TFT.

The Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of the Mobile Access Gateway (MAG).

The Routing Rule may be notified from the PGW 30 or the PCRF 60. Alternatively, the Routing Rule may be a value that the UE 10 prestores as a default value.

The Routing Filter may include an IP header so that the PGW 30 can switch the IP flow. Alternatively, the Routing Filter may include an application ID so that the PGW 30 can switch the flow for each application. Alternatively, the Routing Filter may include a TFT.

The Routing Rule may store multiple rules. Furthermore, the Routing Rule may include priority for each rule.

FIG. 10D illustrates the TWAG capability. The TWAG capability stores identification information (NBIFOM capability) indicating whether or not capability of establishing the first PDN connection is supported for each TWAG 74. In other words, the identification information indicates whether or not the TWAG 74 supports the NBIFOM function. Specifically, the NBIFOM capability may include "allowed" or "Not allowed."

Note that the NBIFOM function may be information indicating the possession of the function of establishing the multi-access PDN connection.

Alternatively, the NBIFOM capability may be identification information indicating the possession of the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

The PGW 30 may store the NBIFOM capability associated with the TWAG ID.

FIG. 10E illustrates an example of the Network capability. In the Network capability, the NBIFOM capability is stored for each network, i.e., for each PGW 30.

Here, the NBIFOM capability is identification information indicating whether or not capability of establishing the first PDN connection is supported for each network. More specifically, for example, the NBIFOM capability may include "allowed" or "Not allowed."

Alternatively, the NBIFOM capability may be identification information indicating the possession of the capability of establishing the first PDN connection. That is, the existence of the NBIFOM capability may mean that the PGW 30 and/or the network is a gateway having the function of establishing the first PDN connection.

As illustrated in FIG. 10E, the PGW 30 stores the NBIFOM capability associated with the PGW ID. Furthermore, as illustrated in FIG. 10E, the NBIFOM capability may be stored associated with each of the multiple PGWs 30.

The PGW ID may be any information for identifying the PGW 30, and may be an APN, for example.

The TWAG capability and the Network capability may be included in the EPS bearer context, or may be information separated from the UE context.

1.2.5. PCRF Components

Figure 11:
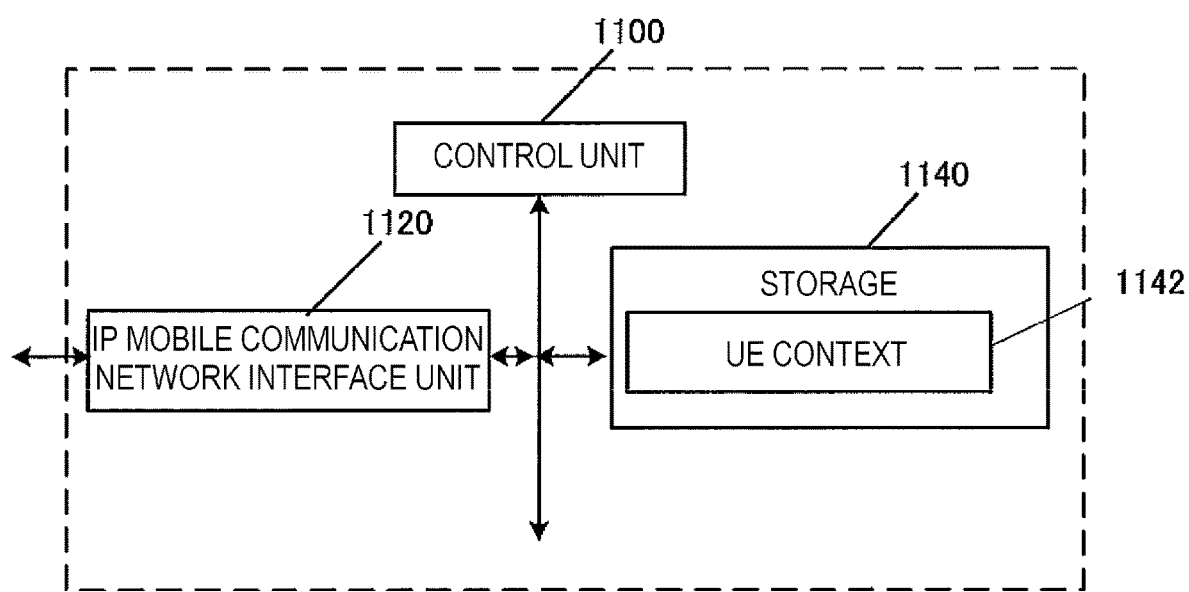
FIG. 11 is a diagram illustrating a functional configuration of a PCRF.

Next, the components of the PCRF 60 will be described. FIG. 11 illustrates a device configuration of the PCRF 60. As illustrated in FIG. 11, the PCRF 60 is constituted of an IP mobile communication network interface unit 1120, a control unit 1100, and a storage 1140. The IP mobile communication network interface unit 1120 and the storage 1140 are connected to the control unit 1100 via a bus.

The control unit 1100 is a function unit for controlling the PCRF 60. The control unit 1100 implements various processes by reading out and executing various programs stored in the storage 1140.

The IP mobile communication network interface unit 1120 is a function unit through which the PCRF 60 is connected to the PGW 30 and/or the TWAG 74 and/or the AAA 55.

The storage 1140 is a function unit for storing programs, data, and the like necessary for each operation of the PCRF 60. The storage 940 is constituted of, for example, a semiconductor memory, a Hard Disk Drive (HDD), or the like.

As illustrated in FIG. 11, the storage 1140 stores UE context 1142. Note that the UE context may be classified into a UE context stored for each UE 10 and a UE context stored for each PDN connection.

FIG. 12A illustrates the UE context for each UE 10. As illustrated in FIG. 12A, the context includes at least a Subscriber ID and UE NBIFOM capability.

The Subscriber ID is identification information on a user. For example, the Subscriber ID may be an IMSI.

The UE NBIFOM capability is the NBIFOM capability of the UE 10. The UE NBIFOM capability is identification information indicating whether or not capability of establishing the first PDN connection is supported for each UE 10. In other words, the UE NBIFOM capability is identification information indicating whether or not the UE 10 supports the NBIFOM function. More specifically, for example, the NBIFOM capability may include "allowed" or "Not allowed."

Alternatively, the UE NBIFOM capability may be identification information indicating that the UE 10 has the capability of establishing the first PDN connection. That is, the existence of the UE NBIFOM capability may mean that the UE 10 has the function of establishing the first PDN connection.

In other words, the UE NBIFOM capability may be identification information indicating that the UE 10 supports the NBIFOM function. That is, the existence of the UE NBIFOM capability in the storage may mean that the UE 10 supports the NBIFOM function.

Next, the UE context for each PDN connection will be described. FIG. 12B illustrates an example of the UE context for each PDN connection. As illustrated in FIG. 12B, the context may include at least an APN, an Operation mode, a Network Policy, a Charging Rule, a PCC Rule, and a QoS Rule.

The APN is a label indicating an access destination in the network, in accordance with DNS naming convention.

The Operation mode is identification information on a mode indicating which of the UE 10 and the network takes an initiative in transmitting/receiving data or is allowed to initiate communication control when the PDN connection is the first PDN connection.

More specifically, for example, an Operation mode in which the UE 10 is allowed to initiate the communication control may be the UE initiated mode.

Furthermore, an Operation mode in which the network and/or the PGW 30 and/or the PCRF 60 is allowed to initiate the communication control may be the Network initiated mode.

The Network Policy is a communication control policy on the network side, and may include the Network allowed mode. Alternatively, the PCRF 60 may store the Network allowed mode separately from the Network Policy.

The Charging Rule is a regulation on charging. In accordance with the Charging Rule determined by the PCRF 60, a PCEF performs charging.

The PCC Rule is a regulation relating to control of the Network Policy and Charging Rule. In accordance with the PCC Rule, the PCEF performs communication control and charging.

The QoS Rule is a regulation relating to QoS of the flow. The QoS Rule may be associated with the PCC Rule.

FIG. 12C illustrates the UE context for each transfer path and/or bearer. As illustrated in FIG. 12C, the UE context for each transfer path and/or bearer includes at least a Routing Rule.

The Routing Rule indicates an association of a Routing Filter, and a Routing address or Routing access type. On the basis of this association, whether using a communication path through the 3GPP access network or using a transfer path through the WLAN access network is determined.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of the Mobile Access Gateway (MAG).

The Routing Rule may be notified from the UE 10 and/or the TWAG 74 and/or the PGW 30. Alternatively, the Routing Rule may be a value that the PCRF 60 prestores as a default value. In this case, the PCRF 60 may determine the default value of the Routing Rule in accordance with the PCC Rule.

The Routing Filter may include an IP header so that an IP flow can be switched. Alternatively, the Routing Filter may include an application ID so that the flow can be switched for each application. Alternatively, the Routing Filter may include a TFT.

The Routing Rule may store multiple rules. Furthermore, the Routing Rule may include priority for each rule.

FIG. 12D illustrates an example of the TWAG capability stored by the TWAG 74. In the TWAG capability, identification information (NBIFOM capability) is stored for each TWAG 74, the information indicating whether or not capability of establishing the first PDN connection is supported. In other words, the identification information indicates whether or not the TWAG 74 supports the NBIFOM function. Specifically, the NBIFOM capability may include "allowed" or "Not allowed."

Note that the NBIFOM function may be information indicating the possession of the function of establishing the multi-access PDN connection.

Alternatively, the NBIFOM capability may be identification information indicating the possession of the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

As illustrated in FIG. 12D, the NBIFOM capability may be stored being associated with the TWAG ID that is the identification information on the TWAG 74. If not associated with the TWAG ID, the NBIFOM capability may mean the capability of the TWAG 74 to be stored.

If the TWAG ID and the NBIFOM capability are stored being associated with each other, the PCRF 60 may store the TWAG capability of multiple TWAGs 74.

FIG. 12E illustrates an example of the Network capability stored by the PCRF 60. In the Network capability, the NBIFOM capability is stored for each network, i.e., for each PGW 30.

Here, the NBIFOM capability is identification information indicating whether or not capability of establishing the first PDN connection is supported for each network. In other words, the identification information indicates whether or not the PGW 30 supports the NBIFOM function. More specifically, for example, the NBIFOM capability may include "allowed" or "Not allowed."

Note that the NBIFOM function may be information indicating the possession of the function of establishing the multi-access PDN connection.

Alternatively, the NBIFOM capability may be identification information indicating the possession of the capability of establishing the first PDN connection. In other words, the NBIFOM capability may be identification information indicating that a gateway supports the NBIFOM function. That is, the existence of the NBIFOM capability in the storage may mean that the PGW 30 is a gateway having the function of establishing the first PDN connection. In other words, the existence of the NBIFOM capability in the storage may mean that the PGW 30 is a gateway supporting the NBIFOM function.

1.3. Description of Initial State

An initial state in the present embodiment will be described. The initial state in the present embodiment may be a first initial state or a second initial state, both of which will be described later.

Note that the initial state in the present embodiment need not be limited to the first or second initial state.

1.3.1. Description of First Initial State

The first initial state will be described. In the first initial state, the UE 10 has not established the first PDN connection with the core network 90. However, the UE 10 has already established the second PDN connection. In greater detail, the UE 10 has not established the first PDN connection with a PGW_A 1310. However, the UE 10 has established the second PDN connection with a PGW_B 1320.

Note that the PGW_A 1310 may be a gateway device selected by using the APN 1. The PGW_B 1320 may be a gateway device selected by using the APN 2, Moreover, the PGW_A 1310 and the PGW_B 1320 may be the PGW 30. Furthermore, the selection of gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the second PDN connection may be constituted of a transfer path between the UE 10 and the PGW 30 through the access network B. Thus, the second PDN connection may be constituted of a transfer path that is a combination of a transfer path between the UE 10 and the TWAG 74 and a transfer path between the TWAG 74 and the PGW_B 1320. Here, the transfer path may be a bearer.

As described above, in a first state early stage, the UE 10 may be in a state of being connected to the core network 90 via the access network B.

Note that the UE 10 need not be connected to the core network 90 via the access network A. In other words, the UE 10 need not perform an attach through the LTE access network.

Alternatively, the UE 10 may be in a state of being connected to the core network 90 via the access network A. In this case, the UE 10 may perform an attach procedure initiated by the UE 10 to establish a third PDN connection.

Note that the third PDN connection may be established with the gateway selected by using the APN 2. Alternatively, the third PDN connection may be established with a gateway selected by using another APN different from the APN 1 and the APN 2.

The first initial state has been described above; however, the first initial state is not limited to the above-described state, and only needs to be a state in which the multi-access PDN connection has not been established through the access network B, for example.

1.3.2. Description of Procedure for Leading to First Initial State

Figure 15:
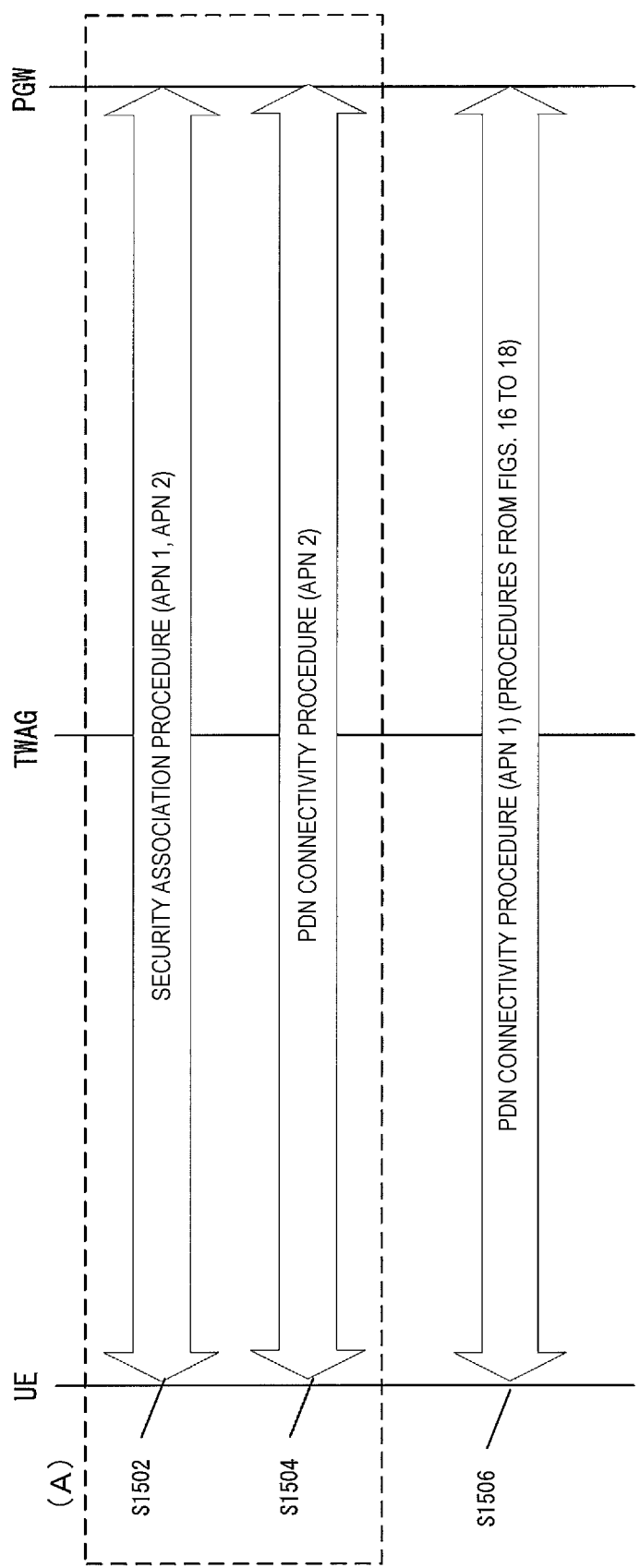
FIG. 15 is a diagram illustrating a procedure for leading to an initial state.

A procedure for leading to the first initial state will be described with reference to FIG. 15. In the procedure for leading to the first initial state, at least an attach procedure to the core network 90 through the access network B, illustrated in (A) of FIG. 15, is performed. The first initial state is a state after at least the attach procedure to the core network 90 through the access network B, illustrated by (A) in FIG. 15, is performed.

Next, details of the attach procedure to the core network 90 through the access network B will be described. The UE 10 first performs authentication procedure for accessing the access network B and the core network 90, and a security association procedure for establishing a security association to transmit/receive a message to/from the core network 90 (S1502).

In greater detail, the UE 10 performs an authentication procedure for accessing the TWAG 74 arranged in the access network B and the PGW 30 arranged in the core network 90. Upon the completion of the authentication procedure, the UE 10 performs a procedure for establishing security associations between the UE 10 and the TWAG 74 and between the TWAG 74 and the PGW 30. In the authentication procedure and the procedure for establishing a security association, the UE 10 may transmit, to the core network 90, control information including the Access Point Name (APN). Furthermore, the authentication procedure and the procedure for establishing a security association may be performed on the basis of a technique such as an EAP. The UE 10 can obtain authentication for accessing the PGW 30 selected by the TWAG 74 using the APN.

Moreover, the UE 10 may transmit multiple APNs. For example, the transmission of the APN 1 and the APN 2 will allow the UE 10 to obtain, upon the completion of the authentication procedure and the procedure for establishing a security association, authentication for accessing the PGW 30 selected by the TWAG 74 using the APN 1 and the PGW 30 selected by the TWAG 74 using the APN 2.

Upon the establishment of the security association, the UE 10 performs a PDN connectivity procedure for establishing the second PDN connection with the core network 90 through the access network B (S1504). In greater detail, the UE 10 establishes, via the TWAG 74, the PDN connection with the PGW_B 1320 arranged in the core network 90.

Specifically, the UE 10 transmits a PDN connectivity request to the TWAG 74 and/or the network. The UE 10 may transmit the PDN connectivity request including the APN 2.

The TWAG 74 and/or the network receives the PDN connectivity request transmitted from the UE 10. Upon the reception of the PDN connectivity request, the TWAG 74 and/or the network transmits a PDN connectivity accept to the UE 10. The TWAG 74 and/or the network may transmit the PDN connectivity accept including the APN 2.

The UE 10 receives the PDN connectivity accept transmitted from the TWAG 74 and/or the network. On the basis of the PDN connectivity accept, the UE 10 transmits a PDN connectivity complete to the TWAG 74 and/or the network.

The TWAG 74 and/or the network receives the PDN connectivity complete transmitted from the UE 10.

1.3.3. Description of Second Initial State

A second initial state will be described. In the second initial state, the UE 10 is in a state of not being connected to the core network 90. In other words, the UE 10 has not established either the first PDN connection or the second PDN connection with the core network 90. In greater detail, the UE 10 has not established the first PDN connection with the PGW_A 1310 included and arranged in the core network 90. Furthermore, the UE 10 has not established the second PDN connection with the PGW_B 1320 included and arranged in the core network 90.

Note that the PGW_A 1310 may be a gateway device selected by using the APN 1. The PGW_B 1320 may be a gateway device selected by using the APN 2. Furthermore, the selection of gateway using the APN 1 and/or the APN 2 may be performed by the TWAG 74 included and arranged in the access network B and/or the MME 40 included and arranged in the core network 90.

As described above, the second initial state may be a state in which the UE 10 has no connection with the core network 90. In other words, the UE 10 may be in a state of not being connected to the core network 90 through either the access network A or access network B. Thus, the UE 10 may be in a state in which the PDN connection has not been established.

The second initial state has been described above; however, the second initial state is not limited to the above-described state, and only needs to be a state in which the connection to the core network 90 through the access network B has not been established, for example.

1.3.4. Description of Procedure for Leading to Second Initial State

A procedure for leading (transitioning) to the second initial state will be described with reference to FIG. 15. In the procedure for leading (transitioning) to the second initial state, a state may be employed in which the procedure illustrated in (A) of FIG. 15 is not performed. In other words, the second initial state may be a state in which any special procedure for establishing a connection to the core network 90 through the access network B is not performed at all. That is, the second initial state may be a state in which the UE 10 initially connects to the core network 90 through the access network B.

1.3.5. Description of Multi-Access PDN Connectivity Establishment Procedure

Next, an establishment procedure of the first PDN connection will be described. Here, the initial state may be the first initial state or the second initial state. In the present embodiment, after the establishment of the initial state, the UE 10 performs a PDN connectivity procedure for establishing the first PDN connection with the core network 90 through the access network B (S1506). In greater detail, the UE 10 establishes, via the TWAG 74, the first PDN connection with the PGW_A 1310 arranged in the core network 90.

Note that the first PDN connection may be constituted of a path that is a combination of a transfer path between the UE 10 and the TWAG 74 and a transfer path between the TWAG 74 and the PGW_A 1310. Here, the transfer path may be a bearer.

As illustrated in FIG. 15, the procedure for establishing the first PDN connection may be a PDN connectivity procedure using the APN 1. A specific example of the PDN connectivity procedure will be described below.

1.4. Examples of PDN Connectivity Procedure

Examples of the first to fourth PDN connectivity procedures for establishing the first PDN connection will be described with reference to FIGS. 16 to 18.

1.4.1. Example of First PDN Connectivity Procedure

An example of the first PDN connectivity procedure will be described with reference to FIG. 16.

Figure 16:
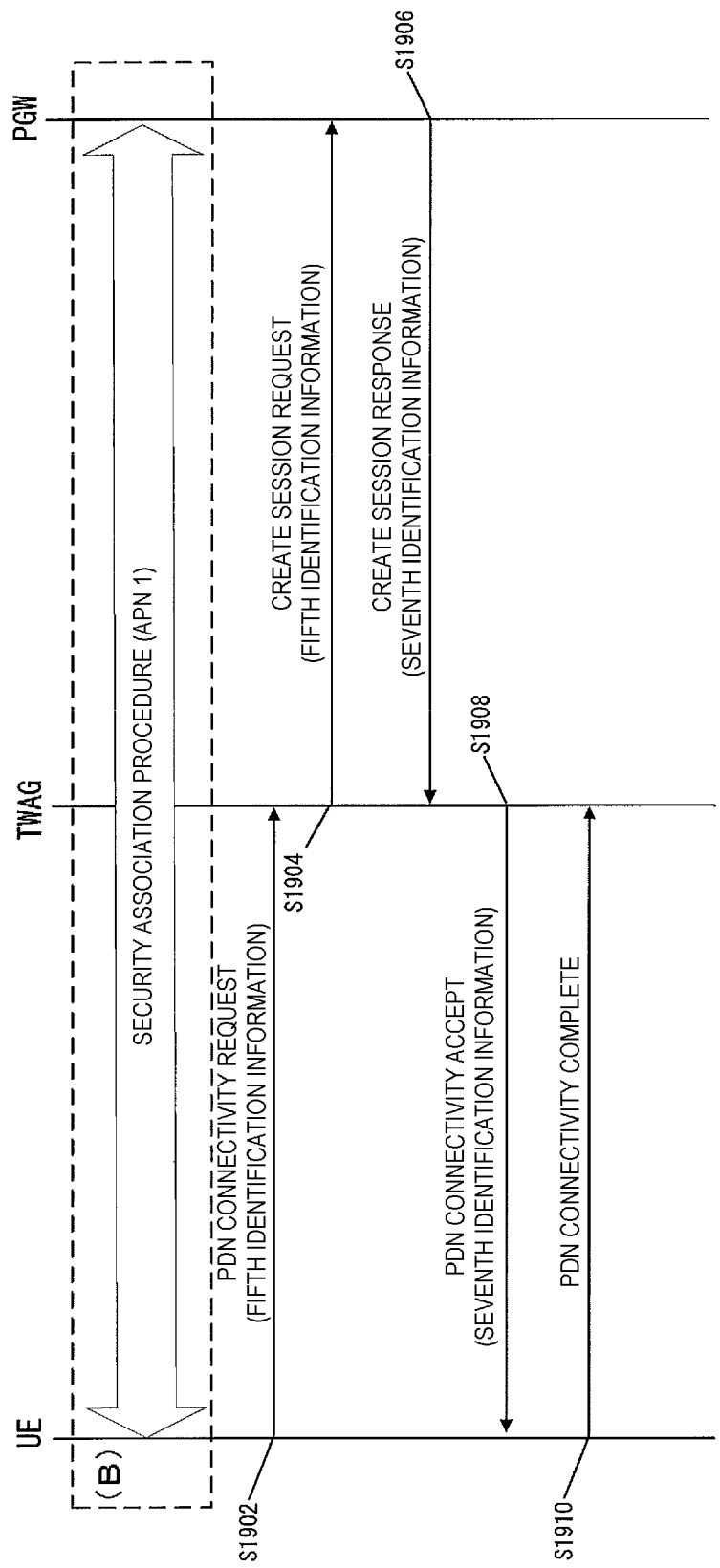
FIG. 16 is a diagram illustrating a first and third PDN connectivity procedure.

As illustrated in (B) of FIG. 16, the UE 10 first performs the authentication procedure and the security association procedure for establishing a security association. Note that the UE 10 may perform the security association procedure when the initial state is the second initial state. In other words, the UE 10 need not perform the security association procedure when the initial state is the first initial state. As described above, when the initial state is the first initial state, the UE 10 may omit the security association procedure since the security association has already been established.

Note that the security association procedure performed by the UE 10 may be similar to the security association procedure described in (A) of FIG. 15. Therefore, detailed description of the procedure will be omitted.

Next, the UE 10 transmits a PDN connectivity request to the TWAG 74 (S1902). The UE 10 may transmit the PDN connectivity request including at least a PDN connectivity request message identity (PDN connectivity request message ID), a Procedure transaction identity (Procedure transaction ID), a Request type (request type), and a PDN type. Furthermore, the UE 10 may include at least first identification information and/or fifth identification information in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit the PCO including the first identification information and/or fifth identification information and/or the TFT.

Here, the first identification information may be the UE NBIFOM capability representing that the UE 10 supports the NBIFOM. Note that the NBIFOM capability may be information indicating the possession of the function of establishing the multi-access PDN connection.

Furthermore, the fifth identification information may be a Mode Indication representing an NBIFOM operation mode for the multi-access PDN connection whose establishment is requested by the UE 10. Note that the UE 10 may include the UE-Initiated mode or the Network-Initiated mode in the fifth identification information.

Note that the first identification information may be the fifth identification information. More specifically, the UE 10 may represent, by transmitting the Mode Indication, that the UE 10 supports the NBIFOM.

As described above, the UE 10 may transmit the PDN connectivity request including the first identification information and/or fifth identification information to request the establishment of the multi-access PDN connection.

The PDN connectivity request message ID may be a message type representing a PDN connectivity request message.

The Procedure transaction ID may be information for identifying the PDN connectivity procedure.

The APN may be an APN to which the UE 10 requests a connection. More specifically, the APN may be the APN 1. The UE 10 may include the APN 1 in order to establish the multi-access PDN connection. Here, the APN 1 may be an APN that is allowed to establish the multi-access PDN connection and/or an APN that is allowed to perform communication based on the NBIFOM.

The request type may be information for identifying the type of the PDN connectivity procedure to be requested. For example, since the UE 10 performs an initial connection by using the APN 1, the request type may be a type indicating an attach, rather than a type indicating a handover.

The PDN type may indicate an available IP version. For example, the PDN type may be IPv4, IPv6, or IPv4v6. The PCO may be protocol information associated with the PDN connection. Furthermore, the PCO may include identification information on the request. Note that the UE 10 may transmit the PCO including the first identification information and/or fifth identification information.

The TFT may be information for identifying an IP flow that performs communication by using the PDN connection established through the present PDN connectivity procedure. Note that the IP flow to be identified may vary for each application. Thus, on the basis of the TFT, user data of a certain application can be identified.

More specifically, the TFT may be constituted of a five-tuple, or may be constituted of identification information such as the application ID. Note that the five-tuple may be constituted of a combination of one or more of a source IP address, a destination IP address, a source port number, a destination port number, and a protocol number.

When the UE 10 requests the establishment of the multi-access PDN connection of the UE-Initiated mode, the UE 10 may include the TFT in the PDN connectivity request. Alternatively, when the UE 10 requests the establishment of the multi-access PDN connection of the Network-Initiated mode, the UE 10 need not include the TFT in the PDN connectivity request.

In other words, when the UE 10 includes the UE-Initiated mode in the fifth identification information, the UE 10 may include the TFT in the PDN connectivity request. Alternatively, when the UE 10 includes the Network-Initiated mode in the fifth identification information, the UE 10 need not include the TFT in the PDN connectivity request.

Note that conventionally, the UE 10 can perform transmission (of the PDN connectivity request) with information indicating IFOM support included in the PCO. Here, the IFOM support is identification information representing that the IP Flow Mobility (IFOM) is supported. Furthermore, the IFOM is a technique for switching a communication path of a certain IP flow by using the Dual Stack Mobile IPv6 (DSMIPv6) protocol. Thus, including the information indicating the IFOM support in the PCO allows the UE 10 to switch the access network through which the communication of a certain IP flow is performed.

In the present embodiment, when the UE 10 includes the first identification information and/or fifth identification information in the PCO, the UE 10 does not include the IFOM support. In contrast, when the UE 10 includes the IFOM support in the PCO, the UE 10 does not include either the first identification information or the fifth identification information. As described above, it may be possible to not configure both the first identification information and/or fifth identification information and the IFOM support to be effective to ensure a clear distinction between the use of the switching of the communication path based on the NBIFOM and the use of the switching of the communication path based on the IFOM.

Thus, the UE 10 can establish either the PDN connection supporting the IFOM or the PDN connection supporting the NBIFOM, in the establishment procedure of a single PDN connection. In other words, the single PDN connection is any one of the PDN connection supporting the NBIFOM, the PDN connection supporting the IFOM, or the single-access PDN connection.

The TWAG 74 receives the PDN connectivity request transmitted from the UE 10. Upon the reception of the PDN connectivity request, and/or on the basis of the first identification information included in the PDN connectivity request and/or the fifth identification information included in the PDN connectivity request, the TWAG 74 transmits a create session request to the PGW 30 (S1904).

Upon the reception of the PDN connectivity request and/or on the basis of the first identification information included in the PDN connectivity request, the TWAG 74 may transmit the create session request including at least the first identification information.

Upon the reception of the PDN connectivity request and/or on the basis of the fifth identification information included in the PDN connectivity request, the TWAG 74 may transmit the create session request including at least the fifth identification information. The TWAG 74 may include the TFT in the create session request, upon the reception of the TFT transmitted from the UE 10.

Furthermore, the TFT may be information for identifying an IP flow that performs communication by using the PDN connection established through the present PDN connectivity procedure. Note that the IP flow to be identified may vary for each application. Thus, on the basis of the TFT, user data of a certain application can be identified.

More specifically, the TFT may be constituted of a five-tuple, or may be constituted of identification information such as the application ID. Note that the five-tuple may be constituted of a combination of one or more of a source IP address, a destination IP address, a source port number, a destination port number, and a protocol number.

When the TWAG 74 requests the establishment of the multi-access PDN connection of the UE-Initiated mode, the TWAG 74 may include the TFT in the create session request. Alternatively, when the TWAG 74 requests the establishment of the multi-access PDN connection of the Network-Initiated mode, the TWAG 74 need not include the TFT in the create session request.

In other words, when the UE-Initiated mode is included in the first identification information and/or fifth identification information included in the PDN connectivity request, the TWAG 74 may include the TFT in the create session request.

Alternatively, when the Network-Initiated mode is included in the first identification information and/or fifth identification information included in the PDN connectivity request, the TWAG 74 need not include the TFT in the create session request.

Here, the TWAG 74 may determine, on the basis of on the first identification information and/or the fifth identification information, whether to request the establishment of the multi-access PDN connection of the UE-Initiated mode or request the establishment of the multi-access PDN connection of the Network-Initiated mode.

Note that when the first identification information is not included in the PDN connectivity request, the TWAG 74 may transmit the create session request without including the first identification information. Furthermore, when the fifth identification information is not included in the PDN connectivity request, the TWAG 74 may transmit the create session request without including the fifth identification information. Moreover, when neither the first identification information nor the fifth identification information is included in the PDN connectivity request, the TWAG 74 may perform a procedure for establishing the single-access PDN connection.

The PGW 30 receives the create session request transmitted from the TWAG 74. Upon the reception of the create session request, and/or on the basis of the first identification information and/or fifth identification information included in the create session request, the PGW 30 may perform an IP-CAN session update procedure with the PCRF 60.

The PGW 30 may transmit, to the PCRF 60, a control message in the IP-CAN session procedure, including information indicating whether the PDN connection to be established is the multi-access PDN connection or the single-access PDN connection, and/or the first identification information and/or fifth identification information.

More specifically, when the multi-access PDN connection is to be established, the PGW 30 transmits, to the PCRF 60, information indicating the access network B, a PDN connection ID, information indicating that the PDN connection is the multi-access PDN connection, and the first identification information and/or fifth identification information. Alternatively, when the single-access PDN connection is to be established, the PGW 30 transmits, to the PCRF 60, the information indicating the access network B, the PDN connection ID, and information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

The create session request the create session request note that the PGW 30 may perform the IP-CAN session update procedure to notify the PCRF 60 of information on the UE 10 and/or TWAG 74.

Furthermore, upon the reception of the first identification information and/or fifth identification information, the PCRF 60 may transmit, to the PGW 30, a control message in the IP-CAN session update procedure with the PGW 30, the control message including at least the seventh identification information. The detailed description of the seventh identification information will be described later.

Note that the PCRF 60 may perform the IP-CAN session update procedure to notify the PGW 30 of charging information and/or QoS control information and/or routing information.

Upon the reception of the create session request or the completion of the IP-CAN session update procedure, and/or on the basis of the first identification information and/or fifth identification information included in the create session request, and/or on the basis the seventh identification information included in the IP-CAN session update procedure, the PGW 30 transmits a create session response to the TWAG 74 (S1906).

Upon the reception of the create session request or the completion of the IP-CAN session update procedure, and/or on the basis of the first identification information and/or fifth identification information included in the create session request, and/or on the basis of the seventh identification information included in the IP-CAN session update procedure, the PGW 30 may transmit the create session response including at least the seventh identification information.

Note that a method by which the PGW 30 acquires the seventh identification information is not limited to the above-described method for acquiring the seventh identification information from the PCRF 60 in the IP-CAN session update procedure, and another example may be employed. For example, the PGW 30 may create the seventh identification information and transmit the create session response including the seventh identification information, without acquiring the seventh identification information from the PCRF 60 in the IP-CAN session update procedure.

Here, the seventh identification information may be an Allowed Mode representing the NBIFOM operation mode that is allowed for the multi-access PDN connection to be established. In other words, the fifth identification information is an operation mode requested by the UE 10, whereas the seventh identification information may be an operation mode allowed by the operator.

Note that the PCRF 60 or the PGW 30 may determine the Allowed Mode and the seventh identification information on the basis of an operator policy. For example, a policy that allows for the establishment of only the PDN connection of the UE-Initiated mode, a policy that allows for the establishment of only the PDN connection of the Network-Initiated mode, a policy that allows for the establishment of both modes, a policy that prohibits the establishment of both modes, and the like may be managed.

Note that the PCRF 60 or the PGW 30 may acquire the operator policy from the HSS or the like. Alternatively, an operator policy created by an administrator may be stored.

In addition, for the operator policy, a policy different for each subscriber may be managed. Alternatively, a policy different for each APN may be managed. For example, for each APN, a different Allowed Mode for the PDN connection to be established may be managed.

In the present example, a case will be described in which the establishment of the PDN connection of the NBIFOM operation mode included in the fifth identification information is allowed on the basis of the Allowed Mode.

Thus, the PCRF 60 or the PGW 30 allows for the establishment of the PDN connection based on the NBIFOM operation mode included in the fifth identification information, and includes, in the seventh identification information, the same operation mode as that of the fifth identification information.

In other words, when the UE-Initiated mode is included in the fifth identification information, the PCRF 60 or the PGW 30 may include the UE-Initiated mode in the seventh identification information. Alternatively, when the Network-Initiated mode is included in the fifth identification information, the PCRF 60 or the PGW 30 may include the Network-Initiated mode in the seventh identification information.

As described above, when the establishment of the PDN connection of the NBIFOM operation mode included in the fifth identification information is allowed on the basis of the Allowed Mode, a mode requested by the UE 10 out of one or multiple operation modes allowed on the basis of the Allowed Mode may be regarded as the seventh identification information.

The PGW 30 may include the PDN Address (PDN address) and/or the PDN connection ID and/or the TFT in the create session response.

The PDN Address may be an IP address assigned to the UE 10. For example, the PDN Address may be an IPv4 address, or an IPv6 prefix and an interface ID for constituting an IPv6 address. Here, the PGW 30 may assign the IP address of the UE 10. Moreover, the PGW 30 may include the IP address assigned to the UE 10 in the PDN Address.

Furthermore, the PDN connection ID may be information for uniquely identifying the PDN connection established between the UE 10 and the PGW 30. The PDN connection ID may be assigned by the PGW 30, or may be assigned by the TWAG 74. In other words, the PGW 30 may assign the PDN connection ID.

The TWAG 74 receives the create session response transmitted from the PGW 30. Upon the reception of the create session response and/or on the basis of the seventh identification information included in the create session response, the TWAG 74 transmits a PDN connectivity accept to the UE 10 (S1908).

Upon the reception of the create session response and/or on the basis of the seventh identification information included in the create session response, the TWAG 74 may transmit the PDN connectivity accept including at least a PDN connectivity accept message identity (PDN connectivity accept message ID), the Procedure transaction ID, the APN, the PDN Address (PDN address), the PDN connection ID, and the User Plane Connection ID (user plane connection ID). Furthermore, the TWAG 74 may include at least the seventh identification information in the PDN connectivity accept. Moreover, the TWAG 74 may include the PCO and/or a Cause and/or the TFT and/or PDN connection attribute information, in the PDN connectivity accept. Note that the TWAG 74 may transmit the PCO including the seventh identification information and/or the TFT.

Here, the PDN connectivity accept message ID may be a message type representing a PDN connectivity accept message.

The APN may be an APN to which the UE 10 is allowed to connect. More specifically, the APN may be the APN 1. The APN 1 may be an APN that is allowed to establish the multi-access PDN connection. The TWAG 74 may include the APN 1 in the PDN connectivity accept.

The PDN Address may be an IP address assigned to the UE 10. For example, the PDN Address may be an IPv4 address, or an interface ID for constituting an IPv6 address.

The PDN connection ID may be information for uniquely identifying the PDN connection established between the UE 10 and the PGW 30. The PDN connection ID may be an ID assigned by the PGW 30, or an ID assigned by the TWAG 74. In other words, the TWAG 74 may assign the PDN connection ID.

The User Plane Connection ID is information for identifying a user plane. The user plane is a transfer path used for transferring user data in the PDN connection. The TWAG 74 may assign the User Plane Connection ID.

The Cause may be information indicating that the PDN type of the PDN Address assigned to the UE 10 is different from the PDN type requested by the UE 10 in the PDN connectivity request.

Note that the TWAG 74 and/or the PGW 30 may include the seventh identification information in the PCO. However, when the TWAG 74 and/or the PGW 30 includes the seventh identification information in the PCO, the TWAG 74 and/or the PGW 30 does not include the IFOM support. In contrast, when the TWAG 74 and/or the PGW 30 includes the IFOM support in the PCO, the TWAG 74 and/or the PGW 30 does not include the seventh identification information. As described above, it may be possible to not configure both the seven identification information and the IFOM support to be effective to ensure a clear distinction between the use of the switching of the communication path on the basis of the NBIFOM and the use of the switching of the communication path on the basis of the IFOM.

The PDN connection attribute information may be information indicating that the PDN connection established in the present PDN connectivity procedure is the multi-access PDN connection, and/or information indicating that user data transmitted/received by using the PDN connection established in the present PDN connectivity procedure is allowed to be transmitted/received through the access network A and access network B, and/or information indicating that the PDN connection established in the present PDN connectivity procedure is the multi-access PDN connection of the operation mode indicated by the seventh identification information.

Note that the UE 10 may transmit the PDN connectivity accept message that further includes a connectivity type indicating the type of the PDN connection and/or WLAN offload permission information (WLAN offload acceptability) indicating whether or not the WLAN offload can be performed. Furthermore, the TWAG 74 may transmit the connectivity type or the WLAN offload permission information including the PDN connection attribute information.

The UE 10 receives the PDN connectivity accept transmitted from the TWAG 74 (S1910). Upon the reception of the PDN connectivity accept and/or on the basis of the seventh identification information included in the PDN connectivity accept, the UE 10 transmits the PDN connectivity complete to the TWAG 74. The UE 10 may transmit the PDN connectivity complete including at least a PDN connectivity complete message ID (PDN connectivity complete), the Procedure transaction ID, and the PDN connection ID.

Here, the PDN connectivity complete message ID may be a message type representing a PDN connectivity complete message.

After the first PDN connectivity procedure is completed, the UE 10 and the PGW 30 establish the first PDN connection of the NBIFOM operation mode requested by the UE 10. Upon the reception of the PDN connectivity accept and/or on the basis of the PDN connection attribute information and/or the seventh identification information, the UE 10 may identify that the established PDN connection is the multi-access PDN connection of the NBIFOM operation mode requested by the UE 10. Upon the establishment of the first PDN connection, the UE 10 and the PGW 30 determine a PDN connection and/or a transfer path (such as an EPS bearer) for transmitting/receiving the IP flow by using the TFT, and transmit/receive user data corresponding to the IP flow identified on the basis of the TFT. More specifically, the UE 10 and the PGW 30 transmit/receive a flow identified on the basis of the TFT by using the first PDN connection.

Note that in the example of the first PDN connectivity procedure, a case has been described in which transmission/reception of the TFT is included in the PDN connectivity procedure; however, the first PDN connectivity procedure is not limited to this case. The transmission/reception of the TFT may be performed after the multi-access PDN connection is established.

Therefore, the UE 10 and the TWAG 74 may transmit/receive the TFT without including the TFT in the PDN connectivity request and/or a PDN connectivity response (PDN connectivity accept), and establish the multi-access PDN connection. In other words, at a point in time when the PDN connection is established, there may be no IP flow transmitting/receiving user data by using the PDN connection. In this case, the UE 10 and the TWAG 74 transmit the TFT after the multi-access PDN connection is established.

More specifically, when the PDN connection of the UE-Initiated mode is established, the UE 10 may transmit the TFT to the TWAG 74. In addition, the TWAG 74 receives the TFT from the UE 10 and transmits the TFT to the PGW 30. Thus, the UE 10 and the PGW 30 can determine a PDN connection and/or a transfer path (such as an EPS bearer) for transmitting/receiving the IP flow by using the TFT, and transmit/receive user data corresponding to the IP flow identified on the basis of the TFT.

On the other hand, when the PDN connection of the Network-Initiated mode is established, the PGW 30 may transmit the TFT to the TWAG 74. Here, the PGW 30 may receive, from the PCRF 60, the TFT determined on the basis of the operator policy. In addition, the TWAG 74 receives the TFT from the PGW 30 and transmits the TFT to the UE 10. Thus, the UE 10 and the PGW 30 can determine a PDN connection and/or a transfer path (such as an EPS bearer) for transmitting/receiving the IP flow by using the TFT, and transmit/receive user data corresponding to the IP flow identified on the basis of the TFT.

Furthermore, in the example of the first PDN connectivity procedure, a case has been described in which the UE 10 and the PGW 30 establish the second PDN connection without complying with the request, from the UE 10, of the establishment of the first PDN connection; however, the first PDN connectivity procedure is not limited to this case. The UE 10 may reject the establishment of the second PDN connection.

For example, when the UE 10 does not support the second PDN connection and/or when the establishment of the second PDN connection does not comply with the policy of the UE 10, the UE 10 may reject the establishment of the second PDN connection.

In greater detail, the UE 10 may transmit a PDN connectivity reject to the TWAG 74, upon the reception of the PDN connectivity accept and/or on the basis of the seventh identification information included in the PDN connectivity accept and/or the PDN connection attribute information and/or the policy of the UE 10.

The UE 10 may transmit the PDN connectivity reject including at least one or more of a PDN connectivity reject message identity (PDN connectivity reject message ID), the Procedure transaction ID, and the Cause. Furthermore, the UE 10 may further include fourth identification information in the PDN connectivity reject. Moreover, the UE 10 may further include the PCO and/or the Tw1 value in the PDN connectivity reject. Note that the UE 10 may transmit the PCO including the fourth identification information.

The fourth identification information may be information representing that the UE 10 does not support the second PDN connection and/or information representing that the establishment of the second PDN connection does not comply with the policy of the UE 10.

The PDN connectivity reject message ID may be a message type representing a PDN connectivity reject message.

The Cause may be information representing a reason why the PDN connectivity request is rejected. Here, the UE 10 may notify the UE 10 of the fourth identification information included in the Cause.

The Tw1 value may be a value of a Tw1 timer, included when the Cause represents insufficient resources.

The TWAG 74 may receive the PDN connectivity reject transmitted from the UE 10. Upon the reception of the PDN connectivity reject and/or on the basis of the fourth identification information included in the PDN connectivity reject, the TWAG 74 may delete the EPS bearer context, held by the TWAG 74, relating to the established PDN connection. Furthermore, the TWAG 74 may transmit, to the PGW 30, the fourth identification information included in the PDN connectivity reject.

The PGW 30 may receive the fourth identification information transmitted from the TWAG 74. Upon the reception of the fourth identification information and/or on the basis of the operator policy, the PGW 30 may delete the EPS bearer context, held by the PGW 30, relating to the established PDN connection.

Furthermore, the PGW 30 may perform the IP-CAN session update procedure with the PCRF 60, upon the reception of the fourth identification information. The PGW 30 may include the fourth identification information in the IP-CAN session update procedure.

The PCRF 60 may change the operator policy on the basis of the IP-CAN session update procedure. Note that on the basis of the change of the operator policy, the PGW 30 may delete the EPS bearer context, held by the PGW 30, relating to the established PDN connection.

1.4.2. Example of Second PDN Connectivity Procedure

An example of the second PDN connectivity procedure will be described with reference to FIG. 17.

Figure 17:
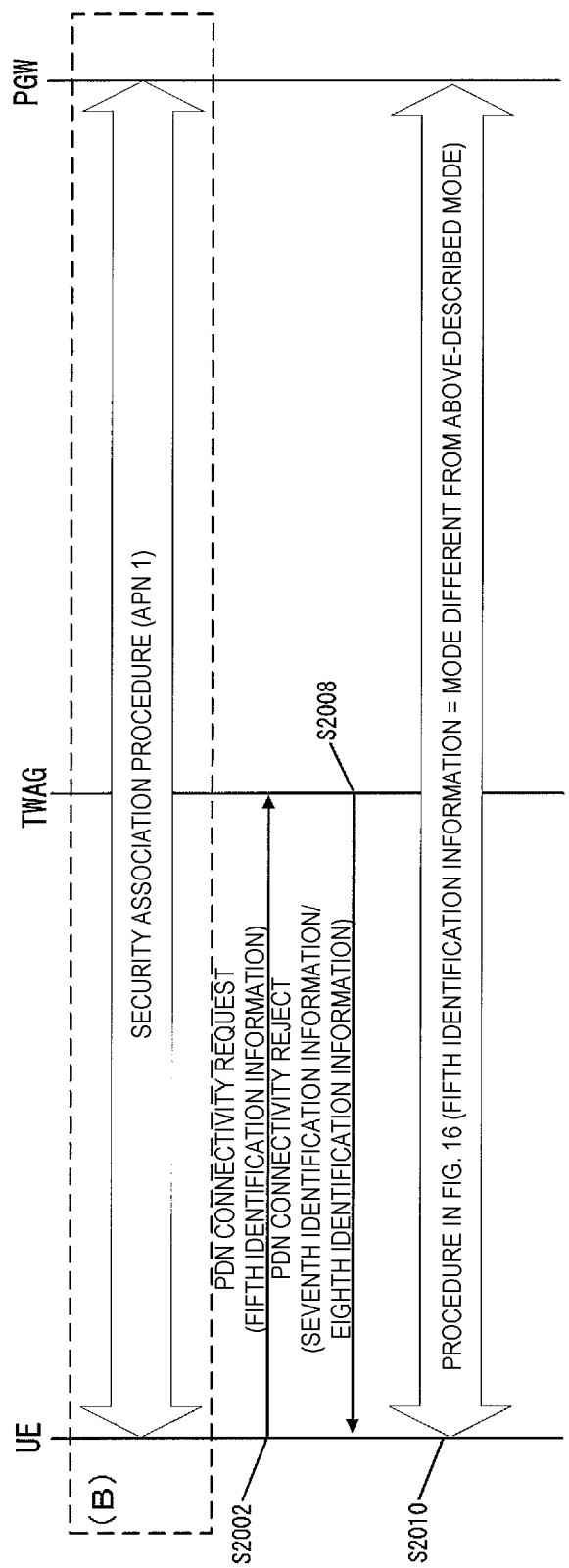
FIG. 17 is a diagram illustrating a second PDN connectivity procedure.

As illustrated in (B) of FIG. 17, the UE 10 first performs the authentication procedure and the security association procedure for establishing the security association. Note that the UE 10 may perform the security association procedure when the initial state is the second initial state. In other words, when the initial state is the first initial state, the UE 10 need not perform the security association procedure. As described above, when the initial state is the first initial state, the UE 10 may omit the security association procedure since the security association has already been established.

Note that the security association procedure performed by the UE 10 may be similar to the security association procedure described in (A) of FIG. 15. Therefore, detailed description of the procedure will be omitted.

Next, the UE 10 transmits a PDN connectivity request to the TWAG 74 (S2002). The UE 10 may transmit the PDN connectivity request including at least the PDN connectivity request message identity (PDN connectivity request message ID), the Procedure transaction identity (Procedure transaction ID), the Request type (request type), and the PDN type. Furthermore, the UE 10 may include at least first identification information and/or fifth identification information in the PDN connectivity request. Moreover, the UE 10 may include the Access Point Name (APN) and/or Protocol Configuration Options (PCOs) and/or the Traffic Flow Templates (TFTs) in the PDN connectivity request.

Note that the UE 10 may transmit the PCO including the first identification information and/or fifth identification information and/or the TFT.

Here, the first identification information may be the UE NBIFOM capability representing that the UE 10 supports the NBIFOM. Note that the NBIFOM capability may be information indicating the possession of the function of establishing the multi-access PDN connection.

Here, the fifth identification information may be a Mode Indication representing an NBIFOM operation mode for the multi-access PDN connection whose establishment is requested by the UE 10. Note that the UE 10 may include the UE-Initiated mode or the Network-Initiated mode in the fifth identification information.

Note that the first identification information may be the fifth identification information. More specifically, the UE 10 may represent, by transmitting the Mode Indication, that the UE 10 supports the NBIFOM.

As described above, the UE 10 may transmit the PDN connectivity request including the first identification information and/or fifth identification information to request the establishment of the multi-access PDN connection.

The PDN connectivity request message ID may be a message type representing the PDN connectivity request message.

The Procedure transaction ID may be information for identifying the PDN connectivity procedure.

The APN may be an APN to which the UE 10 requests a connection. More specifically, the APN may be the APN 1. The UE 10 may include the APN 1, in order to establish the multi-access PDN connection. Here, the APN 1 may be an APN that is allowed to establish the multi-access PDN connection and/or an APN that is allowed to perform communication based on the NBIFOM.

The request type may be information for identifying the type of the PDN connectivity procedure to be requested. For example, since the UE 10 performs an initial connection by using the APN 1, the request type may be the type indicating an attach, rather than the type indicating a handover.

The PDN type may indicate an available IP version. For example, the PDN type may be IPv4, IPv6, or IPv4v6.

The PCO may be protocol information associated with the PDN connection. Furthermore, the PCO may include identification information on the request. Note that the UE 10 may transmit the PCO including the first identification information and/or fifth identification information.

The TFT may be information for identifying an IP flow that performs communication by using the PDN connection established in the present PDN connectivity procedure. Note that the IP flow to be identified may vary for each application. Thus, on the basis of the TFT, user data of a certain application can be identified.

More specifically, the TFT may be constituted of a five-tuple, or may be constituted of identification information such as the application ID. Note that the five-tuple may be constituted of a combination of one or more of a source IP address, a destination IP address, a source port number, a destination port number, and a protocol number.

When the UE 10 requests the establishment of the multi-access PDN connection of the UE-Initiated mode, the UE 10 may include the TFT in the PDN connectivity request. Alternatively, when the UE 10 requests the establishment of the multi-access PDN connection of the Network-Initiated mode, the UE 10 need not include the TFT in the PDN connectivity request.

In other words, when the UE 10 includes the UE-Initiated mode in the fifth identification information, the UE 10 may include the TFT in the PDN connectivity request. Alternatively, when the UE 10 includes the Network-Initiated mode in the fifth identification information, the UE 10 need not include the TFT in the PDN connectivity request.

Note that conventionally, the UE 10 can perform transmission, with information indicating the IFOM support included in the PCO. Here, the IFOM support is identification information representing that the IP Flow Mobility (IFOM) is supported. Furthermore, the IFOM is a technique for switching a communication path of a certain IP flow by using the Dual Stack Mobile IPv6 (DSMIPv6) protocol. Thus, including the information indicating the IFOM support in the PCO allows the UE 10 to switch the access network through which the communication of a certain IP flow is performed.

In the present embodiment, when the UE 10 includes the first identification information and/or fifth identification information in the PCO, the UE 10 does not include the IFOM support. In contrast, when the UE 10 includes the IFOM support in the PCO, the UE 10 does not include the first identification information and/or the fifth identification information. As described above, it may be possible to not configure both the first identification information and/or fifth identification information and the IFOM support to be effective to ensure a clear distinction between the use of the switching of the communication path based on the NBIFOM and the use of the switching of the communication path based on the IFOM.

Thus, the UE 10 can establish either the PDN connection supporting the IFOM or the PDN connection supporting the NBIFOM, in the establishment procedure of a single PDN connection. In other words, the single PDN connection is any one of the PDN connection supporting the NBIFOM, the PDN connection supporting the IFOM, or the single-access PDN connection.

In response to the PDN connectivity request received from the UE 10, the TWAG 74 may transmit the PDN connectivity reject to the UE 10 (S2008).

The TWAG 74 may determine to transmit the PDN connectivity reject on the basis of the operator policy. For example, when the operator policy does not allow the UE 10 to establish the multi-access PDN connection, or when the operator policy does not allow for the NBIFOM operation mode requested by the UE 10, the TWAG 74 may transmit the PDN connectivity reject to the UE 10.

More specifically, when the UE 10 requests the establishment of the PDN connection of the UE-Initiated mode but the operator policy does not allow for the establishment of the PDN connection in the UE-Initiated mode, the TWAG 74 may transmit the PDN connectivity reject to the UE 10. Furthermore, when the UE 10 requests the establishment of the PDN connection of the Network-Initiated mode but the operator policy does not allow for the establishment of the PDN connection in the Network-Initiated mode, the TWAG 74 may transmit the PDN connectivity reject to the UE 10.

Upon the reception of the PDN connectivity request and/or on the basis of the first identification information and/or fifth identification information included in the PDN connectivity request, the TWAG 74 may transmit the PDN connectivity reject including at least the PDN connectivity reject message identity (PDN connectivity reject message ID), the Procedure transaction ID, and the Cause. Furthermore, the TWAG 74 may transmit the PDN connectivity reject including at least the seventh identification information and/or eighth identification information. Moreover, the TWAG 74 may include the PCO and/or the Tw1 value in the PDN connectivity reject. Note that the TWAG 74 may transmit the PCO including the seventh identification information and/or the eighth identification information.

Here, the seventh identification information may be an Allowed Mode representing the NBIFOM operation mode that is allowed for the multi-access PDN connection to be established. In other words, the fifth identification information is an operation mode requested by the UE 10, whereas the seventh identification information may be an operation mode allowed by the operator.

Note that the TWAG 74 may determine the Allowed Mode and the seventh identification information on the basis of the operator policy. For example, a policy that allows for the establishment of only the PDN connection of the UE-Initiated mode, a policy that allows for the establishment of only the PDN connection of the Network-Initiated mode, a policy that allows for the establishment of both modes, a policy that prohibits the establishment of both modes, and the like may be managed.

Note that the TWAG 74 may acquire the operator policy from the AAA 55, the HSS 50, and the like. Alternatively, an operator policy created by an administrator may be stored.

In addition, for the operator policy, a policy different for each subscriber may be managed. Alternatively, a policy different for each APN may be managed. For example, for each APN, a different Allowed Mode for the PDN connection to be established may be managed.

In the present example, on the basis of the Allowed Mode, a case will be described in which the establishment of the PDN connection of the NBIFOM operation mode included in the fifth identification information is not allowed.

Thus, the TWAG 74 does not allow for the establishment of the PDN connection based on the NBIFOM operation mode included in the fifth identification information, and includes, in the seventh identification information, an operation mode that is a mode allowed on the basis of the Allowed Mode and is different from the fifth identification information.

In other words, when the UE-Initiated mode is included in the fifth identification information and the Network-Initiated mode is allowed, the TWAG 74 may include the Network-Initiated mode in the seventh identification information. Alternatively, when the Network-Initiated mode is included in the fifth identification information and the UE-Initiated mode is allowed, the TWAG 74 may include the UE-Initiated mode in the seventh identification information.

Note that when the establishment of the PDN connection based on an operation mode different from the fifth identification information is not allowed, the TWAG 74 need not include the seventh identification information. In such a case, the TWAG 74 may transmit the PDN connectivity reject including cause information indicating that the requested operation mode is not allowed.

As described above, on the basis of the Allowed Mode, when the establishment of the PDN connection of the NBIFOM operation mode included in the fifth identification information is not allowed, an operation mode that is other than the NBIFOM operation mode included in the fifth identification information and is allowed to establish the PDN connection may be regarded as the seventh identification information, on the basis of the Allowed Mode.

Furthermore, the eighth identification information may be a Rejected Mode representing the NBIFOM operation mode for the multi-access PDN connection rejected by the TWAG 74. Note that the TWAG 74 may include, in the eighth identification information, the same mode as the NBIFOM operation mode included in the fifth identification information.

In other words, when the UE-Initiated mode is included in the fifth identification information, the PGW 30 and/or the PCRF 60 may include the UE-Initiated mode in the eighth identification information. Alternatively, when the Network-Initiated mode is included in the fifth identification information, the PGW 30 and/or the PCRF 60 may include the Network-Initiated mode in the eighth identification information.

The PDN connectivity reject message ID may be a message type representing a PDN connectivity reject message. The Cause may be information representing a reason why the PDN connectivity request is rejected.

The Tw1 value may be a value of the Tw1 timer, included when the Cause represents insufficient resources.

The UE 10 receives the PDN connectivity reject transmitted from the TWAG 74. Upon the reception of the PDN connectivity reject and/or on the basis of the seventh identification information and/or eighth identification information included in the PDN connectivity reject, the UE 10 may newly perform the PDN connectivity procedure (S2010).

The UE 10 may perform the PDN connectivity procedure including a mode different from the NBIFOM operation mode that is included in the fifth identification information in the PDN connectivity request.

Note that the UE 10 may regard the seventh identification information received from the TWAG 74 as the fifth identification information.

Alternatively, the UE 10 may regard the eighth identification information received from the TWAG 74 as the fifth identification information.

In other words, when the UE 10 includes the UE-Initiated mode in the fifth identification information in the PDN connectivity request of the first time, the UE 10 may perform the PDN connectivity procedure including the network-initiated mode. Alternatively, when the UE 10 includes the UE-Initiated mode in the fifth identification information in the PDN connectivity request of the first time, the UE 10 may perform the PDN connectivity procedure including the Network-Initiated mode.

In addition, when the seventh identification information included in the PDN connectivity reject is the UE-Initiated mode, the UE 10 may perform the PDN connectivity procedure including the UE-Initiated mode. Alternatively, when the seventh identification information included in the PDN connectivity reject is the Network-Initiated mode, the UE 10 may perform the PDN connectivity procedure including the Network-Initiated mode.

In addition, when the eighth identification information included in the PDN connectivity reject is the UE-Initiated mode, the UE 10 may perform the PDN connectivity procedure including the Network-Initiated mode. Alternatively, when the eighth identification information included in the PDN connectivity reject is the Network-Initiated mode, the UE 10 may perform the PDN connectivity procedure including the UE-Initiated mode.

Note that when UE 10 does not receive the seventh identification information and/or when there is no any other operation mode allowed for the PDN connection and/or when the establishment of the PDN connection of the other operation mode is not requested, the UE 10 need not newly initiate the PDN connectivity procedure.

Note that details of the PDN connectivity procedure may be similar to those of the PDN connectivity procedure described with reference to FIG. 16 in 1.4.1. Example of First PDN Connectivity Procedure. Therefore, detailed description will be omitted.

After the second PDN connectivity procedure is completed, the UE 10 and the PGW 30 establish the first PDN connection of a mode different from the NBIFOM operation mode that the UE 10 initially requests. Upon the establishment of the first PDN connection, the UE 10 and the PGW 30 determine a PDN connection and/or a transfer path (such as an EPS bearer) for transmitting/receiving the IP flow by using the TFT, and transmit/receive user data corresponding to the IP flow identified on the basis of the TFT. More specifically, the UE 10 and the PGW 30 transmit/receive a flow identified on the basis of the TFT by using the first PDN connection.

Note that in the example of the second PDN connectivity procedure, a case has been described in which the transmission/reception of the TFT is included in the PDN connectivity procedure; however, the second PDN connectivity procedure is not limited to this case. The transmission/reception of the TFT may be performed after the multi-access PDN connection is established.

Therefore, the UE 10 and the TWAG 74 may transmit/receive the TFT without including the TFT in the PDN connectivity request and/or a PDN connectivity response (PDN connectivity accept), and establish the multi-access PDN connection. In other words, at a point in time when the PDN connection is established, there may be no IP flow transmitting/receiving user data by using the PDN connection. In this case, the UE 10 and the TWAG 74 transmit the TFT after the multi-access PDN connection is established.

More specifically, when the PDN connection of the UE-Initiated mode is established, the UE 10 may transmit the TFT to the TWAG 74. In addition, the TWAG 74 receives the TFT from the UE 10 and transmits the TFT to the PGW 30. Thus, the UE 10 and the PGW 30 can determine a PDN connection and/or a transfer path (such as an EPS bearer) for transmitting/receiving the IP flow by using the TFT, and transmit/receive user data corresponding to the IP flow identified on the basis of the TFT.

On the other hand, when the PDN connection of the Network-Initiated mode is established, the PGW 30 may transmit the TFT to the TWAG 74. Here, the PGW 30 may receive, from the PCRF 60, the TFT determined on the basis of the operator policy. In addition, the TWAG 74 receives the TFT from the PGW 30 and transmits the TFT to the UE 10. Thus, the UE 10 and the PGW 30 can determine a PDN connection and/or a transfer path (such as an EPS bearer) for transmitting/receiving the IP flow by using the TFT, and transmit/receive user data corresponding to the IP flow identified on the basis of the TFT.

1.4.3. Example of Third PDN Connectivity Procedure

An example of the third PDN connectivity procedure will be described with reference to FIG. 16.

As illustrated in (B) of FIG. 16, the UE 10 first performs the authentication procedure and the security association procedure for establishing the security association. Note that the UE 10 may perform the security association procedure when the initial state is the second initial state. In other words, when the initial state is the first initial state, the UE 10 need not perform the security association procedure. As described above, when the initial state is the first initial state, the UE 10 may omit the security association procedure since the security association has already been established.

Note that the security association procedure performed by the UE 10 may be similar to the security association procedure described in (A) of FIG. 15. Therefore, detailed description of the procedure will be omitted.

Next, the UE 10 transmits a PDN connectivity request to the TWAG 74 (S1902). The UE 10 may transmit the PDN connectivity request including at least the PDN connectivity request message identity (PDN connectivity request message ID), the Procedure transaction identity (Procedure transaction ID), the Request type (request type), and the PDN type. Furthermore, the UE 10 may include at least first identification information and/or fifth identification information in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit the PCO including the first identification information and/or fifth identification information and/or the TFT.

Here, the first identification information may be the UE NBIFOM capability representing that the UE 10 supports the NBIFOM. Note that the NBIFOM capability may be information indicating the possession of the function of establishing the multi-access PDN connection.

Furthermore, the fifth identification information may be a Mode Indication representing an NBIFOM operation mode for the multi-access PDN connection whose establishment is requested by the UE 10. Note that the UE 10 may include the UE-Initiated mode or the Network-Initiated mode in the fifth identification information.

Note that the first identification information may be the fifth identification information. More specifically, the UE 10 may represent, by transmitting the Mode Indication, that the UE 10 supports the NBIFOM.

As described above, the UE 10 may transmit the PDN connectivity request including the first identification information and/or fifth identification information to request the establishment of the multi-access PDN connection.

The PDN connectivity request message ID may be a message type representing the PDN connectivity request message.

The Procedure transaction ID may be information for identifying the PDN connectivity procedure.

The APN may be an APN to which the UE 10 requests a connection. More specifically, the APN may be the APN 1. The UE 10 may include the APN 1, in order to establish the multi-access PDN connection. Here, the APN 1 may be an APN that is allowed to establish the multi-access PDN connection and/or an APN that is allowed to perform communication based on the NBIFOM.

The request type may be information for identifying the type of the PDN connectivity procedure to be requested. For example, since the UE 10 performs an initial connection by using the APN 1, the request type may be the type indicating an attach, rather than the type indicating a handover.

The PDN type may indicate an available IP version. For example, the PDN type may be IPv4, IPv6, or IPv4v6. The PCO may be protocol information associated with the PDN connection. Furthermore, the PCO may include identification information on the request. Note that the UE 10 may transmit the PCO including the first identification information and/or fifth identification information.

The TFT may be information for identifying an IP flow that performs communication by using the PDN connection established in the present PDN connectivity procedure. Note that the IP flow to be identified may vary for each application. Thus, on the basis of the TFT, user data of a certain application can be identified.

More specifically, the TFT may be constituted of a five-tuple, or may be constituted of identification information such as the application ID. Note that the five-tuple may be constituted of a combination of one or more of a source IP address, a destination IP address, a source port number, a destination port number, and a protocol number.

When the UE 10 requests the establishment of the multi-access PDN connection of the UE-Initiated mode, the UE 10 may include the TFT in the PDN connectivity request. Alternatively, when the UE 10 requests the establishment of the multi-access PDN connection of the Network-Initiated mode, the UE 10 need not include the TFT in the PDN connectivity request.

In other words, when the UE 10 includes the UE-Initiated mode in the fifth identification information, the UE 10 may include the TFT in the PDN connectivity request. Alternatively, when the UE 10 includes the Network-Initiated mode in the fifth identification information, the UE 10 need not include the TFT in the PDN connectivity request.

Note that conventionally, the UE 10 can perform transmission, with information indicating the IFOM support included in the PCO. Here, the IFOM support is identification information representing that the IP Flow Mobility (IFOM) is supported. Furthermore, the IFOM is a technique for switching a communication path of a certain IP flow by using the Dual Stack Mobile IPv6 (DSMIPv6) protocol. Thus, including the information indicating the IFOM support in the PCO allows the UE 10 to switch the access network through which the communication of a certain IP flow is performed.

In the present embodiment, when the UE 10 includes the first identification information and/or fifth identification information in the PCO, the UE 10 does not include the IFOM support. In contrast, when the UE 10 includes the IFOM support in the PCO, the UE 10 does not include either the first identification information or the fifth identification information. As described above, it may be possible to not configure both the first identification information and/or fifth identification information and the IFOM support to be effective to ensure a clear distinction between the use of the switching of the communication path based on the NBIFOM and the use of the switching of the communication path based on the IFOM.

Thus, the UE 10 can establish either the PDN connection supporting the IFOM or the PDN connection supporting the NBIFOM, in the establishment procedure of a single PDN connection. In other words, the single PDN connection is any one of the PDN connection supporting the NBIFOM, the PDN connection supporting the IFOM, or the single-access PDN connection.

The TWAG 74 receives the PDN connectivity request transmitted from the UE 10. Upon the reception of the PDN connectivity request, and/or on the basis of the first identification information included in the PDN connectivity request and/or the fifth identification information included in the PDN connectivity request, the TWAG 74 transmits a create session request to the PGW 30 (S1904).

Upon the reception of the PDN connectivity request and/or on the basis of the first identification information included in the PDN connectivity request, the TWAG 74 may transmit the create session request including at least the first identification information.

Upon the reception of the PDN connectivity request and/or on the basis of the fifth identification information included in the PDN connectivity request, the TWAG 74 may transmit the create session request including at least the fifth identification information. The TWAG 74 may include the TFT in the create session request, upon the reception of the TFT transmitted from the UE 10.

Furthermore, the TFT may be information for identifying an IP flow that performs communication by using the PDN connection established in the present PDN connectivity procedure. Note that the IP flow to be identified may vary for each application. Thus, on the basis of the TFT, user data of a certain application can be identified.

More specifically, the TFT may be constituted of a five-tuple, or may be constituted of identification information such as the application ID. Note that the five-tuple may be constituted of a combination of one or more of a source IP address, a destination IP address, a source port number, a destination port number, and a protocol number.

When the TWAG 74 requests the establishment of the multi-access PDN connection of the UE-Initiated mode, the TWAG 74 may include the TFT in the create session request. Alternatively, when the TWAG 74 requests the establishment of the multi-access PDN connection of the Network-Initiated mode, the TWAG 74 need not include the TFT in the create session request.

In other words, when the UE-Initiated mode is included in the first identification information and/or fifth identification information included in the PDN connectivity request, the TWAG 74 may include the TFT in the create session request. Alternatively, when the Network-Initiated mode is included in the first identification information and/or fifth identification information included in the PDN connectivity request, the TWAG 74 need not include the TFT in the create session request.

Here, the TWAG 74 may determine, on the basis of the first identification information and/or the fifth identification information, whether to request the establishment of the multi-access PDN connection of the UE-Initiated mode or request the establishment of the multi-access PDN connection of the Network-Initiated mode.

Note that when the first identification information is not included in the PDN connectivity request, the TWAG 74 may transmit the create session request without including the first identification information. Furthermore, when the fifth identification information is not included in the PDN connectivity request, the TWAG 74 may transmit the create session request without including the fifth identification information. Moreover, when neither the first identification information nor the fifth identification information is included in the PDN connectivity request, the TWAG 74 may perform a procedure for establishing the single-access PDN connection.

The PGW 30 receives the create session request transmitted from the TWAG 74. Upon the reception of the create session request, and/or on the basis of the first identification information and/or fifth identification information included in the create session request, the PGW 30 may perform an IP-CAN session update procedure with the PCRF 60.

The PGW 30 may transmit, to the PCRF 60, a control message in the IP-CAN session procedure, including information indicating whether the PDN connection to be established is the multi-access PDN connection or the single-access PDN connection, and/or the first identification information and/or fifth identification information.

More specifically, when the multi-access PDN connection is to be established, the PGW 30 transmits, to the PCRF 60, the information indicating the access network B, the PDN connection ID, the information indicating that the PDN connection is the multi-access PDN connection, and the first identification information and/or fifth identification information. Alternatively, when the single-access PDN connection is to be established, the PGW 30 transmits, to the PCRF 60, the information indicating the access network B, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

Note that the PGW 30 may perform the IP-CAN session update procedure to notify the PCRF 60 of information on the UE 10 and/or TWAG 74.

Furthermore, upon the reception of the first identification information and/or fifth identification information, the PCRF 60 may transmit, to the PGW 30, a control message in the IP-CAN session update procedure with the PGW 30, the control message including at least the seventh identification information. The detailed description of the seventh identification information will be described later.

Note that the PCRF 60 may perform the IP-CAN session update procedure to notify the PGW 30 of the charging information and/or the QoS control information and/or the routing information.

Upon the reception of the create session request or the completion of the IP-CAN session update procedure, and/or on the basis of the first identification information and/or fifth identification information included in the create session request, and/or on the basis the seventh identification information included in the IP-CAN session update procedure, the PGW 30 transmits a create session response to the TWAG 74 (S1906).

Upon the reception of the create session request or the completion of the IP-CAN session update procedure, and/or on the basis of the first identification information and/or fifth identification information included in the create session request, and/or on the basis of the seventh identification information included in the IP-CAN session update procedure, the PGW 30 may transmit the create session response including at least the seventh identification information.

Note that a method by which the PGW 30 acquires the seventh identification information is not limited to the above-described method for acquiring the seventh identification information from the PCRF 60 in the IP-CAN session update procedure, and another example may be employed. For example, the PGW 30 may create the seventh identification information and transmit the create session response including the seventh identification information, without acquiring the seventh identification information from the PCRF 60 in the IP-CAN session update procedure.

Here, the seventh identification information may be the Allowed Mode representing the NBIFOM operation mode that is allowed for the multi-access PDN connection to be established. In other words, the fifth identification information is an operation mode requested by the UE 10, whereas the seventh identification information may be an operation mode allowed by the operator.

Note that the PCRF 60 or the PGW 30 may determine the Allowed Mode and the seventh identification information on the basis of the operator policy. For example, a policy that allows for the establishment of only the PDN connection of the UE-Initiated mode, a policy that allows for the establishment of only the PDN connection of the Network-Initiated mode, a policy that allows for the establishment of both modes, a policy that prohibits the establishment of both modes, and the like may be managed.

Note that the PCRF 60 or the PGW 30 may acquire the operator policy from the HSS or the like. Alternatively, an operator policy created by an administrator may be stored.

In addition, for the operator policy, a policy different for each subscriber may be managed. Alternatively, a policy different for each APN may be managed. For example, for each APN, a different Allowed Mode for the PDN connection to be established may be managed.

In the present example, on the basis of the Allowed Mode, a case will be described in which the establishment of the PDN connection of the NBIFOM operation mode included in the fifth identification information is not allowed.

Thus, the PCRF 60 or the PGW 30 does not allow for the establishment of the PDN connection based on the NBIFOM operation mode included in the fifth identification information, and includes, in the seventh identification information, an operation mode that is allowed by the Allowed Mode and is different from the fifth identification information.

In other words, when the UE-Initiated mode is included in the fifth identification information and the Network-Initiated mode is allowed, the PCRF 60 or the PGW 30 may include the Network-Initiated mode in the seventh identification information. Alternatively, when the Network-Initiated mode is included in the fifth identification information and the UE-Initiated mode is allowed, the PCRF 60 or the PGW 30 may include the UE-Initiated mode in the seventh identification information.

When the establishment of the PDN connection based on the operation mode different from the fifth identification information is not allowed, the PCRF 60 need not notify the PGW 30 of the seventh identification information.

When the establishment of the PDN connection based on the operation mode different from the fifth identification information is not allowed, the PCRF 60 may notify the PGW 30 that there is no allowed operation.

When the establishment of the PDN connection based on the operation mode different from the fifth identification information is not allowed, the PCRF 60 may transmit, to the PGW 30, the cause information indicating that the requested operation mode is not allowed.

When the establishment of the PDN connection based on the operation mode different from the fifth identification information is not allowed, the PGW 30 need not notify the TWAG 74 of the seventh identification information.

When the establishment of the PDN connection based on the operation mode different from the fifth identification information is not allowed, the PGW 30 may transmit, to the TWAG 74, the create session response including the cause information indicating that the requested operation mode is not allowed.

When the establishment of the PDN connection based on the operation mode different from the fifth identification information is not allowed, the PGW 30 may notify the TWAG 74 that there is no allowed operation.

As described above, on the basis of the Allowed Mode, when the establishment of the PDN connection of the NBIFOM operation mode included in the fifth identification information is not allowed, an operation mode that is other than the NBIFOM operation mode included in the fifth identification information and is allowed to establish the PDN connection may be regarded as the seventh identification information on the basis of the Allowed Mode.

Furthermore, the PGW 30 may include the PDN Address (PDN address) and/or the PDN connection ID and/or the TFT in the create session response.

The PDN Address may be an IP address assigned to the UE 10. For example, the PDN Address may be an IPv4 address, or an IPv6 prefix and an interface ID for constituting an IPv6 address. Here, the PGW 30 may assign the IP address of the UE 10. Moreover, the PGW 30 may include the IP address assigned to the UE 10 in the PDN Address.

Furthermore, the PDN connection ID may be information for uniquely identifying the PDN connection established between the UE 10 and the PGW 30. The PDN connection ID may be assigned by the PGW 30, or may be assigned by the TWAG 74. In other words, the PGW 30 may assign the PDN connection ID.

The TWAG 74 receives the create session response transmitted from the PGW 30. Upon the reception of the create session response and/or on the basis of the seventh identification information included in the create session response, the TWAG 74 transmits a PDN connectivity accept to the UE 10 (S1908).

Upon the reception of the create session response and/or on the basis of the seventh identification information included in the create session response, the TWAG 74 may transmit the PDN connectivity accept including at least a PDN connectivity accept message identity (PDN connectivity accept message ID), the Procedure transaction ID, the APN, the PDN Address (PDN address), the PDN connection ID, and the User Plane Connection ID (user plane connection ID). Furthermore, the TWAG 74 may include at least the seventh identification information in the PDN connectivity accept. Moreover, the TWAG 74 may include the PCO and/or the Cause and/or the TFT and/or the PDN connection attribute information, in the PDN connectivity accept. Note that the TWAG 74 may transmit the PCO including the seventh identification information and/or the TFT.

Here, the PDN connectivity accept message ID may be a message type representing the PDN connectivity accept message.

The APN may be an APN to which the UE 10 is allowed to connect. More specifically, the APN may be the APN 1. The APN 1 may be an APN that is allowed to establish the multi-access PDN connection. The TWAG 74 may include the APN 1 in the PDN connectivity accept.

The PDN Address may be an IP address assigned to the UE 10. For example, the PDN Address may be an IPv4 address, or an interface ID for constituting an IPv6 address.

The PDN connection ID may be information for uniquely identifying the PDN connection established between the UE 10 and the PGW 30. The PDN connection ID may be an ID assigned by the PGW 30, or an ID assigned by the TWAG 74. In other words, the TWAG 74 may assign the PDN connection ID.

The User Plane Connection ID is information for identifying a user plane. The user plane is a transfer path used for transferring user data in the PDN connection. The TWAG 74 may assign the User Plane Connection ID.

The Cause may include information representing that the PDN type of the PDN Address assigned to the UE 10 is different from the PDN type requested by the UE 10 in the PDN connectivity request. Additionally/alternatively, the Cause may include information representing that the PDN connection established in the present PDN connectivity procedure is the multi-access PDN connection of an NBIFOM operation mode different from the NBIFOM operation mode requested by the UE 10.

Note that the TWAG 74 and/or the PGW 30 may include the seventh identification information in the PCO. However, when the TWAG 74 and/or the PGW 30 includes the seventh identification information in the PCO, the TWAG 74 and/or the PGW 30 does not include the IFOM support. In contrast, when the TWAG 74 and/or the PGW 30 includes the IFOM support in the PCO, the TWAG 74 and/or the PGW 30 does not include the seventh identification information. As described above, it may be possible to not configure both the seven identification information and the IFOM support to be effective to ensure a clear distinction between the use of the switching of the communication path on the basis of the NBIFOM and the use of the switching of the communication path on the basis of the IFOM.

The PDN connection attribute information may be information indicating that the PDN connection established in the present PDN connectivity procedure is the multi-access PDN connection, and/or information indicating that user data transmitted/received by using the PDN connection established in the PDN connection the present PDN connectivity procedure is allowed to be transmitted/received through the access network A and the access network B, and/or information indicating that the PDN connection established in the present PDN connectivity procedure is the multi-access PDN connection of the operation mode indicated by the seventh identification information.

Note that the UE 10 may transmit the PDN connectivity accept message that further includes the connectivity type indicating the type of the PDN connection and/or the WLAN offload permission information (WLAN offload acceptability) indicating whether or not the WLAN offload can be performed. Furthermore, the TWAG 74 may transmit the connectivity type or the WLAN offload permission information including the PDN connection attribute information.

The UE 10 receives the PDN connectivity accept transmitted from the TWAG 74. Upon the reception of the PDN connectivity accept and/or on the basis of the seventh identification information included in the PDN connectivity accept, the UE 10 may transmit a PDN connectivity complete to the TWAG 74 (S1910).

The UE 10 may transmit the PDN connectivity complete including at least the PDN connectivity complete message ID (PDN connectivity complete), the Procedure transaction ID, and the PDN connection ID.

Here, the PDN connectivity complete message ID may be the message type representing the PDN connectivity complete message.

After the third PDN connectivity procedure is completed, the UE 10 and the PGW 30 establish the first PDN connection of a mode different from the NBIFOM operation mode requested by the UE 10. Upon the reception of the PDN connectivity accept, and/or on the basis of the PDN connection attribute information and/or the seventh identification information and/or the Cause, the UE 10 may identify that the established PDN connection is the multi-access PDN connection of an operation mode different from the NBIFOM operation mode requested by the UE 10. Upon the establishment of the first PDN connection, the UE 10 and the PGW 30 determine a PDN connection and/or a transfer path (such as an EPS bearer) for transmitting/receiving the IP flow by using the TFT, and transmit/receive user data corresponding to the IP flow identified on the basis of the TFT. More specifically, the UE 10 and the PGW 30 transmit/receive a flow identified on the basis of the TFT by using the first PDN connection.

Note that in the example of a sixth PDN connectivity procedure, a case has been described in which the transmission/reception of the TFT is included in the PDN connectivity procedure; however, the sixth PDN connectivity procedure is not limited to this case. The transmission/reception of the TFT may be performed after the multi-access PDN connection is established.

Therefore, the UE 10 and the TWAG 74 may perform transmission/reception without including the TFT in the PDN connectivity request and/or the PDN connectivity response (PDN connectivity accept), and establish the multi-access PDN connection. In other words, at a point in time when the PDN connection is established, there may be no IP flow transmitting/receiving user data by using the PDN connection. In this case, the UE 10 and the TWAG 74 transmit the TFT after the multi-access PDN connection is established.

More specifically, when the PDN connection of the UE-Initiated mode is established, the UE 10 may transmit the TFT to the TWAG 74. In addition, the TWAG 74 receives the TFT from the UE 10 and transmits the TFT to the PGW 30. Thus, the UE 10 and the PGW 30 can determine a PDN connection and/or a transfer path (such as an EPS bearer) for transmitting/receiving the IP flow by using the TFT, and transmit/receive user data corresponding to the IP flow identified on the basis of the TFT.

On the other hand, when the PDN connection of the Network-Initiated mode is established, the PGW 30 may transmit the TFT to the TWAG 74. Here, the PGW 30 may receive, from the PCRF 60, the TFT determined on the basis of the operator policy. In addition, the TWAG 74 receives the TFT from the PGW 30 and transmits the TFT to the UE 10. Thus, the UE 10 and the PGW 30 can determine a PDN connection and/or a transfer path (such as an EPS bearer) for transmitting/receiving the IP flow by using the TFT, and transmit/receive user data corresponding to the IP flow identified on the basis of the TFT.

Furthermore, in the example of the third PDN connectivity procedure, a case has been described in which the UE 10 and the PGW 30 establish the first PDN connection of a mode different from the NBIFOM operation mode requested by the UE 10; however, the third PDN connectivity procedure is not limited to this case. The UE 10 may reject the establishment of the first PDN connection of the NBIFOM operation mode different from the request.

For example, when the UE 10 does not support the NBIFOM operation mode for the established first PDN connection and/or when the NBIFOM operation mode for the established first PDN connection does not comply with the policy of the UE 10, the UE 10 may reject the establishment of the first PDN connection of the NBIFOM operation mode different from the request.

In greater detail, the UE 10 may transmit a PDN connectivity reject to the TWAG 74, upon the reception of the PDN connectivity accept, and/or on the basis of the seventh identification information included in the PDN connectivity accept and/or the PDN connection attribute information and/or the policy of the UE 10.

The UE 10 may transmit the PDN connectivity reject including at least one or more of the PDN connectivity reject message identity (PDN connectivity reject message ID), the Procedure transaction ID, and the Cause. Furthermore, the UE 10 may include the fourth identification information in the PDN connectivity reject. Moreover, the UE 10 may include the PCO and/or the Tw1 value in the PDN connectivity reject. Note that the UE 10 may transmit the PCO including the fourth identification information.

The fourth identification information may be information representing that the UE 10 does not support the NBIFOM operation mode for the established first PDN connection and/or information representing that the NBIFOM operation mode for the established first PDN connection does not comply with the policy of the UE 10.

The PDN connectivity reject message ID may be a message type representing the PDN connectivity reject message.

The Cause may be information representing a reason why the PDN connectivity request is rejected. Here, the UE 10 may notify the UE 10 of the fourth identification information included in the Cause.

The Tw1 value may be a value of the Tw1 timer, included when the Cause represents insufficient resources.

The TWAG 74 may receive the PDN connectivity reject transmitted from the UE 10. Upon the reception of the PDN connectivity reject and/or on the basis of the fourth identification information included in the PDN connectivity reject, the TWAG 74 may delete the EPS bearer context, held by the TWAG 74, relating to the established PDN connection. Furthermore, the TWAG 74 may transmit, to the PGW 30, the fourth identification information included in the PDN connectivity reject.

The PGW 30 may receive the fourth identification information transmitted from the TWAG 74. Upon the reception of the fourth identification information and/or on the basis of the operator policy, the PGW 30 may delete the EPS bearer context, held by the PGW 30, relating to the established PDN connection.

Furthermore, the PGW 30 may perform the IP-CAN session update procedure with the PCRF 60, upon the reception of the fourth identification information. The PGW 30 may include the fourth identification information in the IP-CAN session update procedure.

The PCRF 60 may change the operator policy on the basis of the IP-CAN session update procedure. Note that on the basis of the change of the operator policy, the PGW 30 may delete the EPS bearer context, held by the PGW 30, relating to the established PDN connection.

1.4.4. Example of Fourth PDN Connectivity Procedure

An example of the fourth PDN connectivity procedure will be described with reference to FIG. 18.

Figure 18:
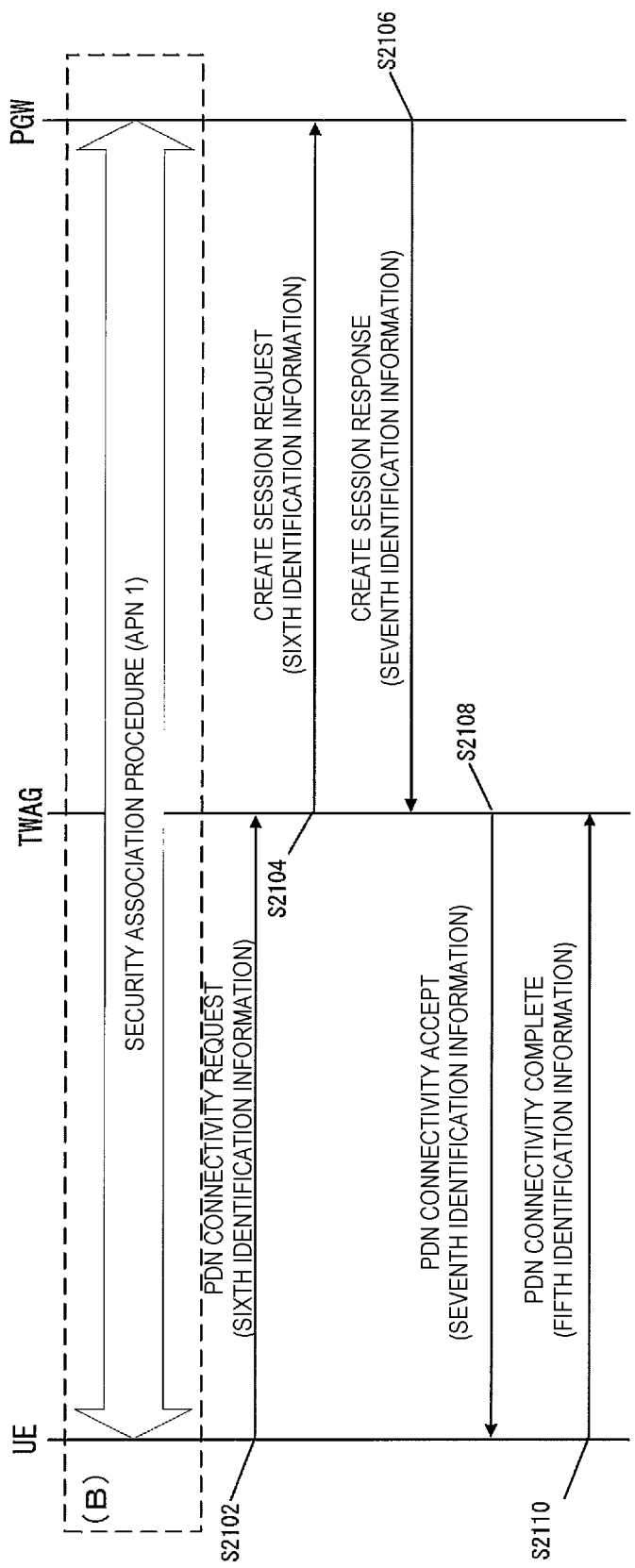
FIG. 18 is a diagram illustrating a fourth PDN connectivity procedure.

As illustrated in (B) of FIG. 18, the UE 10 first performs the authentication procedure and the security association procedure for establishing the security association. Note that the UE 10 may perform the security association procedure when the initial state is the second initial state. In other words, when the initial state is the first initial state, the UE 10 need not perform the security association procedure. As described above, when the initial state is the first initial state, the UE 10 may omit the security association procedure since the security association has already been established.

Note that the security association procedure performed by the UE 10 may be similar to the security association procedure described in (A) of FIG. 15. Therefore, detailed description of the procedure will be omitted.

Next, the UE 10 transmits a PDN connectivity request to the TWAG 74 (S2102). The UE 10 may transmit the PDN connectivity request including at least the PDN connectivity request message identity (PDN connectivity request message ID), the Procedure transaction identity (Procedure transaction ID), the Request type (request type), and the PDN type. Furthermore, the UE 10 may include at least the first identification information and/or sixth identification information in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit the PCO including the first identification information and/or the sixth identification information and/or the TFT.

Here, the first identification information may be the UE NBIFOM capability representing that the UE 10 supports the NBIFOM. Note that the NBIFOM capability may be information indicating the possession of the function of establishing the multi-access PDN connection.

In addition, the sixth identification information may be a Request NBIFOM representing that a request to determine the NBIFOM operation mode for the multi-access PDN connection. Additionally/alternatively, the sixth identification information may be information representing that a request for an NBIFOM operation mode allowed for the multi-access PDN connection to be established.

As described above, the UE 10 may transmit the PDN connectivity request including the first identification information and/or sixth identification information to request the establishment of the multi-access PDN connection, without requesting a certain NBIFOM operation mode.

The PDN connectivity request message ID may be a message type representing the PDN connectivity request message.

The Procedure transaction ID may be information for identifying the PDN connectivity procedure.

The APN may be an APN to which the UE 10 requests a connection. More specifically, the APN may be the APN 1. The UE 10 may include the APN 1, in order to establish the multi-access PDN connection. Here, the APN 1 may be an APN that is allowed to establish the multi-access PDN connection and/or an APN that is allowed to perform communication based on the NBIFOM.

The request type may be information for identifying the type of the PDN connectivity procedure to be requested. For example, since the UE 10 performs an initial connection by using the APN 1, the request type may be the type indicating an attach, not the type indicating a handover.

The PDN type may indicate an available IP version. For example, the PDN type may be IPv4, IPv6, or IPv4v6.

The PCO may be protocol information associated with the PDN connection. Furthermore, the PCO may include identification information on the request. Note that the UE 10 may transmit the PCO including the first identification information and/or the sixth identification information.

The TFT may be information for identifying an IP flow that performs communication by using the PDN connection established in the present PDN connectivity procedure. Note that the IP flow to be identified may vary for each application. Thus, on the basis of the TFT, user data of a certain application can be identified.

More specifically, the TFT may be constituted of a five-tuple, or may be constituted of identification information such as the application ID. Note that the five-tuple may be constituted of a combination of one or more of a source IP address, a destination IP address, a source port number, a destination port number, and a protocol number.

Note that in the present example, when transmitting the PDN connectivity request, the UE 10 does not request a certain NBIFOM operation mode, and thus, the UE 10 may transmit the PDN connectivity request without including the TFT. In other words, when the UE 10 requests the establishment of the multi-access PDN connection without requesting the certain NBIFOM operation mode, the UE 10 may transmit the PDN connectivity request without including the TFT. More specifically, when the UE 10 includes the first identification information and/or the sixth identification information, the UE 10 may transmit the PDN connectivity request without including the TFT. Note that conventionally, the UE 10 can perform transmission with information indicating the IFOM support included in the PCO. Here, the IFOM support is identification information representing that the IP Flow Mobility (IFOM) is supported. Furthermore, the IFOM is a technique for switching a communication path of a certain IP flow by using the Dual Stack Mobile IPv6 (DSMIPv6) protocol. Thus, including the information indicating the IFOM support in the PCO allows the UE 10 to switch the access network through which the communication of a certain IP flow is performed.

In the present embodiment, when the UE 10 includes the first identification information and the sixth identification information in the PCO, the UE 10 does not include the IFOM support. In contrast, when the UE 10 includes the IFOM support in the PCO, the UE 10 does not include the first identification information and/or the sixth identification information. As described above, it may be possible to not configure both the first identification information and/or sixth identification information and the IFOM support to be effective to ensure a clear distinction between the use of the switching of the communication path on the basis of the NBIFOM and the use of the switching of the communication path on the basis of the IFOM.

Thus, the UE 10 can establish either the PDN connection supporting the IFOM or the PDN connection supporting the NBIFOM, in the establishment procedure of a single PDN connection. In other words, the single PDN connection is any one of the PDN connection supporting the NBIFOM, the PDN connection supporting the IFOM, or the single-access PDN connection.

The TWAG 74 receives the PDN connectivity request transmitted from the UE 10. Upon the reception of the PDN connectivity request and/or on the basis of the first identification information and/or sixth identification information included in the PDN connectivity request, the TWAG 74 transmits a create session request to the PGW 30 (S2104).

Upon the reception of the PDN connectivity request and/or on the basis of the first identification information and/or sixth identification information included in the PDN connectivity request, the TWAG 74 may transmit the create session request including at least the first identification information and/or sixth identification information. Furthermore, the TWAG 74 may include the TFT in the create session request, upon the reception of the TFT transmitted from the UE 10.

Furthermore, the TFT may be information for identifying an IP flow that performs communication by using the PDN connection established in the present PDN connectivity procedure. Note that the IP flow to be identified may vary for each application. Thus, on the basis of the TFT, user data of a certain application can be identified.

More specifically, the TFT may be constituted of a five-tuple, or may be constituted of identification information such as the application ID. Note that the five-tuple may be constituted of a combination of one or more of a source IP address, a destination IP address, a source port number, a destination port number, and a protocol number.

Note that when neither the first identification information nor the sixth identification information is included in the PDN connectivity request, the TWAG 74 may transmit the create session request without including the first identification information and/or the sixth identification information. Moreover, when the first identification information and/or the sixth identification information is not included in the PDN connectivity request, the TWAG 74 may perform a procedure for establishing the single-access PDN connection.

The PGW 30 receives the create session request transmitted from the TWAG 74. Upon the reception of the create session request, and/or on the basis of the first identification information and/or sixth identification information included in the create session request, the PGW 30 may perform the IP-CAN session update procedure with the PCRF 60.

Upon the reception of the create session request and/or on the basis of the first identification information and/or sixth identification information included in the create session request, the PGW 30 may perform the IP-CAN session update procedure including at least the first identification information and/or the sixth identification information.

Note that the PGW 30 may perform the IP-CAN session update procedure to notify the PCRF 60 of information on the UE 10 and/or TWAG 74.

The PGW 30 may transmit, to the PCRF 60, a control message in the IP-CAN session procedure, including information indicating whether the PDN connection to be established is the multi-access PDN connection or the single-access PDN connection, and/or the first identification information, and/or the sixth identification information.

More specifically, when the multi-access PDN connection is to be established, the PGW 30 transmits, to the PCRF 60, the information indicating the access network B, the PDN connection ID, the information indicating that the PDN connection is the multi-access PDN connection, and the first identification information and/or sixth identification information. Alternatively, when the single-access PDN connection is to be established, the PGW 30 transmits, to the PCRF 60, the information indicating the access network B, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

Furthermore, upon the reception of the first identification information and/or on the basis of sixth identification information, the PCRF 60 may transmit, to the PGW 30, a control message in the IP-CAN session update procedure with the PGW 30, the control message including at least the seventh identification information. The detailed description of the seventh identification information will be described later.

Note that the PCRF 60 may perform the IP-CAN session update procedure to notify the PGW 30 of the charging information and/or the QoS control information and/or the routing information.

Upon the reception of the create session request or the completion of the IP-CAN session update procedure, and/or on the basis of the first identification information and/or sixth identification information included in the create session request and/or the seventh identification information included in the IP-CAN session update procedure, the PGW 30 transmits a create session response to the TWAG 74 (S2106).

Upon the reception of the create session request or the completion of the IP-CAN session update procedure, and/or on the basis of the first identification information and/or sixth identification information included in the create session request and/or the seventh identification information included in the IP-CAN session update procedure, the PGW 30 may transmit the create session response including at least the seventh identification information.

Furthermore, the PGW 30 may include the PDN Address (PDN address) and/or the PDN connection ID and/or the TFT in the create session response.

Note that a method by which the PGW 30 acquires the seventh identification information is not limited to the above-described method for acquiring the seventh identification information from the PCRF 60 in the IP-CAN session update procedure, and another example may be employed. For example, the PGW 30 may create the seventh identification information and transmit the create session response including the seventh identification information, without acquiring the seventh identification information from the PCRF 60 in the IP-CAN session update procedure.

Here, the seventh identification information may be the Allowed Mode representing the NBIFOM operation mode that is allowed for the multi-access PDN connection to be established. In other words, the seventh identification information may be an operation mode allowed by the operator.

Note that the PCRF 60 or the PGW 30 may determine the Allowed Mode and the seventh identification information on the basis of the operator policy. For example, a policy that allows the establishment of only the PDN connection of the UE-Initiated mode, a policy that allows the establishment of only the PDN connection of the Network-Initiated mode, a policy that allows the establishment of both modes, a policy that prohibits the establishment of both modes, and the like may be managed.

Note that the PCRF 60 or the PGW 30 may acquire the operator policy from the HSS or the like. Alternatively, an operator policy created by an administrator may be stored.

In addition, for the operator policy, a policy different for each subscriber may be managed. Alternatively, a policy different for each APN may be managed. For example, for each APN, a different Allowed Mode for the PDN connection to be established may be managed.

On the basis of the Allowed Mode, the PCRF 60 or the PGW 30 may include the allowed operation mode in the seventh identification information.

In other words, when only the Network-Initiated mode is allowed, the PCRF 60 or the PGW 30 may include the Network-Initiated mode in the seventh identification information. Alternatively, when only the UE-Initiated mode is allowed, the PCRF 60 or the PGW 30 may include the UE-Initiated mode in the seventh identification information.

Note that when both the UE-Initiated mode and the Network-Initiated mode are allowed, the seventh identification information may include both the operation modes. Alternatively, when both the UE-Initiated mode and the Network-Initiated mode are allowed and a default operation mode is configured, the seventh identification information may include only the default operation mode. Note that which of the UE-Initiated mode and the Network-Initiated mode is defined as the default operation mode may be configured on the basis of the operator policy.

Note that, when none of the operation modes is allowed for establishment of the PDN connection, the PCRF 60 may transmit, to the PGW 30, the cause information indicating that the requested operation mode is not allowed.

When none of the operation modes is allowed for establishment of the PDN connection, the PGW 30 need not notify the TWAG 74 of the seventh identification information.

When none of the operation modes is allowed for establishment of the PDN connection, the PGW 30 may transmit, to the TWAG 74, the create session response including the cause information indicating that the requested operation mode is not allowed.

When none of the operation modes is allowed for establishment of the PDN connection, the PGW 30 may notify the TWAG 74 that there is no allowed operation.

As described above, on the basis of the Allowed Mode, the PCRF 60 or the PGW 30 may regard an operation mode that is allowed for establishment of the PDN connection as the seventh identification information.

Note that when the Network-Initiated mode is not included in the seventh identification information, the PCRF 60 need not transmit the TFT to the PGW 30.

In other words, note that only when the Network-Initiated mode is included in the seventh identification information, the PCRF 60 may transmit the TFT to the PGW 30.

Note that when the Network-Initiated mode is not included in the seventh identification information, the PGW 30 need not transmit the TFT to the TWAG 74. Thus, in this case, the PGW 30 need not include the TFT in the create session response.

In other words, note that only when the Network-Initiated mode is included in the seventh identification information, the PGW 30 may transmit the TFT to the TWAG 74. Thus, in this case, the PGW 30 may include the TFT in the create session response.

The PDN Address may be an IP address assigned to the UE 10. For example, the PDN Address may be an IPv4 address, or an IPv6 prefix and an interface ID for constituting an IPv6 address. Here, the PGW 30 may assign the IP address of the UE 10. Moreover, the PGW 30 may include the IP address assigned to the UE 10 in the PDN Address.

Furthermore, the PDN connection ID may be information for uniquely identifying the PDN connection established between the UE 10 and the PGW 30. The PDN connection ID may be assigned by the PGW 30, or may be assigned by the TWAG 74. In other words, the PGW 30 may assign the PDN connection ID.

The TWAG 74 receives the create session response transmitted from the PGW 30. Upon the reception of the create session response and/or on the basis of the seventh identification information included in the create session response, the TWAG 74 transmits a PDN connectivity accept to the UE 10 (S2108).

Upon the reception of the create session response and/or on the basis of the seventh identification information included in the create session response, the TWAG 74 may transmit the PDN connectivity accept including at least a PDN connectivity accept message identity (PDN connectivity accept message ID), the Procedure transaction ID, the APN, the PDN Address (PDN address), the PDN connection ID, and the User Plane Connection ID (user plane connection ID). Furthermore, the TWAG 74 may include at least the seventh identification information in the PDN connectivity accept. Moreover, the TWAG 74 may include the PCO and/or the Cause and/or the TFT and/or the PDN connection attribute information, in the PDN connectivity accept. Note that the TWAG 74 may transmit the PCO including the seventh identification information and/or the TFT.

Here, the PDN connectivity accept message ID may be a message type representing the PDN connectivity accept message.

The APN may be an APN to which the UE 10 is allowed to connect. More specifically, the APN may be the APN 1. The APN 1 may be an APN that is allowed to establish the multi-access PDN connection. The TWAG 74 may include the APN 1 in the PDN connectivity accept.

The PDN Address may be an IP address assigned to the UE 10. For example, the PDN Address may be an IPv4 address, or an interface ID for constituting an IPv6 address.

The PDN connection ID may be information for uniquely identifying the PDN connection established between the UE 10 and the PGW 30. The PDN connection ID may be an ID assigned by the PGW 30, or an ID assigned by the TWAG 74. In other words, the TWAG 74 may assign the PDN connection ID.

The User Plane Connection ID is information for identifying a user plane. The user plane is a transfer path used for transferring user data in the PDN connection. The TWAG 74 may assign the User Plane Connection ID.

The Cause may be information representing that the PDN type of the PDN Address assigned to the UE 10 is different from the PDN type requested by the UE 10 in the PDN connectivity request.

Note that the TWAG 74 and/or the PGW 30 may include the seventh identification information in the PCO. However, when the TWAG 74 and/or the PGW 30 includes the seventh identification information in the PCO, the TWAG 74 and/or the PGW 30 does not include the IFOM support. In contrast, when the TWAG 74 and/or the PGW 30 includes the IFOM support in the PCO, the TWAG 74 and/or the PGW 30 does not include the seventh identification information. As described above, it may be possible to not configure both the seven identification information and the IFOM support to be effective to ensure a clear distinction between the use of the switching of the communication path on the basis of the NBIFOM and the use of the switching of the communication path on the basis of the IFOM.

The PDN connection attribute information may be information indicating that the PDN connection established in the present PDN connectivity procedure is the multi-access PDN connection, and/or information indicating that user data transmitted/received by using the PDN connection established in the PDN connection the present PDN connectivity procedure is allowed to be transmitted/received through the access network A and the access network B, and/or when there is only one operation mode indicated by the seventh identification information, information indicating that the PDN connection established in the present PDN connectivity procedure is the multi-access PDN connection of the operation mode indicated by the seventh identification information.

Note that the UE 10 may transmit the PDN connectivity accept message that further includes the connectivity type indicating the type of the PDN connection and/or the WLAN offload permission information (WLAN offload acceptability) indicating whether or not the WLAN offload can be performed. Furthermore, the TWAG 74 may transmit the connectivity type or the WLAN offload permission information including the PDN connection attribute information.

The UE 10 receives the PDN connectivity accept transmitted from the TWAG 74. Upon the reception of the PDN connectivity accept and/or on the basis of the seventh identification information included in the PDN connectivity accept, the UE 10 transmits a PDN connectivity complete to the TWAG 74 (S2110).

The UE 10 may transmit the PDN connectivity complete including at least the PDN connectivity complete message ID (PDN connectivity complete), the Procedure transaction ID, and the PDN connection ID.

Furthermore, when multiple INFOM operation modes are included in the seventh identification information, the UE 10 may include at least the fifth identification information in the PDN connectivity complete. In other words, when multiple INFOM operation modes are allowed, the UE 10 may select one of the allowed modes and transmit the fifth identification information including the selected mode.

Here, the fifth identification information may be the Mode Indication representing an NBIFOM operation mode for the multi-access PDN connection whose establishment is requested by the UE 10. Note that the UE 10 may include the UE-Initiated mode or the Network-Initiated mode in the fifth identification information.

Specifically, when the UE-Initiated mode and the Network-Initiated mode are included in the seventh identification information included in the PDN connectivity accept, the UE 10 may include the UE-Initiated mode or the Network-Initiated mode in the fifth identification information.

Which of the UE-Initiated mode and the Network-Initiated mode is to be included in the fifth identification information may be determined on the basis of a UE policy. Note that the UE policy may be any information configured for the UE 10. For example, the UE policy may be information configured by a user.

The PDN connectivity complete message ID may be a message type representing the PDN connectivity complete message.

After the fourth PDN connectivity procedure is completed, the UE 10 and the PGW 30 establish the first PDN connection of the operation mode determined on the basis of the operator policy. Alternatively, the UE 10 establishes the first PDN connection of an operation mode selected from the operation modes allowed on the basis of the operator policy. Note that upon the reception of the PDN connectivity accept, and/or on the basis of the PDN connection attribute information and/or the seventh identification information and/or the operation mode selected on the basis of the seventh identification information, the UE 10 may identify the NBIFOM operation mode for the established PDN connection. Upon the establishment of the first PDN connection, the UE 10 and the PGW 30 determine a PDN connection and/or a transfer path (such as an EPS bearer) for transmitting/receiving the IP flow by using the TFT, and transmit/receive user data corresponding to the IP flow identified on the basis of the TFT. More specifically, the UE 10 and the PGW 30 transmit/receive a flow identified on the basis of the TFT by using the first PDN connection.

Note that in the example of the fourth PDN connectivity procedure, a case has been described in which the transmission/reception of the TFT is included in the PDN connectivity procedure; however, the fourth PDN connectivity procedure is not limited to this case. The transmission/reception of the TFT may be performed after the multi-access PDN connection is established.

Therefore, the UE 10 and the TWAG 74 may perform transmission/reception without including the TFT in the PDN connectivity request and/or the PDN connectivity response (PDN connectivity accept), and establish the multi-access PDN connection. In other words, at a point in time when the PDN connection is established, there may be no IP flow transmitting/receiving user data by using the PDN connection. In this case, the UE 10 and the TWAG 74 transmit the TFT after the multi-access PDN connection is established.

More specifically, when the PDN connection of the UE-Initiated mode is established, the UE 10 may transmit the TFT to the TWAG 74. In addition, the TWAG 74 receives the TFT from the UE 10 and transmits the TFT to the PGW 30. Thus, the UE 10 and the PGW 30 can determine a PDN connection and/or a transfer path (such as an EPS bearer) for transmitting/receiving the IP flow by using the TFT, and transmit/receive user data corresponding to the IP flow identified on the basis of the TFT.

On the other hand, when the PDN connection of the Network-Initiated mode is established, the PGW 30 may transmit the TFT to the TWAG 74. Here, the PGW 30 may receive, from the PCRF 60, the TFT determined on the basis of the operator policy. In addition, the TWAG 74 receives the TFT from the PGW 30 and transmits the TFT to the UE 10. Thus, the UE 10 and the PGW 30 can determine a PDN connection and/or a transfer path (such as an EPS bearer) for transmitting/receiving the IP flow by using the TFT, and transmit/receive user data corresponding to the IP flow identified on the basis of the TFT.

Furthermore, in the example of the fourth PDN connectivity procedure, a case has been described in which the UE 10 and the PGW 30 establish the first PDN connection of an operation mode selected by the UE 10 from the operation modes determined on the basis of the operator policy or the operation modes allowed on the basis of the operator policy; however, the fourth PDN connectivity procedure is not limited to this case. The UE 10 may reject the establishment of the first PDN connection.

For example, when the UE 10 does not support the operation mode allowed on the basis of the operator policy and/or the operation mode allowed on the basis of the operator policy does not comply with the policy of the UE 10, the UE 10 may reject the establishment of the first PDN connection.

In greater detail, the UE 10 may transmit a PDN connectivity reject to the TWAG 74, upon the reception of the PDN connectivity accept, and/or on the basis of the seventh identification information included in the PDN connectivity accept and/or the PDN connection attribute information and/or the policy of the UE 10.

The UE 10 may transmit the PDN connectivity reject including at least one or more of the PDN connectivity reject message identity (PDN connectivity reject message ID), the Procedure transaction ID, and the Cause. Furthermore, the UE 10 may include the fourth identification information in the PDN connectivity reject. Moreover, the UE 10 may include the PCO and/or the Tw1 value in the PDN connectivity reject. Note that the UE 10 may transmit the PCO including the fourth identification information.

The fourth identification information may be information representing that the UE 10 does not support the operation mode allowed on the basis of the operator policy and/or information representing that the operation mode allowed on the basis of the operator policy does not comply with the policy of the UE 10.

The PDN connectivity reject message ID may be a message type representing the PDN connectivity reject message.

The Cause may be information representing a reason why the PDN connectivity request is rejected. Here, the UE 10 may notify the UE 10 of the fourth identification information included in the Cause.

The Tw1 value may be a value of the Tw1 timer, included when the Cause represents insufficient resources.

The TWAG 74 may receive the PDN connectivity reject transmitted from the UE 10. Upon the reception of the PDN connectivity reject and/or on the basis of the fourth identification information included in the PDN connectivity reject, the TWAG 74 may delete the EPS bearer context, held by the TWAG 74, relating to the established PDN connection. Furthermore, the TWAG 74 may transmit, to the PGW 30, the fourth identification information included in the PDN connectivity reject.

The PGW 30 may receive the fourth identification information transmitted from the TWAG 74. Upon the reception of the fourth identification information and/or on the basis of the operator policy, the PGW 30 may delete the EPS bearer context, held by the PGW 30, relating to the established PDN connection.

Furthermore, the PGW 30 may perform the IP-CAN session update procedure with the PCRF 60, upon the reception of the fourth identification information. The PGW 30 may include the fourth identification information in the IP-CAN session update procedure.

The PCRF 60 may change the operator policy on the basis of the IP-CAN session update procedure. Note that on the basis of the change of the operator policy, the PGW 30 may delete the EPS bearer context, held by the PGW 30, relating to the established PDN connection.

1.4.5. Description of State After PDN Connectivity Establishment Procedure

Performing the above-described first to seventh PDN connectivity procedures lead to a first state and a second state, both of which will be described later.

Note that an initial state in an additional attach procedure may be the first state or the second state. Note that the initial state in the additional attach procedure may not be limited to the first or second state.

1.4.6. Description of First State

Figure 13:
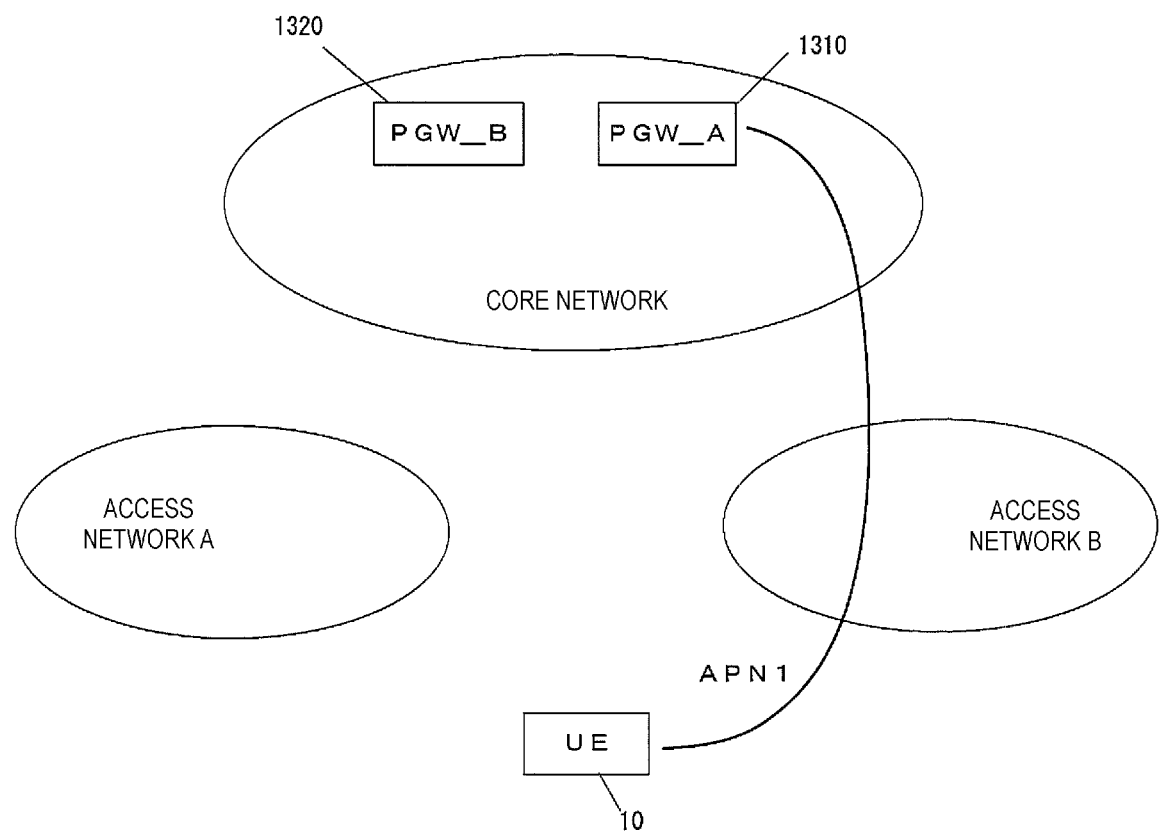
FIG. 13 is a diagram illustrating a state from a first initial state to a state after a PDN connectivity procedure is completed.

The first state will be described with reference to FIG. 13. In the first state, the UE 10 has established the first PDN connection with the core network 90. However, the UE 10 has not yet established the second PDN connection. In greater detail, the UE 10 has established the first PDN connection with the PGW_A 1310. However, the UE 10 has not established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be constituted of a transfer path between the UE 10 and the PGW 30 through the access network B. Thus, the first PDN connection may be constituted of a transfer path that is a combination of a transfer path between the UE 10 and the TWAG 74 and a transfer path between the TWAG 74 and the PGW_A 1310. Here, the transfer path may be a bearer.

As described above, in the first state, the UE 10 may be in a state in which the multi-access PDN connection has been established via the access network B. In addition, in the first state, the UE 10 may be in a state of not being connected to the core network 90 via the access network A.

Note that the UE 10 need not establish the single-access PDN connection via the access network B.

Alternatively, the UE 10 may be in a state in which the single-access PDN connection has been established via the access network B. In this case, the UE 10 performs, in the WLAN access network, the attach procedure or the PDN connectivity procedure in the single-access PDN connection initiated by the UE 10 to establish the third PDN connection.

Note that the third PDN connection may be established with the gateway selected by using the APN 2. Alternatively, the third PDN connection may be established with a gateway selected by using an APN different from the APN 1 and the APN 2.

The first state has been described above; however, the first state is not limited to the above-described state, and only needs to be a state in which the multi-access PDN connection has been established through the access network B and the PDN connection has not been established through the access network A, for example.

1.4.7. Description of Second State

Figure 14:
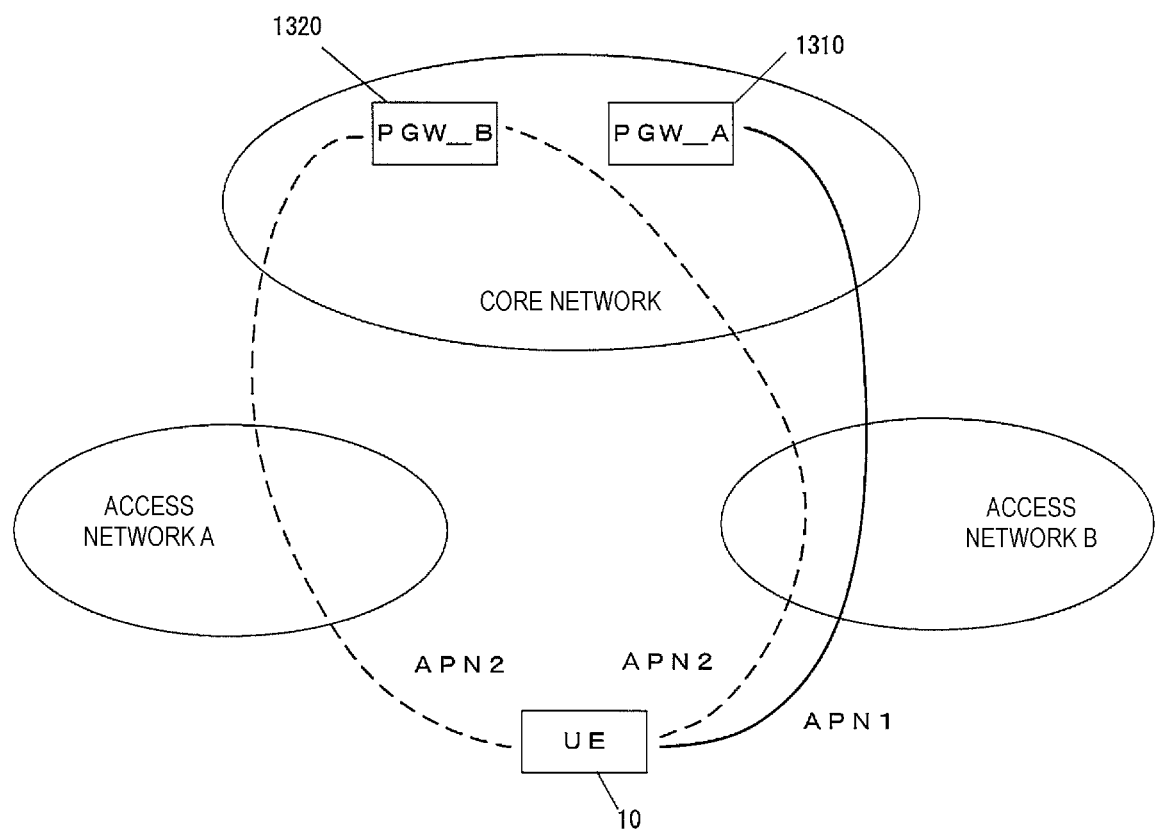
FIG. 14 is a diagram illustrating a state from a second initial state to a state after the PDN connectivity procedure is completed.

The second state will be described with reference to FIG. 14. In the second state, the UE 10 has established the first PDN connection with the core network 90. Furthermore, the UE 10 has established the second PDN connection with the core network 90.

In greater detail, the UE 10 has established the first PDN connection with the PGW_A 1310. Furthermore, the UE 10 has established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be constituted of a transfer path between the UE 10 and the PGW 30 through the access network B. Thus, the first PDN connection may be constituted of a transfer path that is a combination of a transfer path between the UE 10 and the TWAG 74 and a transfer path between the TWAG 74 and the PGW_B 1320. Here, the transfer path may be a bearer.

In addition, the second PDN connection may be constituted of a transfer path between the UE 10 and the PGW 30 through the access network A. Thus, the second PDN connection may be constituted of a transfer path that is a combination of a transfer path between the UE 10 and the eNodeB 45, a transfer path between the eNodeB 45 and the SGW 35, and a transfer path between the SGW 35 and the PGW_B 1320. Here, the transfer path may be a bearer.

As described above, in the first state, the UE 10 may be in a state in which the multi-access PDN connection has been established via the access network B. Furthermore, the UE 10 may be in a state in which the single-access PDN connection has been established via the access network A.

Note that the UE 10 need not establish the single-access PDN connection via the access network B.

Alternatively, the UE 10 may be in a state in which the single-access PDN connection has been established via the access network B. In this case, the UE 10 performs, in the WLAN access network, the attach procedure or the PDN connectivity procedure in the single-access PDN connection initiated by the UE 10 to establish the third PDN connection.

Note that the third PDN connection may be established with the gateway selected by using the APN 2. Alternatively, the third PDN connection may be established with a gateway selected by using an APN different from the APN 1 and the APN 2.

The second state has been described above; however, the second state is not limited to the above-described state, and only needs to be a state in which the multi-access PDN connection has been established through the access network B and the single-access PDN connection has been established through the access network A, for example.

2. Second Embodiment

Hereinafter, a radio communication technology according to an embodiment of the present invention will be described in detail with reference to the drawings.

2.1. System Overview

The mobile communication system in the present embodiment may be similar to that in the first embodiment. Thus, the overview of the mobile communication system is similar to that of the mobile communication system described with reference to FIG. 1 in Chapter 2.1 of the first embodiment, and therefore detailed description will be omitted.

In the present embodiment, the UE 10 can establish a first PDN connection and/or a second PDN connection.

Furthermore, in the present embodiment, an NBIFOM is a technology that allows establishment of a multi-access PDN connection.

Furthermore, in the present embodiment, the multi-access PDN connection refers to a PDN connection capable of accommodating, in one PDN connection, a transfer path and/or a bearer over 3GPP access and/or WLAN access. In other words, the multi-access PDN connection can combine and accommodate a transfer path through the 3GPP access and a transfer path through the WLAN access. Note that the multi-access PDN connection may be a PDN connection accommodating only a bearer through the 3GPP access or may be a PDN connection accommodating only a transfer path through the WLAN access. In other words, the multi-access PDN connection is a PDN connection capable of constituting one or multiple transfer paths.

Note that in the present embodiment, unlike the first embodiment, the multi-access PDN connection may be a PDN connection established on the basis of the NBIFOM or a PDN connection established on the basis of the IP Flow Mobility (IFOM). Thus, in the present embodiment, the multi-access PDN connection may be either the multi-access PDN connection corresponding to the PDN connection in which a transfer path of a certain flow can be selected on the basis of the NBIFOM or the multi-access PDN connection corresponding to the PDN connection in which a transfer path of a certain flow can be selected on the basis of the IFOM.

Note that the IFOM is a technology for switching a communication path of a certain IP flow by using the Dual Stack Mobile IPv6 (DSMIPv6) protocol. On the other hand, the NBIFOM is a technology for switching a communication path of a certain IP flow by using a network-based mobility management protocol such as a General Packet Radio System Tunneling Protocol (GTP) and a Proxy Mobile IP (PMIP). Furthermore, the first PDN connection may be the above-described multi-access PDN connection.

In detail, the first PDN connection is a PDN connection in which, as one PDN connection, a communication path EPS bearer through the access network A and a communication path constituted by a GTP/PMIPv6 tunnel through the access network B can be used. That is, this PDN connection can transmit/receive data through the 3GPP access, the WLAN access, or both the 3GPP access and the WLAN access. The first PDN connection may be the multi-access PDN connection.

Furthermore, the second PDN connection may be the PDN connection of the related art, rather than the multi-access PDN connection. Note that the second PDN connection may be a single-access PDN connection.

Here, the single-access PDN connection refers to one PDN connection constituted of only a transfer path of either the 3GPP access or the WLAN access, unlike the multi-access PDN connection. In detail, the single-access PDN connection is a PDN connection established by the attach of the related art.

That is, the second PDN connection is a PDN connection constituted of the EPS bearer through the access network A or a PDN connection constituted of the GTP/PMIPv6 transfer path through the access network B. The second PDN connection accommodates a transfer path and/or a communication path through either one of the access networks.

As described above, the single-access PDN connection is a PDN connection different from the multi-access PDN connection. Moreover, the single-access PDN connection is a PDN connection that is also different from a PDN connection for a Local IP Access (LIPA). Here, the LIPA refers to communication control for performing offload to a home network. More specifically, the base station to which the terminal device connects performs the offload by transmitting, to the home network to which the base station connects, user data conventionally delivered via the core network 90. The PDN connection for the LIPA is a PDN connection for performing such communication on the basis of the LIPA.

Next, an example of a configuration of the core network 90 will be described. FIG. 2A illustrates an example of a configuration of the IP mobile communication network. As illustrated in FIG. 2A, the core network 90 is constituted of the Home Subscriber Server (HSS) 50, the Authentication, Authorization, Accounting (AAA) 55, the Policy and Charging Rules Function (PCRF) 60, the PGW 30, the enhanced Packet Data Gateway (ePDG) 65, the SGW 35, the MME 40, and the Serving GPRS Support Node (SGSN) 45.

Furthermore, the core network 90 can be connected to multiple radio access networks (the LTE AN 80, the WLAN ANb 75, the WLAN ANa 70, the UTRAN 20, and the GERAN 25).

A radio access network may be constituted of multiple different access networks, or may be constituted of either one of the access networks. Moreover, the UE 10 can be wirelessly connected to the radio access network.

Moreover, the WLAN access network b (WLAN ANb 75) that connects to the core network 90 via the ePDG 65 and the WLAN access network a (WLAN ANa 75) that connects to the PGW 30, the PCRF 60, and the AAA 55 can be configured as the access network connectable in the WLAN access system.

Note that each device has a similar configuration to those of the devices of the related art in a mobile communication system using EPS, and thus detailed descriptions will be omitted. Each device will be described briefly hereinafter.

The PGW 30 is connected to the PDN 100, the SGW 35, the ePDG 65, the WLAN ANa 70, the PCRF 60, and the AAA 55 and is a relay device configured to transfer user data by functioning as a gateway device between the PDN 100 and the core network 90.

The SGW 35 is connected to the PGW 30, the MME 40, the LTE AN 80, the SGSN 45, and the UTRAN 20 and is a relay device configured to transfer user data by functioning as a gateway device between the core network 90 and the 3GPP access network (the UTRAN 20, the GERAN 25, and the LTE AN 80).

The MME 40 is connected to the SGW 35, the LTE AN 80, and the HSS 50 and is an access control device configured to perform location information management and access control for the UE 10 via the LTE AN 80. Furthermore, the core network 90 may include multiple location management devices. For example, a location management device different from the MME 40 may be constituted. As with the MME 40, the location management device different from the MME 40 may be connected to the SGW 35, the LTE AN 80, and the HSS 50.

Furthermore, when multiple MMEs 40 are included in the core network 90, the MMEs 40 may be connected to each other. With this configuration, the context of the UE 10 may be transmitted/received among the MMEs 40.

The HSS 50 is connected to the MME 40 and the AAA 55 and is a managing node configured to manage subscriber information. The subscriber information of the HSS 50 is referenced during access control for the MME 40, for example. Moreover, the HSS 50 may be connected to the location management device different from the MME 40.

The AAA 55 is connected to the PGW 30, the HSS 50, the PCRF 60, and the WLAN ANa 70 and is configured to perform access control for the UE 10 connected via the WLAN ANa 70.

The PCRF 60 is connected to the PGW 30, the WLAN ANa 75, the AAA 55, and the PDN 100 and is configured to perform QoS management on data delivery. For example, the PCRF 60 manages QoS of a communication path between the UE 10 and the PDN 100.

The ePDG 65 is connected to the PGW 30 and the WLAN ANb 75 and is configured to deliver user data by functioning as a gateway device between the core network 90 and the WLAN ANb 75.

The SGSN 45 is connected to the UTRAN 20, the GERAN 25, and the SGW 35 and is a control device for location management between a 3G/2G access network (UTRAN/GERAN) and the LTE access network (E-UTRAN). In addition, the SGSN 45 has functions of: selecting the PGW 30 and the SGW 35; managing a time zone of the UE 10; and selecting the MME 40 at the time of handover to the E-UTRAN.

Also, as illustrated in FIG. 2B, each radio access network includes devices to which the UE 10 is actually connected (for example, a base station device and an access point device), and the like. The devices used in these connections are assumed to adapt to the radio access networks.

In the present embodiment, the LTE AN 80 includes the eNB 45. The eNB 45 is a radio base station to which the UE 10 connects in an LTE access system, and the LTE AN 80 may include one or multiple radio base stations.

The WLAN ANa 70 includes the WLAN APa 72 and the TWAG 74. The WLAN APa 72 is a radio base station to which the UE 10 connects in the WLAN access system trusted by the operator running the core network 90, and the WLAN ANa 70 may include one or multiple radio base stations. The GW 74 is a gateway device between the core network 90 and the WLAN ANa 70. Furthermore, the WLAN APa 72 and the GW 74 may be constituted as a single device.

Even in a case where the operator running the core network 90 and the operator running the WLAN ANa 70 are different, such a constitution can be implemented through contracts and agreements between the operators.

Furthermore, the WLAN ANb 75 includes the WLAN APb 76. The WLAN APb 76 is a radio base station to which the UE 10 connects in the WLAN access system in a case where no trusting relationship is established with the operator running the core network 90, and the WLAN ANb 75 may include one or multiple radio base stations.

In this manner, the WLAN ANb 75 is connected to the core network 90 via the ePDG 65, which is a device included in the core network 90, serving as a gateway. The ePDG 65 has a security function for ensuring the security of communication.

The UTRAN 20 includes the Radio Network Controller (RNC) 24 and the eNB (UTRAN) 22. The eNB (UTRAN) 22 is a radio base station to which the UE 10 connects through a UMTS Terrestrial Radio Access (UTRA), and the UTRAN 20 may include one or multiple radio base stations.

Furthermore, the RNC 24 is a control unit configured to connect the core network 90 and the eNB (UTRAN) 22, and the UTRAN 20 may include one or multiple RNCs. Moreover, the RNC 24 may be connected to one or multiple eNBs (UTRANs) 22. In addition, the RNC 24 may be connected to a radio base station (Base Station Subsystem (BSS) 26) included in the GERAN 25.

The GERAN 25 includes the BSS 26. The BSS 26 is a radio base station to which the UE 10 connects through GSM/EDGE Radio Access (GERA), and the GERAN 25 may be constituted of one or multiple radio base station BSSs. Furthermore, the multiple BSSs may be connected to each other. Moreover, the BSS 26 may be connected to the RNC 24.

Note that in the present specification, the UE 10 being connected to radio access networks refers to the UE 10 being connected to a base station device, an access point, or the like included in each radio access network, and data, signals, and the like being transmitted/received also pass through those base station devices, access points, or the like.

2.2 Device Configuration

The configuration of each device will be described below.

2.2.1. TWAG Configuration

FIG. 3 illustrates a device configuration of the TWAG 74. As illustrated in FIG. 3, the TWAG 74 is constituted of an IP mobile communication network interface unit 320, a control unit 300, and a storage 340. The IP mobile communication network interface unit 320 and the storage 340 are connected to the control unit 300 via a bus.

The control unit 300 is a function unit for controlling the TWAG 74. The control unit 300 implements various processes by reading out and executing various programs stored in the storage 340.

The IP mobile communication network interface unit 320 is a function unit through which the TWAG 74 is connected to the PGW 30.

The storage 340 is a function unit for storing programs, data, and the like necessary for each operation of the TWAG 74. The storage 340 is constituted of, for example, a semiconductor memory, a Hard Disk Drive (HDD), or the like.

As illustrated in FIG. 3, the storage 340 stores a TWAG capability 342, a Network capability 344, and an EPS bearer context 346. Hereinafter, information elements stored in the storage 340 will be described.

FIGS. 4A to 4E illustrate the information elements stored in the storage 340. FIG. 4A illustrates an example of the TWAG capability stored by the TWAG 74. In the TWAG capability, identification information (NBIFOM capability) is stored for each TWAG 74, the information indicating whether or not capability of establishing the first PDN connection is supported. In other words, the identification information indicates whether or not the TWAG 74 supports the NBIFOM function. Specifically, the NBIFOM capability may include "allowed" or "Not allowed."

Note that the NBIFOM function may be information indicating the possession of the function of establishing the multi-access PDN connection based on the NBIFOM.

Alternatively, the NBIFOM capability may be identification information indicating the possession of the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

As illustrated in FIG. 4A, the NBIFOM capability may be stored being associated with the TWAG ID that is the identification information on the TWAG 74. If not associated with the TWAG ID, the NBIFOM capability may mean capability of the TWAG 74 to be stored.

If the TWAG ID and the NBIFOM capability are stored being associated with each other, the TWAG 74 may store the TWAG capability of multiple TWAGs 74.

In this case, when the UE 10 performs a handover to another TWAG 74, the TWAG 74 may select a TWAG 74 to which the handover is made, on the basis of the TWAG capability.

Next, the Network capability 344 will be described. FIG. 4B illustrates an example of the Network capability stored by the TWAG 74. In the Network capability, the NBIFOM capability is stored for each network, i.e., for each PGW 30.

Here, the NBIFOM capability is identification information for each network indicating whether or not capability of establishing the first PDN connection is supported. In other words, the identification information indicates whether or not the PGW 30 supports the NBIFOM function. More specifically, for example, the NBIFOM capability may include "allowed" or "Not allowed."

Note that the NBIFOM function may be information indicating the possession of the function of establishing the multi-access PDN connection based on the NBIFOM.

Alternatively, the NBIFOM capability may be identification information indicating the possession of capability of establishing the first PDN connection. In other words, the NBIFOM capability may be identification information indicating that a gateway supports the NBIFOM function. That is, the existence of the NBIFOM capability in the storage may mean that the PGW 30 is a gateway having the function of establishing the first PDN connection. In other words, the existence of the NBIFOM capability in the storage may mean that the PGW 30 is a gateway supporting the NBIFOM function.

As illustrated in FIG. 4B, the TWAG 74 stores the NBIFOM capability associated with the PGW ID. Furthermore, as illustrated in FIG. 4B, the NBIFOM capability may be stored being associated with each of the multiple PGWs 30.

The PGW ID may be any information for identifying the PGW 30, and may be an Access Point Name (APN), for example.

Next, the EPS bearer context will be described. The EPS bearer context may be classified into the EPS bearer context for each UE 10 stored for each UE 10, the EPS bearer context for each PDN connection, and the EPS bearer context for each bearer and/or transfer path.

FIG. 4C illustrates information elements included in the EPS bearer context for each UE 10. As is obvious from FIG. 4C, the TWAG 74 stores, for each UE 10, a UE NBIFOM capability and an NBIFOM allowed.

The UE NBIFOM capability is the NBIFOM capability of the UE 10. The UE NBIFOM capability is identification information for each UE 10 indicating whether or not capability of establishing the first PDN connection is supported. In other words, the UE NBIFOM capability is identification information indicating whether or not the UE 10 supports the NBIFOM function. More specifically, for example, the UE NBIFOM capability may include "allowed" or "Not allowed."

Note that the NBIFOM function may be information indicating the possession of the function of establishing the multi-access PDN connection based on the NBIFOM.

Alternatively, the UE NBIFOM capability may be identification information indicating that the UE 10 has the capability of establishing the first PDN connection. That is, the existence of the UE NBIFOM capability may mean that the UE 10 has the function of establishing the first PDN connection.

In other words, the UE NBIFOM capability may be identification information indicating that the UE 10 supports the NBIFOM function. That is, the existence of the UE NBIFOM capability in the storage may mean that the UE 10 supports the NBIFOM function.

Furthermore, the NBIFOM allowed is identification information indicating an APN that is allowed to establish a PDN connection using the NBIFOM. The NBIFOM may be associated with at least the APN. The NBIFOM allowed may be associated with multiple APNs.

In the present embodiment, the APN 1 is associated with the NBIFOM allowed. That is, the APN 1 is allowed to establish the multi-access PDN connection based on the NBIFOM based on the NBIFOM. In other words, in the present embodiment, the UE 10 is allowed to establish the multi-access PDN connection based on the NBIFOM by using the APN 1. Note that the APN 1 is also allowed to establish the PDN connection of the related art, rather than the multi-access PDN connection based on the NBIFOM.

In addition, in the present embodiment, the APN 2 is not associated with the NBIFOM allowed. That is, in the present embodiment, the APN 2 is not allowed to establish the multi-access PDN connection based on the NBIFOM. That is, in the present embodiment, the UE 10 cannot establish the multi-access PDN connection based on the NBIFOM by using the APN 2. The NBIFOM allowed may be stored before the PDN connection is established.

The TWAG 74 may access the HSS 50 to acquire the NBIFOM allowed before the PDN connection is established and/or during the establishment procedure.

Furthermore, the EPS bearer context for each UE 10 may include identification information on the UE 10. The identification information on the UE 10 may be an IMSI.

Furthermore, FIG. 4D illustrates the EPS bearer context for each PDN connection. The EPS bearer context for each PDN connection includes a PDN connection ID, a Network allowed mode, an Operation mode, a User plane connection ID, a TWAG MAC address, and an NBIFOM Permission.

The PDN connection ID is identification information for identifying a PDN connection. The UE 10, the TWAG 74, and the PGW 30 may store the same identification information.

The Operation mode is identification information on a mode that indicates which of the UE 10 and the network takes an initiative in transmitting/receiving data or is allowed to initiate communication control when the PDN connection is the first PDN connection.

More specifically, for example, an Operation mode that allows the UE 10 to initiate the communication control may be a UE initiated mode.

Furthermore, an Operation mode that allows the network and/or the PGW 30 and/or the PCRF 60 to initiate the communication control may be a Network initiated mode.

The Network allowed mode indicates an Operation mode allowed by the network. The Network allowed mode may include the UE initiated mode, the Network initiated mode, or both thereof.

The User plane connection ID is identification information for identifying a connection used for transmission of user data when the UE 10 establishes a transfer path via the TWAG 74. The TWAG MAC address is a physical address of the TWAG 74.

The NBIFOM permission is information indicating that this PDN connection has established the multi-access PDN connection based on the NBIFOM. In other words, the NBIFOM permission indicates that the first PDN connection has been established.

That is, the fact that the TWAG 74 has stored the NBIFOM permission means that this PDN connection is the first PDN connection.

The NBIFOM permission is identification information that is stored by the TWAG 74 upon the PDN connection being established.

The TWAG 74 may access the HSS 50 to acquire the NBIFOM permission during the establishment of the PDN connection. Alternatively, the TWAG 74 may store the NBIFOM Permission on the basis of the establishment of the multi-access PDN connection based on the NBIFOM.

Next, the EPS bearer context for each bearer and/or transfer path will be described. As illustrated in FIG. 4E, the EPS bearer context for each bearer and/or transfer path may include the transfer path identification information and the Routing Rule.

The transfer path identification information is information for identifying a transfer path and/or bearer. The transfer path identification information may be an EPS bearer ID, for example.

The Routing Rule indicates an association of a Routing Filter and a Routing address or Routing access type. On the basis of this association, whether using a communication path through the 3GPP access network or using a communication path through the WLAN access network is determined.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of the Mobile Access Gateway (MAG).

The Routing Rule may be notified from the PGW 30 or the PCRF 60, or may be notified from the UE 10. Alternatively, the Routing Rule may be a value that the TWAG 74 prestores as a default value.

The Routing Filter may include an IP header so that an IP flow can be switched. Alternatively, the Routing Filter may include an application ID so that the flow can be switched for each application. Alternatively, the Routing Filter may include a TFT.

The Routing Rule may store multiple rules. Furthermore, the Routing Rule may include priority for each rule.

The TWAG capability and the Network capability may be included in the EPS bearer context.

2.2.2. HSS Configuration

Next, the configuration of the HSS 50 will be described. FIG. 5 illustrates a device configuration of the HSS 50. As illustrated in FIG. 5, the HSS 50 is constituted of an IP mobile communication network interface unit 520, a control unit 500, and a storage 540. The IP mobile communication network interface unit 520 and the storage 540 are connected to the control unit 500 via a bus.

The control unit 500 is a function unit for controlling the HSS 50. The control unit 500 implements various processes by reading out and executing various programs stored in the storage 540.

The IP mobile communication network interface unit 520 is a function unit through which the HSS 50 is connected to the MME 40 and/or another MME 40, and the AAA 55.

The storage 540 is a function unit for storing programs, data, and the like necessary for each operation of the HSS 50. The storage 540 is constituted of, for example, a semiconductor memory, a Hard Disk Drive (HDD), or the like.

As illustrated in FIG. 5, the storage 540 stores HSS data 542. Hereinafter, information elements stored in the storage 540 will be described.

FIGS. 6A and 6B illustrate the information elements stored in the storage 540. FIG. 6A illustrates an example of HSS data for each UE 10 stored by the HSS 50.

As is obvious from FIG. 6A, the HSS data for each UE 10 includes an IMSI, an MSISDN, an IMEI/IMEISV, an Access Restriction, a UE NBIFOM capability, and an NBIFOM allowed. The IMSI is identification information assigned to a user (subscriber) using the UE 10. The MSISDN represents the phone number of the UE 10. The IMEI/IMISV is identification information assigned to the UE 10. The Access Restriction indicates registration information for access restriction.

The UE NBIFOM capability is the NBIFOM capability of the UE 10. The UE NBIFOM capability is identification information indicating whether or not capability of establishing the first PDN connection is supported for each UE 10. In other words, the UE NBIFOM capability indicates whether or not the UE 10 supports the NBIFOM function. More specifically, for example, the NBIFOM capability may include "allowed" or "Not allowed."

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

Furthermore, the NBIFOM allowed is identification information indicating an APN that is allowed to establish a PDN connection using the NBIFOM. The NBIFOM may be associated with at least the APN. The NBIFOM allowed may be associated with multiple APNs.

In the present embodiment, the APN 1 is associated with the NBIFOM allowed. That is, the APN 1 is allowed to establish the multi-access PDN connection based on the NBIFOM. In other words, in the present embodiment, the UE 10 is allowed to establish the multi-access PDN connection based on the NBIFOM by using the APN 1. Note that the APN 1 is also allowed to establish the PDN connection of the related art, rather than the multi-access PDN connection based on the NBIFOM.

In addition, in the present embodiment, the APN 2 is not associated with the NBIFOM allowed. That is, in the present embodiment, the APN 2 is not allowed to establish the multi-access PDN connection based on the NBIFOM. That is, in the present embodiment, the UE 10 cannot establish the multi-access PDN connection based on the NBIFOM by using the APN 2. The NBIFOM allowed may be stored before the PDN connection is established.

FIG. 6B illustrates an example of HSS data for each PDN connection stored by the HSS 50. As is obvious from FIG. 6B, the HSS data for each PDN connection includes at least a Context ID, a PDN Address, a PDN Type, an Access Point Name (APN), a WLAN offload ability, a PDN GW ID, and an NBIFOM Permission.

The Context ID is identification information on the context storing the HSS data for each PDN connection.

The PDN Address represents a registered IP address. The PDN Address is an IP address of the UE 10.

The PDN Type indicates the type of PDN Address. That is, the PDN Type is identification information for identifying IPv4, IPv6, or IPv4v6, for example. The APN is a label indicating an access destination in the network, in accordance with DNS naming convention.

The WLAN offload ability is identification information indicating whether traffic connected through this APN can perform offload to the WLAN by utilizing a cooperative function between the WLAN and the 3GPP, or maintains the 3GPP connection. The WLAN offload ability may vary for each RAT type. Specifically, the LTE (E-UTRA) and the 3G (UTRA) may have different WLAN offload ability.

The PDN GW identity is identification information for identifying the PGW 30 utilized in this APN. This identification information may be a Fully Qualified Domain Name (FQDN) or an IP address.

The NBIFOM permission is information indicating that this PDN connection has established the multi-access PDN connection based on the NBIFOM. In other words, the NBIFOM permission indicates that the first PDN connection has been established.

That is, the fact that the TWAG 74 has stored the NBIFOM permission means that this PDN connection is the first PDN connection.

The NBIFOM permission is identification information that is stored by the TWAG 74 upon the PDN connection being established.

Specifically, for example, the HSS data for each PDN connection including the APN 1 may include the NBIFOM permission, and the HSS data for each PDN connection including the APN 2 need not include the NBIFOM permission.

In other words, the PDN connection on the basis of the APN 1 may be the first PDN connection, and the PDN connection on the basis of the APN 2 cannot be the first PDN connection.

2.2.3. UE Configuration

Next, the configuration of the UE 10 will be described. FIG. 7 illustrates a device configuration of the UE 10. As illustrated in FIG. 7, the UE 10 is constituted of an LTE interface unit 720, a WLAN interface unit 740, a control unit 700, and a storage 750.

The LTE interface unit 720, the WLAN interface unit 740, and the storage 750 are connected to the control unit 700 via a bus.

The control unit 700 is a function unit for controlling the UE 10. The control unit 700 implements various processes by reading out and executing various programs stored in the storage 750.

The LTE interface unit 720 is a function unit through which the UE 10 connects to an IP access network via an LTE base station. Furthermore, the external antenna 710 is connected to the LTE interface unit 720.

The WLAN interface unit 740 is a function unit through which the UE 10 connects to the IP access network via a WLAN AP. Furthermore, the external antenna 730 is connected to the WLAN interface unit 740.

The control unit 700 is a function unit for controlling the UE 10. The control unit 700 implements various processes by reading out and executing various programs stored in the storage 750.

The storage 740 is a function unit for storing programs, data, and the like necessary for each operation of the UE 10. The storage 750 is constituted of, for example, a semiconductor memory, a Hard Disk Drive (HDD), or the like.

As illustrated in FIG. 7, the storage 750 stores a UE context 752. Hereinafter, information elements stored in the storage 750 will be described. Note that the UE context 752 is classified into a UE context for each UE 10, a UE context for each PDN connection, and a UE context for each transfer path and/or bearer.

FIG. 8A is an example of the UE context stored for each UE 10. As illustrated in FIG. 8A, the UE context for each UE 10 includes an IMSI, an EMM State, a GUTI, an ME Identity, and a UE NBIFOM capability. The IMSI is identification information assigned to a user (subscriber) using the UE 10.

The EMM State indicates a mobility management state of the UE 10. For example, the EMM State may be EMM-REGISTERED in which the UE 10 is registered with the network (registered state) or EMM-DEREGISTERD in which the UE 10 is not registered with the network (deregistered state).

The GUTI is an abbreviation of "Globally Unique Temporary Identity," and is temporary identification information on the UE 10. The GUTI is constituted of the identification information on the MME 40 (Globally Unique MME 40 Identifier (GUMMEI)) and the identification information on the UE 10 in a specific MME 40 (M-TMSI).

The ME identity is an ID of an ME, and may be an IMEI/IMISV, for example.

The UE NBIFOM capability is the NBIFOM capability of the UE 10. The UE NBIFOM capability is identification information for each UE 10 indicating whether or not capability of establishing the first PDN connection is supported. In other words, the UE NBIFOM capability is identification information for each UE 10 indicating whether or not the NBIFOM function is supported. More specifically, for example, the NBIFOM capability may include "allowed" or "Not allowed."

Note that the NBIFOM function may be information indicating the possession of the function of establishing the multi-access PDN connection based on the NBIFOM.

Alternatively, the UE NBIFOM capability may be identification information indicating that the UE 10 has the capability of establishing the first PDN connection. That is, the existence of the UE NBIFOM capability in the storage of the UE 10 may mean that the UE 10 has the function of establishing the first PDN connection.

In other words, the UE NBIFOM capability may be identification information indicating that the UE 10 supports the NBIFOM function. That is, the existence of the UE NBIFOM capability in the storage of the UE 10 may mean that the UE 10 supports the NBIFOM function.

FIG. 8B illustrates an example of the UE context for each PDN connection. As illustrated in FIG. 8B, the UE context for each PDN connection includes at least a PDN connection ID, an APN in Use, an IP address, a Default Bearer, a WLAN offload ability, a UE allowed mode, and an Operation mode.

The PDN connection ID is identification information for identifying a PDN connection. The UE 10, the TWAG 74, and the PGW 30 may store the same identification information.

The APN in Use is an APN utilized by the UE 10 most recently. This APN may be constituted of identification information on the network and identification information on a default operator.

The IP Address is an IP address assigned to the UE 10 through the PDN connection, and may be an IPv4 address or an IPv6 prefix.

The Default Bearer is EPS bearer identification information for identifying a default bearer in this PDN connection.

The WLAN offloadability is WLAN offload permission information indicating whether or not a communication associated with this PDN connection allows for offload to the WLAN using an interworking function between the WLAN and the 3GPP, or maintains the 3GPP access.

The UE allowed mode is an operation mode allowed by the UE 10. This identification information may indicate the UE initiated mode, the Network initiated mode, or both thereof.

The Operation mode is identification information on a mode that indicates which of the UE 10 and the network takes an initiative in transmitting/receiving data or is allowed to initiate communication control when the current PDN connection is the first PDN connection.

FIG. 8C illustrates the UE context for each bearer. The UE context for each bearer includes transfer path identification information and a Routing Rule.

The transfer path identification information is information for identifying a transfer path and/or bearer. The transfer path identification information may be an EPS bearer ID, for example. Furthermore, the transfer path identification information may be associated with the TFT.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of the Mobile Access Gateway (MAG).

The Routing Rule may be notified from the PGW 30 or the PCRF 60. Alternatively, the Routing rule may be a value that the UE 10 prestores as a default value.

The Routing Filter may include an IP header so that an IP flow can be switched. Alternatively, the Routing Filter may include an application ID so that the UE 10 can switch the flow for each application. Alternatively, the Routing Filter may include a TFT.

The Routing Rule may store multiple rules (regulations). Furthermore, the Routing Rule may include priority for each rule.

FIG. 8D illustrates the TWAG capability. The TWAG capability stores identification information (NBIFOM capability) indicating whether or not capability of establishing the first PDN connection is supported for each TWAG 74. In other words, the identification information indicates whether or not the TWAG 74 supports the NBIFOM function. Specifically, the NBIFOM capability may include "allowed" or "Not allowed."

Note that the NBIFOM function may be information indicating the possession of the function of establishing the multi-access PDN connection based on the NBIFOM.

Alternatively, the NBIFOM capability may be identification information indicating the possession of the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

The UE 10 may store the NBIFOM capability associated with the TWAG ID. Furthermore, the NBIFOM capability of multiple TWAGs 74 may be stored.

FIG. 8E illustrates an example of the Network capability. The Network capability stores the NBIFOM capability for each network, i.e., for each PGW 30.

Here, the NBIFOM capability is identification information indicating whether or not capability of establishing the first PDN connection is supported for each network. More specifically, for example, the NBIFOM capability may include "allowed" or "Not allowed."

Alternatively, the NBIFOM capability may be identification information indicating the possession of the capability of establishing the first PDN connection. That is, the existence of the NBIFOM capability may mean that the PGW 30 and/or the network is a gateway having the function of establishing the first PDN connection.

As illustrated in FIG. 8E, the TWAG 74 stores the NBIFOM capability associated with the PGW ID. Furthermore, as illustrated in FIG. 8E, the NBIFOM capability may be stored being associated with each of multiple PGWs 30.

The PGW ID is information for identifying the PGW 30. The PGW ID may be an APN, for example.

The TWAG capability and the Network capability may be included in the UE context, or may be information separated from the UE context.

That is, the UE 10 may store the TWAG capability and the Network capability included in the UE context, or may store the TWAG capability and the Network capability separately from the UE context.

2.2.4. PGW Components

Next, the components of the PGW 30 will be described. FIG. 9 illustrates a device configuration of the PGW 30. As illustrated in FIG. 9, the PGW 30 is constituted of an IP mobile communication network interface unit 920, a control unit 900, and a storage 940. The IP mobile communication network interface unit 920 and the storage 940 are connected to the control unit 900 via a bus.

The control unit 900 is a function unit for controlling the PGW 30. The control unit 900 implements various processes by reading out and executing various programs stored in the storage 940.

The IP mobile communication network interface unit 920 is a function unit through which the PGW 30 is connected to the SGW 35 and/or the PCRF 60 and/or the ePDG 65 and/or the AAA 55 and/or the GW 74.

The storage 940 is a function unit for storing programs, data, and the like necessary for each operation of the PGW 30. The storage 940 is constituted of, for example, a semiconductor memory, a Hard Disk Drive (HDD), or the like.

As illustrated in FIG. 9, the storage 940 stores an EPS bearer context 942. Note that the EPS bearer context includes an EPS bearer context stored for each UE 10, an EPS bearer context stored for each APN, an EPS bearer context stored for each PDN connection, and an EPS bearer context stored for each transfer path and/or bearer.

First, the EPS bearer context for each UE 10 will be described. FIG. 10A illustrates an example of the EPS bearer context for each UE 10. As illustrated in FIG. 10A, the EPS bearer context includes at least an IMSI, an ME identity, an MSISDN, and a UE NBIFOM capability.

The IMSI is information for identifying a user of the UE 10. The ME identity is an ID of an ME, and may be the IMEI/IMISV, for example. The MSISDN represents the phone number of the UE 10.

The UE NBIFOM capability is the NBIFOM capability of the UE 10. The UE NBIFOM capability is identification information indicating whether or not capability of establishing the first PDN connection is supported for each UE 10. More specifically, for example, the NBIFOM capability may include "allowed" or "Not allowed."

Alternatively, the UE NBIFOM capability may be identification information indicating that the UE 10 has the capability of establishing the first PDN connection. That is, the existence of the UE NBIFOM capability may mean that the UE 10 has the function of establishing the first PDN connection.

Next, the EPS bearer context for each PDN connection will be described. FIG. 10B illustrates an example of the EPS bearer context for each PDN connection.

As illustrated in FIG. 10B, the context includes at least a PDN connection ID, an IP address, a PDN type, an APN, a Network allowed mode, and an Operation mode.

The PDN connection ID is identification information for identifying a PDN connection. The UE 10, the TWAG 74, and the PGW 30 may store the same identification information.

The IP Address indicates an IP address assigned to the UE 10 for this PDN connection. The IP address may be an IPv4 and/or IPv6 prefix.

The PDN type indicates the type of the IP address. The PDN type indicates IPv4, IPv6, or IPv4v6, for example.

The APN is a label indicating an access destination in the network, in accordance with DNS naming convention.

Network allowed mode indicates an Operation mode allowed by the network. The Network allowed mode may include the UE initiated mode, the Network initiated mode, or both thereof.

The Operation mode is identification information on a mode that indicates which of the UE 10 and the network takes an initiative in transmitting/receiving data or is allowed to initiate communication control when the current PDN connection is the first PDN connection.

More specifically, for example, the UE initiated mode in which the UE 10 is allowed to initiate the communication control or the Network initiated mode in which the network is allowed to initiate the communication control may be identified.

Next, an example of the EPS bearer context for each transfer path and/or bearer will be described with reference to FIG. 10C. As illustrated in FIG. 10C, the context includes at least transfer path identification information and a Routing Rule.

The transfer path identification information is information for identifying a transfer path and/or bearer. The transfer path identification information may be an EPS bearer ID, for example.

Furthermore, the transfer path identification information may be associated with the TFT.

The Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of the Mobile Access Gateway (MAG).

The Routing Rule may be notified from the PGW 30 or the PCRF 60. Alternatively, the Routing Rule may be a value that the UE 10 prestores as a default value.

The Routing Filter may include an IP header so that the PGW 30 can switch the IP flow. Alternatively, the Routing Filter may include an application ID so that the PGW 30 can switch the flow for each application. Alternatively, the Routing Filter may include a TFT.

The Routing Rule may store multiple rules. Furthermore, the Routing Rule may include priority for each rule.

FIG. 10D illustrates the TWAG capability. The TWAG capability stores identification information (NBIFOM capability) indicating whether or not capability of establishing the first PDN connection is supported for each TWAG 74. In other words, the identification information indicates whether or not the TWAG 74 supports the NBIFOM function. Specifically, the NBIFOM capability may include "allowed" or "Not allowed."

Note that the NBIFOM function may be information indicating the possession of the function of establishing the multi-access PDN connection based on the NBIFOM.

Alternatively, the NBIFOM capability may be identification information indicating the possession of the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

The PGW 30 may store the NBIFOM capability associated with the TWAG ID.

FIG. 10E illustrates an example of the Network capability. The Network capability stores the NBIFOM capability for each network, i.e., for each PGW 30.

Here, the NBIFOM capability is identification information indicating whether or not capability of establishing the first PDN connection is supported for each network. More specifically, for example, the NBIFOM capability may include "allowed" or "Not allowed."

Alternatively, the NBIFOM capability may be identification information indicating the possession of the capability of establishing the first PDN connection. That is, the existence of the NBIFOM capability may mean that the PGW 30 and/or the network is a gateway having the function of establishing the first PDN connection.

As illustrated in FIG. 10E, the PGW 30 stores the NBIFOM capability associated with the PGW ID. Furthermore, as illustrated in FIG. 10E, the NBIFOM capability may be stored being associated with each of multiple PGWs 30.

The PGW ID may be any information for identifying the PGW 30, and may be an APN, for example.

The TWAG capability and the Network capability may be included in the EPS bearer context, or may be information separated from the UE context.

2.2.5. PCRF Components

Next, components of the PCRF 60 will be described. FIG. 11 illustrates a device configuration of the PCRF 60. As illustrated in FIG. 11, the PCRF 60 is constituted of an IP mobile communication network interface unit 1120, a control unit 1100, and a storage 1140. The IP mobile communication network interface unit 1120 and the storage 1140 are connected to the control unit 1100 via a bus.

The control unit 1100 is a function unit for controlling the PCRF 60. The control unit 1100 implements various processes by reading out and executing various programs stored in the storage 1140.

The IP mobile communication network interface unit 1120 is a function unit through which the PCRF 60 is connected to the PGW 30 and/or the TWAG 74 and/or the AAA 55.

The storage 1140 is a function unit for storing programs, data, and the like necessary for each operation of the PCRF 60. The storage 940 is constituted of, for example, a semiconductor memory, a Hard Disk Drive (HDD), or the like.

As illustrated in FIG. 11, the storage 1140 stores UE context 1142. Note that the UE context may be classified into a UE context stored for each UE 10 and a UE context stored for each PDN connection.

FIG. 12A illustrates the UE context for each UE 10. As illustrated in FIG. 12A, the context includes at least a Subscriber ID and UE NBIFOM capability.

The Subscriber ID is identification information on a user. For example, the subscriber ID may be an IMSI.

The UE NBIFOM capability is the NBIFOM capability of the UE 10. The UE NBIFOM capability is identification information indicating whether or not capability of establishing the first PDN connection is supported for each UE 10. In other words, the UE NBIFOM capability is identification information indicating whether or not the UE 10 supports the NBIFOM function. More specifically, for example, the NBIFOM capability may include "allowed" or "Not allowed."

Alternatively, the UE NBIFOM capability may be identification information indicating that the UE 10 has the capability of establishing the first PDN connection. That is, the existence of the UE NBIFOM capability may mean that the UE 10 has the function of establishing the first PDN connection.

In other words, the UE NBIFOM capability may be identification information indicating that the UE 10 supports the NBIFOM function. That is, the existence of the UE NBIFOM capability in the storage may mean that the UE 10 supports the NBIFOM function.

Next, the UE context for each PDN connection will be described. FIG. 12B illustrates an example of the UE context for each PDN connection. As illustrated in FIG. 12B, the context may include at least an APN, an Operation mode, a Network Policy, a Charging Rule, a PCC Rule, and a QoS Rule.

The APN is a label indicating an access destination in the network, in accordance with DNS naming convention.

The Operation mode is identification information on a mode that indicates which of the UE 10 and the network takes an initiative in transmitting/receiving data or is allowed to initiate communication control when the PDN connection is the first PDN connection.

More specifically, for example, an Operation mode that allows the UE 10 to initiate the communication control may be a UE initiated mode.

Furthermore, an Operation mode that allows the network and/or the PGW 30 and/or the PCRF 60 to initiate the communication control may be a Network initiated mode.

The Network Policy is a communication control policy on the network side, and may include the Network allowed mode. Alternatively, the PCRF 60 may store the Network allowed mode separately from the Network Policy.

The Charging Rule is a regulation on charging. In accordance with the Charging Rule determined by the PCRF 60, a PCEF performs charging.

The PCC Rule is a regulation relating to control of the Network Policy and Charging Rule. On the basis of the PCC Rule, the PCEF performs communication control and charging.

The QoS Rule is a regulation relating to QoS of the flow. The QoS Rule may be associated with the PCC Rule.

FIG. 12C illustrates the UE context for each transfer path and/or bearer. As illustrated in FIG. 12C, the UE context for each transfer path and/or bearer includes at least a Routing Rule.

The Routing Rule indicates an association of a Routing Filter, and a Routing address or Routing access type. On the basis of this association, whether using a communication path through the 3GPP access network or using a transfer path through the WLAN access network is determined.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of the Mobile Access Gateway (MAG).

The Routing Rule may be notified from the UE 10 and/or the TWAG 74 and/or the PGW 30. Alternatively, the Routing Rule may be a value that the PCRF 60 prestores as a default value. In this case, the PCRF 60 may determine the default value of the Routing Rule in accordance with the PCC Rule.

The Routing Filter may include an IP header so that an IP flow can be switched. Alternatively, the Routing Filter may include an application ID so that the flow can be switched for each application. Alternatively, the Routing Filter may include a TFT.

The Routing Rule may store multiple rules. Furthermore, the Routing Rule may include priority for each rule.

FIG. 12D illustrates an example of the TWAG capability stored by the TWAG 74. The TWAG capability stores identification information (NBIFOM capability) indicating whether or not capability of establishing the first PDN connection is supported for each TWAG 74. In other words, the identification information indicates whether or not the TWAG 74 supports the NBIFOM function. Specifically, the NBIFOM capability may include "allowed" or "Not allowed."

Note that the NBIFOM function may be information indicating the possession of the function of establishing the multi-access PDN connection based on the NBIFOM.

Alternatively, the NBIFOM capability may be identification information indicating the possession of the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

As illustrated in FIG. 12D, the NBIFOM capability may be stored being associated with the TWAG ID that is the identification information on the TWAG 74. If not associated with the TWAG ID, the NBIFOM capability may mean capability of the TWAG 74 to be stored.

If the TWAG ID and the NBIFOM capability are stored being associated with each other, the PCRF 60 may store the TWAG capability of multiple TWAGs 74.

FIG. 12E illustrates an example of the Network capability stored by the PCRF 60. The Network capability stores the NBIFOM capability for each network, i.e., for each PGW 30.

Here, the NBIFOM capability is identification information indicating whether or not capability of establishing the first PDN connection is supported for each network. In other words, the identification information indicates whether or not the PGW 30 supports the NBIFOM function. More specifically, for example, the NBIFOM capability may include "allowed" or "Not allowed."

Note that the NBIFOM function may be information indicating the possession of the function of establishing the multi-access PDN connection based on the NBIFOM.

Alternatively, the NBIFOM capability may be identification information indicating the possession of the capability of establishing the first PDN connection. In other words, the NBIFOM capability may be identification information indicating that a gateway supports the NBIFOM function. That is, the existence of the NBIFOM capability in the storage may mean that the PGW 30 is a gateway having the function of establishing the first PDN connection. In other words, the existence of the NBIFOM capability in the storage may mean that the PGW 30 is a gateway supporting the NBIFOM function.

2.3. Description of Initial State

An initial state in the present embodiment will be described. The initial state in the present embodiment may be a first initial state or a second initial state, both of which will be described later. Note that the initial state in the present embodiment need not be limited to the first or second initial state.

2.3.1. Description of First Initial State

The first initial state will be described. In the first state, the UE 10 has not established the first PDN connection with the core network 90. However, the UE 10 has already established the second PDN connection. In greater detail, the UE 10 has not established the first PDN connection with the PGW_A 1310. However, the UE 10 has established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the second PDN connection may be constituted of a transfer path between the UE 10 and the PGW 30 through the access network B. Thus, the second PDN connection may be constituted of a transfer path that is a combination of a transfer path between the UE 10 and the TWAG 74 and a transfer path between the TWAG 74 and the PGW_B 1320. Here, the transfer path may be a bearer.

As described above, in the first state early stage, the UE 10 may be in a state of being connected to the core network 90 via the access network B.

Note that the UE 10 need not be connected to the core network 90 via the access network A. In other words, the UE 10 need not perform an attach through the LTE access network.

Alternatively, the UE 10 may be in a state of being connected to the core network 90 via the access network A. In this case, the UE 10 may perform an attach procedure initiated by the UE 10 to establish the third PDN connection.

Note that the third PDN connection may be established with the gateway selected by using the APN 2. Alternatively, the third PDN connection may be established with a gateway selected by using another APN different from the APN 1 and the APN 2.

The first initial state has been described above; however, the first initial state is not limited the above-described state, and only needs to be a state in which the multi-access PDN connection based on the NBIFOM has not been established through the access network B, for example.

2.3.2. Description of Procedure for Leading to First Initial State

A procedure for leading to the first initial state will be described with reference to FIG. 15. In the procedure for leading to the first initial state, at least an attach procedure to the core network 90 through the access network B, illustrated in (A) of FIG. 15, is performed. The first initial state is a state after at least the attach procedure to the core network 90 through the access network B, illustrated in (A) of FIG. 15, is performed.

Next, details of the attach procedure to the core network 90 through the access network B will be described. The UE 10 first performs authentication procedure for accessing the access network B and the core network 90, and a security association procedure for establishing security association to transmit/receive a message to/from the core network 90 (S1502).

In greater detail, the UE 10 performs an authentication procedure for accessing the TWAG 74 arranged in the access network B and the PGW 30 arranged in the core network 90. Upon the completion of the authentication procedure, the UE 10 performs a procedure for establishing security associations between the UE 10 and the TWAG 74 and between the TWAG 74 and the PGW 30. In the authentication procedure and the procedure for establishing a security association, the UE 10 may transmit, to the core network 90, control information including the Access Point Name (APN). Furthermore, the authentication procedure and the procedure for establishing the security association may be performed on the basis of a technique such as the EAP. The UE 10 can obtain authentication for accessing the PGW 30 selected by the TWAG 74 using the APN.

Moreover, the UE 10 may transmit multiple APNs. For example, the transmission of the APN 1 and the APN 2 will allow the UE 10 to obtain, upon the completion of the authentication procedure and procedure for establishing the security association, authentication for accessing the PGW 30 selected by the TWAG 74 using the APN 1 and the PGW 30 selected by the TWAG 74 using the APN 2.

Upon the establishment of the security association, the UE 10 performs a PDN connectivity procedure for establishing the second PDN connection with the core network 90 through the access network B (S1504). In greater detail, the UE 10 establishes, via the TWAG 74, the PDN connection with the PGW_B 1320 arranged in the core network 90.

Specifically, the UE 10 transmits a PDN connectivity request to the TWAG 74 and/or the network. The UE 10 may transmit the PDN connectivity request including the APN 2.

The TWAG 74 and/or the network receives the PDN connectivity request transmitted from the UE 10. Upon the reception of the PDN connectivity request, the TWAG 74 and/or the network transmits a PDN connectivity accept to the UE 10. The TWAG 74 and/or the network may transmit the PDN connectivity accept including the APN 2.

The UE 10 receives the PDN connectivity accept transmitted from the TWAG 74 and/or the network. On the basis of the PDN connectivity accept, the UE 10 transmits a PDN connectivity complete to the TWAG 74 and/or the network. The TWAG 74 and/or the network receives the PDN connectivity complete transmitted from the UE 10.

2.3.3. Description of Second Initial State

A second initial state will be described. In the second initial state, the UE 10 is in a state of not being connected to the core network 90. In other words, the UE 10 has not established either the first PDN connection or the second PDN connection with the core network 90. In greater detail, the UE 10 has not established the first PDN connection with the PGW_A 1310 included and arranged in the core network 90. Furthermore, the UE 10 has not established the second PDN connection with the PGW_B 1320 included and arranged in the core network 90.

Note that the PGW_A 1310 may be a gateway device selected by using the APN 1. The PGW_B 1320 may be a gateway device selected by using the APN 2. Furthermore, the selection of gateway using the APN 1 and/or the APN 2 may be performed by the TWAG 74 included and arranged in the access network B and/or the MME 40 included and arranged in the core network 90.

As described above, the second initial state may be a state in which the UE 10 has no connection with the core network 90. In other words, the UE 10 may be in a state of not being connected to the core network 90 through either the access network A or access network B. Thus, the UE 10 may be in a state in which the PDN connection has not been established.

The second initial state has been described above; however, the second initial state is not limited to the above-described state, and only needs to be a state in which the connection to the core network 90 through the access network B has not been established, for example.

2.3.4. Description of Procedure for Leading to Second Initial State

A procedure for leading to the second initial state will be described with reference to FIG. 15. The procedure for leading to the second initial state may be a state in which the procedure illustrated in (A) of FIG. 15 is not performed. In other words, the second initial state may be a state in which a special procedure for connecting to the core network 90 through the access network B is not performed at all. That is, the second initial state may be a state in which the UE 10 performs initial connection to the core network 90 through the access network B.

2.3.5. Description of Multi-Access PDN Connectivity Establishment Procedure

Next, an establishment procedure of the first PDN connection will be described. Here, the initial state may be the first initial state or the second initial state. In the present embodiment, after the establishment of the initial state, the UE 10 performs a PDN connectivity procedure for establishing the first PDN connection with the core network 90 through the access network B (S1506). In greater detail, the UE 10 establishes, via the TWAG 74, the first PDN connection with the PGW_A 1310 arranged in the core network 90.

Note that the first PDN connection may be constituted of a transfer path that is a combination of a transfer path between the UE 10 and the TWAG 74 and a transfer path between the TWAG 74 and the PGW_A 1310. Here, the transfer path may be a bearer.

As illustrated in FIG. 15, the procedure for establishing the first PDN connection may be a PDN connectivity procedure using the APN 1. A specific example of the PDN connectivity procedure will be described below.

2.4. Examples of PDN Connectivity Procedure

Examples of the first to fourth PDN connectivity procedures for establishing the first PDN connection will be described with reference to FIGS. 16 to 18.

2.4.1. Example of First PDN Connectivity Procedure

An example of the first PDN connectivity procedure will be described with reference to FIG. 16.

As illustrated in (B) of FIG. 16, the UE 10 first performs the authentication procedure and the security association procedure for establishing the security association. Note that the UE 10 may perform the security association procedure when the initial state is the second initial state. In other words, when the initial state is the first initial state, the UE 10 need not perform the security association procedure. As described above, when the initial state is the first initial state, the UE 10 may omit the security association procedure since the security association has already been established.

Note that the security association procedure performed by the UE 10 may be similar to the security association procedure described in (A) of FIG. 15. Therefore, detailed description of the procedure will be omitted.

Next, the UE 10 transmits a PDN connectivity request to the TWAG 74 (S1902). The UE 10 may transmit the PDN connectivity request including at least the PDN connectivity request message identity (PDN connectivity request message ID), the Procedure transaction identity (Procedure transaction ID), the Request type (request type), and the PDN type. Furthermore, the UE 10 may include at least first identification information and/or fifth identification information in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit the PCO including the first identification information and/or fifth identification information and/or the TFT.

Here, the first identification information may be the UE NBIFOM capability representing that the UE 10 supports the NBIFOM. Note that the NBIFOM capability may be information indicating the possession of the function of establishing the multi-access PDN connection based on the NBIFOM.

Furthermore, the fifth identification information may be a Mode Indication representing an NBIFOM operation mode for the multi-access PDN connection, whose establishment is requested by the UE 10, based on the NBIFOM. Note that the UE 10 may include the UE-Initiated mode or the Network-Initiated mode in the fifth identification information.

Note that the first identification information may be the fifth identification information. More specifically, the UE 10 may represent, by transmitting the Mode Indication, that the UE 10 supports the NBIFOM.

As described above, the UE 10 may transmit the PDN connectivity request including the first identification information and/or fifth identification information to request the establishment of the multi-access PDN connection based on the NBIFOM.

The PDN connectivity request message ID may be a message type representing the PDN connectivity request message. The Procedure transaction ID may be information for identifying the PDN connectivity procedure.

The APN may be an APN to which the UE 10 requests a connection. More specifically, the APN may be the APN 1. The UE 10 may include the APN 1, in order to establish the multi-access PDN connection based on the NBIFOM. Here, the APN 1 may be an APN that is allowed to establish the multi-access PDN connection based on the NBIFOM and/or an APN that is allowed to perform communication based on the NBIFOM.

The request type may be information for identifying the type of the PDN connectivity procedure to be requested. For example, since the UE 10 performs an initial connection by using the APN 1, the request type may be the type indicating an attach, not the type indicating a handover.

The PDN type may indicate an available IP version. For example, the PDN type may be IPv4, IPv6, or IPv4v6. The PCO may be protocol information associated with the PDN connection. Furthermore, the PCO may include identification information on the request. Note that the UE 10 may transmit the PCO including the first identification information and/or fifth identification information.

The TFT may be information for identifying an IP flow that performs communication by using the PDN connection established in the present PDN connectivity procedure. Note that the IP flow to be identified may vary for each application. Thus, on the basis of the TFT, user data of a certain application can be identified.

More specifically, the TFT may be constituted of a five-tuple, or may be constituted of identification information such as the application ID. Note that the five-tuple may be constituted of a combination of one or more of a source IP address, a destination IP address, a source port number, a destination port number, and a protocol number.

When the UE 10 requests the establishment of the multi-access PDN connection based on the NBIFOM of the UE-Initiated mode, the UE 10 may include the TFT in the PDN connectivity request. Alternatively, when the UE 10 requests the establishment of the multi-access PDN connection based on the NBIFOM of the Network-Initiated mode, the UE 10 need not include the TFT in the PDN connectivity request.

In other words, when the UE 10 includes the UE-Initiated mode in the fifth identification information, the UE 10 may include the TFT in the PDN connectivity request. Alternatively, when the UE 10 includes the Network-Initiated mode in the fifth identification information, the UE 10 need not include the TFT in the PDN connectivity request.

Note that conventionally, the UE 10 can perform transmission, with information indicating the IFOM support included in the PCO. Here, the IFOM support is identification information representing that the IP Flow Mobility (IFOM) is supported. Furthermore, the IFOM is a technique for switching a communication path of a certain IP flow by using the Dual Stack Mobile IPv6 (DSMIPv6) protocol. Thus, including the information indicating the IFOM support in the PCO allows the UE 10 to switch the access network through which the communication of a certain IP flow is performed.

In the present embodiment, when the UE 10 includes the first identification information and/or fifth identification information in the PCO, the UE 10 does not include the IFOM support. In contrast, when the UE 10 includes the IFOM support in the PCO, the UE 10 does not include either the first identification information or the fifth identification information. As described above, it may be possible to not configure both the first identification information and/or fifth identification information and the IFOM support to be effective to ensure a clear distinction between the use of the switching of the communication path based on the NBIFOM and the use of the switching of the communication path based on the IFOM.

Thus, the UE 10 can establish either the PDN connection supporting the IFOM or the PDN connection supporting the NBIFOM, in the establishment procedure of a single PDN connection. In other words, the single PDN connection is any one of the PDN connection supporting the NBIFOM, the PDN connection supporting the IFOM, or the single-access PDN connection.

The TWAG 74 receives the PDN connectivity request transmitted from the UE 10. Upon the reception of the PDN connectivity request, and/or on the basis of the first identification information included in the PDN connectivity request and/or the fifth identification information included in the PDN connectivity request, the TWAG 74 transmits a create session request to the PGW 30 (S1904).

Upon the reception of the PDN connectivity request and/or on the basis of the first identification information included in the PDN connectivity request, the TWAG 74 may transmit the create session request including at least the first identification information.

Upon the reception of the PDN connectivity request and/or on the basis of the fifth identification information included in the PDN connectivity request, the TWAG 74 may transmit the create session request including at least the fifth identification information. The TWAG 74 may include the TFT in the create session request, upon the reception of the TFT transmitted from the UE 10.

Furthermore, the TFT may be information for identifying an IP flow that performs communication by using the PDN connection established in the present PDN connectivity procedure. Note that the IP flow to be identified may vary for each application. Thus, on the basis of the TFT, user data of a certain application can be identified.

More specifically, the TFT may be constituted of a five-tuple, or may be constituted of identification information such as the application ID. Note that the five-tuple may be constituted of a combination of one or more of a source IP address, a destination IP address, a source port number, a destination port number, and a protocol number.

When the TWAG 74 requests the establishment of the multi-access PDN connection based on the NBIFOM of the UE-Initiated mode, the TWAG 74 may include the TFT in the create session request. Alternatively, when the TWAG 74 requests the establishment of the multi-access PDN connection based on the NBIFOM of the Network-Initiated mode, the TWAG 74 need not include the TFT in the create session request.

In other words, when the UE-Initiated mode is included in the first identification information and/or fifth identification information included in the PDN connectivity request, the TWAG 74 may include the TFT in the create session request. Alternatively, when the Network-Initiated mode is included in the first identification information and/or fifth identification information included in the PDN connectivity request, the TWAG 74 need not include the TFT in the create session request.

Here, the TWAG 74 may determine, on the basis of the first identification information and/or the fifth identification information, whether to request the establishment of the multi-access PDN connection of the UE-Initiated mode or request the establishment of the multi-access PDN connection of the Network-Initiated mode.

Note that when the first identification information is not included in the PDN connectivity request, the TWAG 74 may transmit the create session request without including the first identification information. Furthermore, when the fifth identification information is not included in the PDN connectivity request, the TWAG 74 may transmit the create session request without including the fifth identification information. Moreover, when neither the first identification information nor the fifth identification information is included in the PDN connectivity request, the TWAG 74 may perform a procedure for establishing the single-access PDN connection.

The PGW 30 receives the create session request transmitted from the TWAG 74. Upon the reception of the create session request, and/or on the basis of the first identification information and/or fifth identification information included in the create session request, the PGW 30 may perform the IP-CAN session update procedure with the PCRF 60.

The PGW 30 may transmit, to the PCRF 60, a control message in the IP-CAN session procedure, including information indicating whether the PDN connection to be established is the multi-access PDN connection based on the NBIFOM or the single-access PDN connection, and/or the first identification information, and/or the fifth identification information.

More specifically, when the multi-access PDN connection based on the NBIFOM is to be established, the PGW 30 transmits, to the PCRF 60, the information indicating the access network B, the PDN connection ID, the information indicating that the PDN connection is the multi-access PDN connection based on the NBIFOM, and the first identification information and/or fifth identification information. Alternatively, when the single-access PDN connection is to be established, the PGW 30 transmits, to the PCRF 60, the information indicating the access network B, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

The create session request the create session request note that the PGW 30 may perform the IP-CAN session update procedure to notify the PCRF 60 of information on the UE 10 and/or TWAG 74.

Furthermore, upon the reception of the first identification information and/or fifth identification information, the PCRF 60 may transmit, to the PGW 30, a control message in the IP-CAN session update procedure with the PGW 30, the control message including at least the seventh identification information. The detailed description of the seventh identification information will be described later.

Note that the PCRF 60 may perform the IP-CAN session update procedure to notify the PGW 30 of the charging information and/or the QoS control information and/or the routing information.

Upon the reception of the create session request or the completion of the IP-CAN session update procedure, and/or on the basis of the first identification information and/or fifth identification information included in the create session request, and/or on the basis the seventh identification information included in the IP-CAN session update procedure, the PGW 30 transmits a create session response to the TWAG 74 (S1906).

Upon the reception of the create session request or the completion of the IP-CAN session update procedure, and/or on the basis of the fifth identification information included in the create session request and/or the seventh identification information included in the IP-CAN session update procedure, the PGW 30 may transmit the create session response including at least the seventh identification information.

Note that a method by which the PGW 30 acquires the seventh identification information is not limited to the above-described method for acquiring the seventh identification information from the PCRF 60 in the IP-CAN session update procedure, and another example may be employed. For example, the PGW 30 may create the seventh identification information and transmit the create session response including the seventh identification information, without acquiring the seventh identification information from the PCRF 60 in the IP-CAN session update procedure.

Here, the seventh identification information may be an Allowed Mode representing the NBIFOM operation mode that is allowed for the multi-access PDN connection based on the NBIFOM to be established. In other words, the fifth identification information is an operation mode requested by the UE 10, whereas the seventh identification information may be an operation mode allowed by the operator.

Note that the PCRF 60 or the PGW 30 may determine the Allowed Mode and the seventh identification information on the basis of the operator policy. For example, a policy that allows for the establishment of only the PDN connection of the UE-Initiated mode, a policy that allows for the establishment of only the PDN connection of the Network-Initiated mode, a policy that allows for the establishment of both modes, a policy that prohibits the establishment of both modes, and the like may be managed.

Note that the PCRF 60 or the PGW 30 may acquire the operator policy from the HSS or the like. Alternatively, an operator policy created by an administrator may be stored.

In addition, for the operator policy, a policy different for each subscriber may be managed. Alternatively, a policy different for each APN may be managed. For example, for each APN, a different Allowed Mode for the PDN connection to be established may be managed.

In the present example, a case will be described in which the establishment of the PDN connection of the NBIFOM operation mode included in the fifth identification information is allowed on the basis of the Allowed Mode.

Thus, the PCRF 60 or the PGW 30 allows for the establishment of the PDN connection on the basis of the NBIFOM operation mode included in the fifth identification information, and includes, in the seventh identification information, the same operation mode as that of the fifth identification information.

In other words, when the UE-Initiated mode is included in the fifth identification information, the PCRF 60 or the PGW 30 may include the UE-Initiated mode in the seventh identification information. Alternatively, when the Network-Initiated mode is included in the fifth identification information, the PCRF 60 or the PGW 30 may include the Network-Initiated mode in the seventh identification information.

As described above, when the establishment of the PDN connection of the NBIFOM operation mode included in the fifth identification information is allowed on the basis of the Allowed Mode, a mode requested by the UE 10 out of one or multiple operation modes allowed on the basis of the Allowed Mode may be regarded as the seventh identification information.

The PGW 30 may include the PDN Address (PDN address) and/or the PDN connection ID and/or the TFT in the create session response.

The PDN Address may be an IP address assigned to the UE 10. For example, the PDN Address may be an IPv4 address, an IPv6 prefix and an interface ID for constituting an IPv6 address. Here, the PGW 30 may assign the IP address of the UE 10. Moreover, the PGW 30 may include the IP address assigned to the UE 10 in the PDN Address.

Furthermore, the PDN connection ID may be information for uniquely identifying the PDN connection established between the UE 10 and the PGW 30. The PDN connection ID may be assigned by the PGW 30, or may be assigned by the TWAG 74. In other words, the PGW 30 may assign the PDN connection ID.

The TWAG 74 receives the create session response transmitted from the PGW 30. Upon the reception of the create session response and/or on the basis of the seventh identification information included in the create session response, the TWAG 74 transmits a PDN connectivity accept to the UE 10 (S1908).

Upon the reception of the create session response and/or on the basis of the seventh identification information included in the create session response, the TWAG 74 may transmit the PDN connectivity accept including at least a PDN connectivity accept message identity (PDN connectivity accept message ID), the Procedure transaction ID, the APN, the PDN Address (PDN address), the PDN connection ID, and the User Plane Connection ID (user plane connection ID). Furthermore, the TWAG 74 may include at least the seventh identification information in the PDN connectivity accept. Moreover, the TWAG 74 may include the PCO and/or the Cause and/or the TFT and/or the PDN connection attribute information, in the PDN connectivity accept. Note that the TWAG 74 may transmit the PCO including the seventh identification information and/or the TFT.

Here, the PDN connectivity accept message ID may be a message type representing the PDN connectivity accept message.

The APN may be an APN to which the UE 10 is allowed to connect. More specifically, the APN may be the APN 1. The APN 1 may be an APN that is allowed to establish the multi-access PDN connection based on the NBIFOM. The TWAG 74 may include the APN 1 in the PDN connectivity accept.

The PDN Address may be an IP address assigned to the UE 10. For example, the PDN Address may be an IPv4 address, or an interface ID for constituting an IPv6 address.

The PDN connection ID may be information for uniquely identifying the PDN connection established between the UE 10 and the PGW 30. The PDN connection ID may be an ID assigned by the PGW 30, or an ID assigned by the TWAG 74. In other words, the TWAG 74 may assign the PDN connection ID.

The User Plane Connection ID is information for identifying a user plane. The user plane is a transfer path used for transferring user data in the PDN connection. The TWAG 74 may assign the User Plane Connection ID.

The Cause may be information representing that the PDN type of the PDN Address assigned to the UE 10 is different from the PDN type requested by the UE 10 in the PDN connectivity request.

Note that the TWAG 74 and/or the PGW 30 may include the seventh identification information in the PCO. However, when the TWAG 74 and/or the PGW 30 includes the seventh identification information in the PCO, the TWAG 74 and/or the PGW 30 does not include the IFOM support. In contrast, when the TWAG 74 and/or the PGW 30 includes the IFOM support in the PCO, the TWAG 74 and/or the PGW 30 does not include the seventh identification information. As described above, it may be possible to not configure both the seven identification information and the IFOM support to be effective to ensure a clear distinction between the use of the switching of the communication path on the basis of the NBIFOM and the use of the switching of the communication path on the basis of the IFOM.

The PDN connection attribute information may be information indicating that the PDN connection established in the present PDN connectivity procedure is the multi-access PDN connection, and/or information indicating that user data transmitted/received by using the PDN connection established in the PDN connection the present PDN connectivity procedure is allowed to be transmitted/received through the access network A and the access network B, and/or information indicating that the PDN connection established in the present PDN connectivity procedure is the multi-access PDN connection based on the NBIFOM of the operation mode indicated by the seventh identification information.

Note that the UE 10 may transmit the PDN connectivity accept message that further includes a connectivity type indicating the type of the PDN connection and/or WLAN offload permission information (WLAN offload acceptability) indicating whether or not the WLAN offload can be performed. Furthermore, the TWAG 74 may transmit the connectivity type or the WLAN offload permission information including the PDN connection attribute information.

The UE 10 receives the PDN connectivity accept transmitted from the TWAG 74 (S1910). Upon the reception of the PDN connectivity accept and/or on the basis of the seventh identification information included in the PDN connectivity accept, the UE 10 transmits a PDN connectivity complete to the TWAG 74. The UE 10 may transmit the PDN connectivity complete including at least the PDN connectivity complete message ID (PDN connectivity complete), the Procedure transaction ID, and the PDN connection ID.

Here, the PDN connectivity complete message ID may be a message type representing the PDN connectivity complete message.

After the first PDN connectivity procedure is completed, the UE 10 and the PGW 30 establish the first PDN connection of the NBIFOM operation mode requested by the UE 10. Upon the reception of the PDN connectivity accept, and/or on the basis of the PDN connection attribute information and/or the seventh identification information, the UE 10 may identify that the established PDN connection is the multi-access PDN connection based on the NBIFOM of the NBIFOM operation mode requested by the UE 10. Upon the establishment of the first PDN connection, the UE 10 and the PGW 30 determine a PDN connection and/or a transfer path (such as an EPS bearer) for transmitting/receiving the IP flow by using the TFT, and transmit/receive user data corresponding to the IP flow identified on the basis of the TFT. More specifically, the UE 10 and the PGW 30 transmit/receive a flow identified on the basis of the TFT by using the first PDN connection.

Note that in the example of the first PDN connectivity procedure, a case has been described in which the transmission/reception of the TFT is included in the PDN connectivity procedure; however, the first PDN connectivity procedure is not limited to this case. The transmission/reception of the TFT may be performed after the multi-access PDN connection based on the NBIFOM is established.

Therefore, the UE 10 and the TWAG 74 may perform transmission/reception without including the TFT in the PDN connectivity request and/or the PDN connectivity response (PDN connectivity accept), and establish the multi-access PDN connection based on the NBIFOM. In other words, at a point in time when the PDN connection is established, there may be no IP flow transmitting/receiving user data by using the PDN connection. In this case, the UE 10 and the TWAG 74 transmit the TFT after the multi-access PDN connection based on the NBIFOM is established.

More specifically, when the PDN connection of the UE-Initiated mode is established, the UE 10 may transmit the TFT to the TWAG 74. In addition, the TWAG 74 receives the TFT from the UE 10 and transmits the TFT to the PGW 30. Thus, the UE 10 and the PGW 30 can determine a PDN connection and/or a transfer path (such as an EPS bearer) for transmitting/receiving the IP flow by using the TFT, and transmit/receive user data corresponding to the IP flow identified on the basis of the TFT.

On the other hand, when the PDN connection of the Network-Initiated mode is established, the PGW 30 may transmit the TFT to the TWAG 74. Here, the PGW 30 may receive, from the PCRF 60, the TFT determined on the basis of the operator policy. In addition, the TWAG 74 receives the TFT from the PGW 30 and transmits the TFT to the UE 10. Thus, the UE 10 and the PGW 30 can determine a PDN connection and/or a transfer path (such as an EPS bearer) for transmitting/receiving the IP flow by using the TFT, and transmit/receive user data corresponding to the IP flow identified on the basis of the TFT.

Furthermore, in the example of the first PDN connectivity procedure, a case has been described in which the UE 10 and the PGW 30 establish the second PDN connection without complying with the request, from the UE 10, of the establishment of the first PDN connection; however, the first PDN connectivity procedure is not limited to this case. The UE 10 may reject the establishment of the second PDN connection.

For example, when the UE 10 does not support the second PDN connection and/or when the establishment of the second PDN connection does not comply with the policy of the UE 10, the UE 10 may reject the establishment of the second PDN connection.

In greater detail, the UE 10 may transmit a PDN connectivity reject to the TWAG 74, upon the reception of the PDN connectivity accept and/or on the basis of the seventh identification information included in the PDN connectivity accept and/or the PDN connection attribute information and/or the policy of the UE 10.

The UE 10 may transmit the PDN connectivity reject including at least one or more of the PDN connectivity reject message identity (PDN connectivity reject message ID), the Procedure transaction ID, and the Cause. Furthermore, the UE 10 may further include fourth identification information in the PDN connectivity reject. Moreover, the UE 10 may further include the PCO and/or the Tw1 value in the PDN connectivity reject. Note that the UE 10 may transmit the PCO including the fourth identification information.

The fourth identification information may be information representing that the UE 10 does not support the second PDN connection and/or information representing that the establishment of the second PDN connection does not comply with the policy of the UE 10.

The PDN connectivity reject message ID may be a message type representing the PDN connectivity reject message.

The Cause may be information representing a reason why the PDN connectivity request is rejected. Here, the UE 10 may notify the UE 10 of the fourth identification information included in the Cause.

The Tw1 value may be a value of the Tw1 timer, included when the Cause represents insufficient resources.

The TWAG 74 may receive the PDN connectivity reject transmitted from the UE 10. Upon the reception of the PDN connectivity reject and/or the fourth identification information included in the PDN connectivity reject, the TWAG 74 may delete the EPS bearer context, held by the TWAG 74, relating to the established PDN connection. Furthermore, the TWAG 74 may transmit, to the PGW 30, the fourth identification information included in the PDN connectivity reject.

The PGW 30 may receive the fourth identification information transmitted from the TWAG 74. Upon the reception of the fourth identification information and/or on the basis of the operator policy, the PGW 30 may delete the EPS bearer context, held by the PGW 30, relating to the established PDN connection.

Furthermore, the PGW 30 may perform the IP-CAN session update procedure with the PCRF 60, upon the reception of the fourth identification information. The PGW 30 may include the fourth identification information in the IP-CAN session update procedure.

The PCRF 60 may change the operator policy on the basis of the IP-CAN session update procedure. Note that on the basis of the change of the operator policy, the PGW 30 may delete the EPS bearer context, held by the PGW 30, relating to the established PDN connection.

2.4.2. Example of Second PDN Connectivity Procedure

An example of the second PDN connectivity procedure will be described with reference to FIG. 17.

As illustrated in (B) of FIG. 17, the UE 10 first performs the authentication procedure and the security association procedure for establishing the security association. Note that the UE 10 may perform the security association procedure when the initial state is the second initial state. In other words, when the initial state is the first initial state, the UE 10 need not perform the security association procedure. As described above, when the initial state is the first initial state, the UE 10 may omit the security association procedure since the security association has already been established.

Note that the security association procedure performed by the UE 10 may be similar to the security association procedure described in (A) of FIG. 15. Therefore, detailed description of the procedure will be omitted.

Next, the UE 10 transmits a PDN connectivity request to the TWAG 74 (S2002). The UE 10 may transmit the PDN connectivity request including at least the PDN connectivity request message identity (PDN connectivity request message ID), the Procedure transaction identity (Procedure transaction ID), the Request type (request type), and the PDN type. Furthermore, the UE 10 may include at least first identification information and/or fifth identification information in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit the PCO including the first identification information and/or fifth identification information and/or the TFT.

Here, the first identification information may be the UE NBIFOM capability representing that the UE 10 supports the NBIFOM. Note that the NBIFOM capability may be information indicating the possession of the function of establishing the multi-access PDN connection based on the NBIFOM.

Here, the fifth identification information may be a Mode Indication representing an NBIFOM operation mode for the multi-access PDN connection, whose establishment is requested by the UE 10, based on the NBIFOM. Note that the UE 10 may include the UE-Initiated mode or the Network-Initiated mode in the fifth identification information.

Note that the first identification information may be the fifth identification information. More specifically, the UE 10 may represent, by transmitting the Mode Indication, that the UE 10 supports the NBIFOM.

As described above, the UE 10 may transmit the PDN connectivity request including the first identification information and/or fifth identification information to request the establishment of the multi-access PDN connection based on the NBIFOM. The PDN connectivity request message ID may be a message type representing the PDN connectivity request message. The Procedure transaction ID may be information for identifying the PDN connectivity procedure.

The APN may be an APN to which the UE 10 requests a connection. More specifically, the APN may be the APN 1. The UE 10 may include the APN 1, in order to establish the multi-access PDN connection based on the NBIFOM. Here, the APN 1 may be an APN that is allowed to establish the multi-access PDN connection based on the NBIFOM and/or an APN that is allowed to perform communication based on the NBIFOM.

The request type may be information for identifying the type of the PDN connectivity procedure to be requested. For example, since the UE 10 performs an initial connection by using the APN 1, the request type may be the type indicating an attach, rather than the type indicating a handover.

The PDN type may indicate an available IP version. For example, the PDN type may be IPv4, IPv6, or IPv4v6. The PCO may be protocol information associated with the PDN connection. Furthermore, the PCO may include identification information on the request. Note that the UE 10 may transmit the PCO including the first identification information and/or fifth identification information.

The TFT may be information for identifying an IP flow that performs communication by using the PDN connection established in the present PDN connectivity procedure. Note that the IP flow to be identified may vary for each application. Thus, on the basis of the TFT, user data of a certain application can be identified.

More specifically, the TFT may be constituted of a five-tuple, or may be constituted of identification information such as the application ID. Note that the five-tuple may be constituted of a combination of one or more of a source IP address, a destination IP address, a source port number, a destination port number, and a protocol number.

When the UE 10 requests the establishment of the multi-access PDN connection based on the NBIFOM of the UE-Initiated mode, the UE 10 may include the TFT in the PDN connectivity request. Alternatively, when the UE 10 requests the establishment of the multi-access PDN connection based on the NBIFOM of the Network-Initiated mode, the UE 10 need not include the TFT in the PDN connectivity request.

In other words, when the UE 10 includes the UE-Initiated mode in the fifth identification information, the UE 10 may include the TFT in the PDN connectivity request. Alternatively, when the UE 10 includes the Network-Initiated mode in the fifth identification information, the UE 10 need not include the TFT in the PDN connectivity request.

Note that conventionally, the UE 10 can perform transmission, with information indicating the IFOM support included in the PCO. Here, the IFOM support is identification information representing that the IP Flow Mobility (IFOM) is supported. Furthermore, the IFOM is a technique for switching a communication path of a certain IP flow by using the Dual Stack Mobile IPv6 (DSMIPv6) protocol. Thus, including the information indicating the IFOM support in the PCO allows the UE 10 to switch the access network through which the communication of a certain IP flow is performed.

In the present embodiment, when the UE 10 includes the first identification information and/or fifth identification information in the PCO, the UE 10 does not include the IFOM support. In contrast, when the UE 10 includes the IFOM support in the PCO, the UE 10 does not include the first identification information and/or the fifth identification information. As described above, it may be possible to not configure both the first identification information and/or fifth identification information and the IFOM support to be effective to ensure a clear distinction between the use of the switching of the communication path based on the NBIFOM and the use of the switching of the communication path based on the IFOM.

Thus, the UE 10 can establish either the PDN connection supporting the IFOM or the PDN connection supporting the NBIFOM, in the establishment procedure of a single PDN connection. In other words, the single PDN connection is any one of the PDN connection supporting the NBIFOM, the PDN connection supporting the IFOM, or the single-access PDN connection.

In response to the PDN connectivity request received from the UE 10, the TWAG 74 may transmit a PDN connectivity reject to the UE 10 (S2008).

The TWAG 74 may determine to transmit the PDN connectivity reject on the basis of the operator policy. For example, when the operator policy does not allow the UE 10 to establish the multi-access PDN connection based on the NBIFOM, or when the operator policy does not allow for the NBIFOM operation mode requested by the UE 10, the TWAG 74 may transmit the PDN connectivity reject to the UE 10.

More specifically, when the UE 10 requests the establishment of the PDN connection of the UE-Initiated mode but the operator policy does not allow for the establishment of the PDN connection in the UE-Initiated mode, the TWAG 74 may transmit the PDN connectivity reject to the UE 10. Furthermore, when the UE 10 requests the establishment of the PDN connection of the Network-Initiated mode but the operator policy does not allow for the establishment of the PDN connection in the Network-Initiated mode, the TWAG 74 may transmit the PDN connectivity reject to the UE 10.

Upon the reception of the PDN connectivity request and/or on the basis of the first identification information and/or fifth identification information included in the PDN connectivity request, the TWAG 74 may transmit the PDN connectivity reject including at least the PDN connectivity reject message identity (PDN connectivity reject message ID), the Procedure transaction ID, and the Cause. Furthermore, the TWAG 74 may include at least the seventh identification information and/or the eighth identification information in the PDN connectivity reject. Moreover, the TWAG 74 may include the PCO and/or the Tw1 value in the PDN connectivity reject. Note that the TWAG 74 may transmit the PCO including the seventh identification information and/or the eighth identification information.

Here, the seventh identification information may be the Allowed Mode representing the NBIFOM operation mode that is allowed for the multi-access PDN connection based on the NBIFOM to be established. In other words, the fifth identification information is an operation mode requested by the UE 10, whereas the seventh identification information may be an operation mode allowed by the operator.

Note that the TWAG 74 may determine the Allowed Mode and the seventh identification information on the basis of the operator policy. For example, a policy that allows for the establishment of only the PDN connection of the UE-Initiated mode, a policy that allows for the establishment of only the PDN connection of the Network-Initiated mode, a policy that allows for the establishment of both modes, a policy that prohibits the establishment of both modes, and the like may be managed.

Note that the TWAG 74 may acquire the operator policy from the AAA 55, the HSS 50, and the like. Alternatively, an operator policy created by an administrator may be stored. In addition, for the operator policy, a policy different for each subscriber may be managed. Alternatively, a policy different for each APN may be managed. For example, for each APN, a different Allowed Mode for the PDN connection to be established may be managed.

In the present example, on the basis of the Allowed Mode, a case will be described in which the establishment of the PDN connection of the NBIFOM operation mode included in the fifth identification information is not allowed.

Thus, the TWAG 74 does not allow for the establishment of the PDN connection based on the NBIFOM operation mode included in the fifth identification information, and includes, in the seventh identification information, an operation mode that is a mode allowed by the Allowed Mode and is different from the fifth identification information.

In other words, when the UE-Initiated mode is included in the fifth identification information and the Network-Initiated mode is allowed, the TWAG 74 may include the Network-Initiated mode in the seventh identification information. Alternatively, when the Network-Initiated mode is included in the fifth identification information and the UE-Initiated mode is allowed, the TWAG 74 may include the UE-Initiated mode in the seventh identification information.

Note that when the establishment of the PDN connection based on the operation mode different from the fifth identification information is not allowed, the TWAG 74 need not include the seventh identification information. In such case, the TWAG 74 may transmit the PDN connectivity reject including the cause information indicating that the requested operation mode is not allowed.

As described above, on the basis of the Allowed Mode, when the establishment of the PDN connection of the NBIFOM operation mode included in the fifth identification information is not allowed, an operation mode that is other than the NBIFOM operation mode included in the fifth identification information and is allowed to establish the PDN connection may be regarded as the seventh identification information, on the basis of the Allowed Mode.

Furthermore, the eighth identification information may be a Rejected Mode representing the NBIFOM operation mode for the multi-access PDN connection based on the NBIFOM rejected by the TWAG 74. Note that the TWAG 74 may include, in the eighth identification information, the same mode as the NBIFOM operation mode included in the fifth identification information.

In other words, when the UE-Initiated mode is included in the fifth identification information, the PGW 30 and/or the PCRF 60 may include the UE-Initiated mode in the eighth identification information. Alternatively, when the Network-Initiated mode is included in the fifth identification information, the PGW 30 and/or the PCRF 60 may include the Network-Initiated mode in the eighth identification information.

The PDN connectivity reject message ID may be a message type representing the PDN connectivity reject message. The Cause may be information representing a reason why the PDN connectivity request is rejected.

The Tw1 value may be a value of the Tw1 timer, included when the Cause represents insufficient resources.

The UE 10 receives the PDN connectivity reject transmitted from the TWAG 74. Upon the reception of the PDN connectivity reject and/or on the basis of the seventh identification information and/or eighth identification information included in the PDN connectivity reject, the UE 10 may newly perform the PDN connectivity procedure (S2010).

The UE 10 may perform the PDN connectivity procedure including a mode different from the NBIFOM operation mode that is included in the fifth identification information in the PDN connectivity request.

Note that the UE 10 may regard the seventh identification information received from the TWAG 74 as the fifth identification information. Alternatively, the UE 10 may regard the eighth identification information received from the TWAG 74 as the fifth identification information.

In other words, when the UE 10 includes the UE-Initiated mode in the fifth identification information in the PDN connectivity request of the first time, the UE 10 may perform the PDN connectivity procedure including the Network-Initiated mode. Alternatively, when the UE 10 includes the UE-Initiated mode in the fifth identification information in the PDN connectivity request of the first time, the UE 10 may perform the PDN connectivity procedure including the Network-Initiated mode.

In addition, when the seventh identification information included in the PDN connectivity reject is the UE-Initiated mode, the UE 10 may perform the PDN connectivity procedure including the UE-Initiated mode. Alternatively, when the seventh identification information included in the PDN connectivity reject is the Network-Initiated mode, the UE 10 may perform the PDN connectivity procedure including the Network-Initiated mode.

In addition, when the eighth identification information included in the PDN connectivity reject is the UE-Initiated mode, the UE 10 may perform the PDN connectivity procedure including the Network-Initiated mode. Alternatively, when the eighth identification information included in the PDN connectivity reject is the Network-Initiated mode, the UE 10 may perform the PDN connectivity procedure including the UE-Initiated mode.

Note that when UE 10 does not receive the seventh identification information and/or when there is no any other operation mode allowed for the PDN connection and/or when the establishment of the PDN connection of the other operation mode is not requested, the UE 10 need not newly initiate the PDN connectivity procedure.

Note that details of the PDN connectivity procedure may be similar to those of the PDN connectivity procedure described with reference to FIG. 16 in 1.4.1. Example of First PDN Connectivity Procedure. Therefore, detailed description will be omitted.

After the second PDN connectivity procedure is completed, the UE 10 and the PGW 30 establish the first PDN connection of a mode different from the NBIFOM operation mode that the UE 10 initially requests). Upon the establishment of the first PDN connection, the UE 10 and the PGW 30 determine a PDN connection and/or a transfer path (such as an EPS bearer) for transmitting/receiving the IP flow by using the TFT, and transmit/receive user data corresponding to the IP flow identified on the basis of the TFT. More specifically, the UE 10 and the PGW 30 transmit/receive a flow identified on the basis of the TFT by using the first PDN connection.

Note that in the example of the second PDN connectivity procedure, a case has been described in which the transmission/reception of the TFT is included in the PDN connectivity procedure; however, the second PDN connectivity procedure is not limited to this case. The transmission/reception of the TFT may be performed after the multi-access PDN connection based on the NBIFOM is established.

Therefore, the UE 10 and the TWAG 74 may perform transmission/reception without including the TFT in the PDN connectivity request and/or the PDN connectivity response (PDN connectivity accept), and establish the multi-access PDN connection based on the NBIFOM. In other words, at a point in time when the PDN connection is established, there may be no IP flow transmitting/receiving user data by using the PDN connection. In this case, the UE 10 and the TWAG 74 transmit the TFT after the multi-access PDN connection based on the NBIFOM is established.

More specifically, when the PDN connection of the UE-Initiated mode is established, the UE 10 may transmit the TFT to the TWAG 74. In addition, the TWAG 74 receives the TFT from the UE 10 and transmits the TFT to the PGW 30. Thus, the UE 10 and the PGW 30 can determine a PDN connection and/or a transfer path (such as an EPS bearer) for transmitting/receiving the IP flow by using the TFT, and transmit/receive user data corresponding to the IP flow identified on the basis of the TFT.

On the other hand, when the PDN connection of the Network-Initiated mode is established, the PGW 30 may transmit the TFT to the TWAG 74. Here, the PGW 30 may receive, from the PCRF 60, the TFT determined on the basis of the operator policy. In addition, the TWAG 74 receives the TFT from the PGW 30 and transmits the TFT to the UE 10. Thus, the UE 10 and the PGW 30 can determine a PDN connection and/or a transfer path (such as an EPS bearer) for transmitting/receiving the IP flow by using the TFT, and transmit/receive user data corresponding to the IP flow identified on the basis of the TFT.

2.4.3. Example of Third PDN Connectivity Procedure

An example of the third PDN connectivity procedure will be described with reference to FIG. 16.

As illustrated in (B) of FIG. 16, the UE 10 first performs the authentication procedure and the security association procedure for establishing the security association. Note that the UE 10 may perform the security association procedure when the initial state is the second initial state. In other words, when the initial state is the first initial state, the UE 10 need not perform the security association procedure. As described above, when the initial state is the first initial state, the UE 10 may omit the security association procedure since the security association has already been established.

Note that the security association procedure performed by the UE 10 may be similar to the security association procedure described in (A) of FIG. 15. Therefore, detailed description of the procedure will be omitted.

Next, the UE 10 transmits a PDN connectivity request to the TWAG 74 (S1902). The UE 10 may transmit the PDN connectivity request including at least the PDN connectivity request message identity (PDN connectivity request message ID), the Procedure transaction identity (Procedure transaction ID), the Request type (request type), and the PDN type. Furthermore, the UE 10 may include at least first identification information and/or fifth identification information in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit the PCO including the first identification information and/or fifth identification information and/or the TFT.

Here, the first identification information may be the UE NBIFOM capability representing that the UE 10 supports the NBIFOM. Note that the NBIFOM capability may be information indicating the possession of the function of establishing the multi-access PDN connection based on the NBIFOM.

Furthermore, the fifth identification information may be a Mode Indication representing an NBIFOM operation mode for the multi-access PDN connection, whose establishment is requested by the UE 10, based on the NBIFOM. Note that the UE 10 may include the UE-Initiated mode or the Network-Initiated mode in the fifth identification information.

Note that the first identification information may be the fifth identification information. More specifically, the UE 10 may represent, by transmitting the Mode Indication, that the UE 10 supports the NBIFOM.

As described above, the UE 10 may transmit the PDN connectivity request including the first identification information and/or fifth identification information to request the establishment of the multi-access PDN connection based on the NBIFOM.

The PDN connectivity request message ID may be a message type representing the PDN connectivity request message.

The Procedure transaction ID may be information for identifying the PDN connectivity procedure.

The APN may be an APN to which the UE 10 requests a connection. More specifically, the APN may be the APN 1. The UE 10 may include the APN 1, in order to establish the multi-access PDN connection based on the NBIFOM. Here, the APN 1 may be an APN that is allowed to establish the multi-access PDN connection based on the NBIFOM and/or an APN that is allowed to perform communication based on the NBIFOM.

The request type may be information for identifying the type of the PDN connectivity procedure to be requested. For example, since the UE 10 performs an initial connection by using the APN 1, the request type may be the type indicating an attach, rather than the type indicating a handover.

The PDN type may indicate an available IP version. For example, the PDN type may be IPv4, IPv6, or IPv4v6. The PCO may be protocol information associated with the PDN connection. Furthermore, the PCO may include identification information on the request. Note that the UE 10 may transmit the PCO including the first identification information and/or fifth identification information.

The TFT may be information for identifying an IP flow that performs communication by using the PDN connection established in the present PDN connectivity procedure. Note that the IP flow to be identified may vary for each application. Thus, on the basis of the TFT, user data of a certain application can be identified.

More specifically, the TFT may be constituted of a five-tuple, or may be constituted of identification information such as the application ID. Note that the five-tuple may be constituted of a combination of one or more of a source IP address, a destination IP address, a source port number, a destination port number, and a protocol number.

When the UE 10 requests the establishment of the multi-access PDN connection based on the NBIFOM of the UE-Initiated mode, the UE 10 may include the TFT in the PDN connectivity request. Alternatively, when the UE 10 requests the establishment of the multi-access PDN connection based on the NBIFOM of the Network-Initiated mode, the UE 10 need not include the TFT in the PDN connectivity request.

In other words, when the UE 10 includes the UE-Initiated mode in the fifth identification information, the UE 10 may include the TFT in the PDN connectivity request. Alternatively, when the UE 10 includes the Network-Initiated mode in the fifth identification information, the UE 10 need not include the TFT in the PDN connectivity request.

Note that conventionally, the UE 10 can perform transmission, with information indicating the IFOM support included in the PCO. Here, the IFOM support is identification information representing that the IP Flow Mobility (IFOM) is supported. Furthermore, the IFOM is a technique for switching a communication path of a certain IP flow by using the Dual Stack Mobile IPv6 (DSMIPv6) protocol. Thus, including the information indicating the IFOM support in the PCO allows the UE 10 to switch the access network through which the communication of a certain IP flow is performed.

In the present embodiment, when the UE 10 includes the first identification information and/or fifth identification information in the PCO, the UE 10 does not include the IFOM support. In contrast, when the UE 10 includes the IFOM support in the PCO, the UE 10 does not include either the first identification information or the fifth identification information. As described above, it may be possible to not configure both the first identification information and/or fifth identification information and the IFOM support to be effective to ensure a clear distinction between the use of the switching of the communication path based on the NBIFOM and the use of the switching of the communication path based on the IFOM.

Thus, the UE 10 can establish either the PDN connection supporting the IFOM or the PDN connection supporting the NBIFOM, in the establishment procedure of a single PDN connection. In other words, the single PDN connection is any one of the PDN connection supporting the NBIFOM, the PDN connection supporting the IFOM, or the single-access PDN connection.

The TWAG 74 receives the PDN connectivity request transmitted from the UE 10. Upon the reception of the PDN connectivity request, and/or on the basis of the first identification information included in the PDN connectivity request and/or the fifth identification information included in the PDN connectivity request, the TWAG 74 transmits a create session request to the PGW 30 (S1904).

Upon the reception of the PDN connectivity request and/or on the basis of the first identification information included in the PDN connectivity request, the TWAG 74 may transmit the create session request including at least the first identification information.

Upon the reception of the PDN connectivity request and/or on the basis of the fifth identification information included in the PDN connectivity request, the TWAG 74 may transmit the create session request including at least the fifth identification information. The TWAG 74 may include the TFT in the create session request, upon the reception of the TFT transmitted from the UE 10.

Furthermore, the TFT may be information for identifying an IP flow that performs communication by using the PDN connection established in the present PDN connectivity procedure. Note that the IP flow to be identified may vary for each application. Thus, on the basis of the TFT, user data of a certain application can be identified.

More specifically, the TFT may be constituted of a five-tuple, or may be constituted of identification information such as the application ID. Note that the five-tuple may be constituted of a combination of one or more of a source IP address, a destination IP address, a source port number, a destination port number, and a protocol number.

When the TWAG 74 requests the establishment of the multi-access PDN connection based on the NBIFOM of the UE-Initiated mode, the TWAG 74 may include the TFT in the create session request. Alternatively, when the TWAG 74 requests the establishment of the multi-access PDN connection based on the NBIFOM of the Network-Initiated mode, the TWAG 74 need not include the TFT in the create session request.

In other words, when the UE-Initiated mode is included in the first identification information and/or fifth identification information included in the PDN connectivity request, the TWAG 74 may include the TFT in the create session request. Alternatively, when the Network-Initiated mode is included in the first identification information and/or fifth identification information included in the PDN connectivity request, the TWAG 74 need not include the TFT in the create session request.

Here, the TWAG 74 may determine, on the basis of the first identification information and/or the fifth identification information, whether to request the establishment of the multi-access PDN connection of the UE-Initiated mode or request the establishment of the multi-access PDN connection of the Network-Initiated mode.

Note that when the first identification information is not included in the PDN connectivity request, the TWAG 74 may transmit the create session request without including the first identification information and/or the first identification information. Furthermore, when the fifth identification information is not included in the PDN connectivity request, the TWAG 74 may transmit the create session request without including the fifth identification information. Moreover, when neither the first identification information nor the fifth identification information is included in the PDN connectivity request, the TWAG 74 may perform a procedure for establishing the single-access PDN connection.

The PGW 30 receives the create session request transmitted from the TWAG 74. Upon the reception of the create session request, and/or on the basis of the first identification information and/or fifth identification information included in the create session request, the PGW 30 may perform the IP-CAN session update procedure with the PCRF 60.

The PGW 30 may transmit, to the PCRF 60, a control message in the IP-CAN session procedure, including information indicating whether the PDN connection to be established is the multi-access PDN connection based on the NBIFOM or the single-access PDN connection, and/or the fifth identification information.

More specifically, when the multi-access PDN connection based on the NBIFOM is to be established, the PGW 30 transmits, to the PCRF 60, the information indicating the access network B, the PDN connection ID, the information indicating that the PDN connection is the multi-access PDN connection based on the NBIFOM, and the first identification information and/or fifth identification information. Alternatively, when the single-access PDN connection is to be established, the PGW 30 transmits, to the PCRF 60, the information indicating the access network B, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

Note that the PGW 30 may perform the IP-CAN session update procedure to notify the PCRF 60 of information on the UE 10 and/or TWAG 74.

Furthermore, upon the reception of the first identification information and/or fifth identification information, the PCRF 60 may transmit, to the PGW 30, a control message in the IP-CAN session update procedure with the PGW 30, the control message including at least the seventh identification information. The detailed description of the seventh identification information will be described later.

Note that the PCRF 60 may perform the IP-CAN session update procedure to notify the PGW 30 of the charging information and/or the QoS control information and/or the routing information.

Upon the reception of the create session request or the completion of the IP-CAN session update procedure, and/or on the basis of the first identification information and/or fifth identification information included in the create session request, and/or on the basis of the seventh identification information included in the IP-CAN session update procedure, the PGW 30 transmits a create session response to the TWAG 74 (S1906).

Upon the reception of the create session request or the completion of the IP-CAN session update procedure, and/or on the basis of the first identification information and/or fifth identification information included in the create session request, and/or on the basis of the seventh identification information included in the IP-CAN session update procedure, the PGW 30 may transmit the create session response including at least the seventh identification information.

Note that a method by which the PGW 30 acquires the seventh identification information is not limited to the above-described method for acquiring the seventh identification information from the PCRF 60 in the IP-CAN session update procedure, and another example may be employed. For example, the PGW 30 may create the seventh identification information and transmit the create session response including the seventh identification information, without acquiring the seventh identification information from the PCRF 60 in the IP-CAN session update procedure.

Here, the seventh identification information may be the Allowed Mode representing the NBIFOM operation mode that is allowed for the multi-access PDN connection based on the NBIFOM to be established. In other words, the fifth identification information is an operation mode requested by the UE 10, whereas the seventh identification information may be an operation mode allowed by the operator.

Note that the PCRF 60 or the PGW 30 may determine the Allowed Mode and the seventh identification information on the basis of the operator policy. For example, a policy that allows for the establishment of only the PDN connection of the UE-Initiated mode, a policy that allows for the establishment of only the PDN connection of the Network-Initiated mode, a policy that allows for the establishment of both modes, a policy that prohibits the establishment of both modes, and the like may be managed.

Note that the PCRF 60 or the PGW 30 may acquire the operator policy from the HSS or the like. Alternatively, an operator policy created by an administrator may be stored.

In addition, for the operator policy, a policy different for each subscriber may be managed. Alternatively, a policy different for each APN may be managed. For example, for each APN, a different Allowed Mode for the PDN connection to be established may be managed.

In the present example, on the basis of the Allowed Mode, a case will be described in which the establishment of the PDN connection of the NBIFOM operation mode included in the fifth identification information is not allowed.

Thus, the PCRF 60 or the PGW 30 does not allow the establishment of the PDN connection based on the NBIFOM operation mode included in the fifth identification information, and includes, in the seventh identification information, an operation mode that is a mode allowed by the Allowed Mode and is different from the fifth identification information.

In other words, when the UE-Initiated mode is included in the fifth identification information and the Network-Initiated mode is allowed, the PCRF 60 or the PGW 30 may include the Network-Initiated mode in the seventh identification information. Alternatively, when the Network-Initiated mode is included in the fifth identification information and the UE-Initiated mode is allowed, the PCRF 60 or the PGW 30 may include the UE-Initiated mode in the seventh identification information.

When the establishment of the PDN connection based on the operation mode different from the fifth identification information is not allowed, the PCRF 60 need not notify the PGW 30 of the seventh identification information.

When the establishment of the PDN connection based on the operation mode different from the fifth identification information is not allowed, the PCRF 60 may notify the PGW 30 that there is no allowed operation.

When the establishment of the PDN connection based on the operation mode different from the fifth identification information is not allowed, the PCRF 60 may transmit, to the PGW 30, the cause information indicating that the requested operation mode is not allowed.

When the establishment of the PDN connection based on the operation mode different from the fifth identification information is not allowed, the PGW 30 need not notify the TWAG 74 of the seventh identification information.

When the establishment of the PDN connection based on the operation mode different from the fifth identification information is not allowed, the PGW 30 may transmit, to the TWAG 74, the create session response including the cause information indicating that the requested operation mode is not allowed.

When the establishment of the PDN connection based on the operation mode different from the fifth identification information is not allowed, the PGW 30 may notify the TWAG 74 that there is no allowed operation.

As described above, on the basis of the Allowed Mode, when the establishment of the PDN connection of the NBIFOM operation mode included in the fifth identification information is not allowed, an operation mode that is other than the NBIFOM operation mode included in the fifth identification information and is allowed to establish the PDN connection may be regarded as the seventh identification information, on the basis of the Allowed Mode.

Furthermore, the PGW 30 may include the PDN Address (PDN address) and/or the PDN connection ID and/or the TFT in the create session response.

The PDN Address may be an IP address assigned to the UE 10. For example, the PDN Address may be an IPv4 address, or an IPv6 prefix and an interface ID for constituting an IPv6 address. Here, the PGW 30 may assign the IP address of the UE 10. Moreover, the PGW 30 may include the IP address assigned to the UE 10 in the PDN Address.

Furthermore, the PDN connection ID may be information for uniquely identifying the PDN connection established between the UE 10 and the PGW 30. The PDN connection ID may be assigned by the PGW 30, or may be assigned by the TWAG 74. In other words, the PGW 30 may assign the PDN connection ID.

The TWAG 74 receives the create session response transmitted from the PGW 30. Upon the reception of the create session response and/or on the basis of the seventh identification information included in the create session response, the TWAG 74 transmits a PDN connectivity accept to the UE 10 (S1908).

Upon the reception of the create session response and/or on the basis of the seventh identification information included in the create session response, the TWAG 74 may transmit the PDN connectivity accept including at least a PDN connectivity accept message identity (PDN connectivity accept message ID), the Procedure transaction ID, the APN, the PDN Address (PDN address), the PDN connection ID, and the User Plane Connection ID (user plane connection ID). Furthermore, the TWAG 74 may include at least the seventh identification information in the PDN connectivity accept. Moreover, the TWAG 74 may include the PCO and/or the Cause and/or the TFT and/or the PDN connection attribute information, in the PDN connectivity accept. Note that the TWAG 74 may transmit the PCO including the seventh identification information and/or the TFT.

Here, the PDN connectivity accept message ID may be a message type representing the PDN connectivity accept message.

APN may be an APN to which the UE 10 is allowed to connect. More specifically, the APN may be the APN 1. The APN 1 may be an APN that is allowed to establish the multi-access PDN connection based on the NBIFOM. The TWAG 74 may include the APN 1 in the PDN connectivity accept.

PDN Address may be an IP address assigned to the UE 10. For example, the PDN Address may be an IPv4 address, or an interface ID for constituting an IPv6 address.

The PDN connection ID may be information for uniquely identifying the PDN connection established between the UE 10 and the PGW 30. The PDN connection ID may be an ID assigned by the PGW 30, or an ID assigned by the TWAG 74. In other words, the TWAG 74 may assign the PDN connection ID.

The User Plane Connection ID is information for identifying a user plane. The user plane is a transfer path used for transferring user data in the PDN connection. The TWAG 74 may assign the User Plane Connection ID.

The Cause may include information representing that the PDN type of the PDN Address assigned to the UE 10 is different from the PDN type requested by the UE 10 in the PDN connectivity request. Additionally/alternatively, the Cause may include information representing that the PDN connection established in the present PDN connectivity procedure is the multi-access PDN connection based on the NBIFOM of an NBIFOM operation mode different from the NBIFOM operation mode requested by the UE 10.

Note that the TWAG 74 and/or the PGW 30 may include the seventh identification information in the PCO. However, when the TWAG 74 and/or the PGW 30 includes the seventh identification information in the PCO, the TWAG 74 and/or the PGW 30 does not include the IFOM support. In contrast, when the TWAG 74 and/or the PGW 30 includes the IFOM support in the PCO, the TWAG 74 and/or the PGW 30 does not include the seventh identification information. As described above, it may be possible to not configure both the seven identification information and the IFOM support to be effective to ensure a clear distinction between the use of the switching of the communication path on the basis of the NBIFOM and the use of the switching of the communication path on the basis of the IFOM.

The PDN connection attribute information may be information indicating that the PDN connection established in the present PDN connectivity procedure is the multi-access PDN connection, and/or information indicating that user data transmitted/received by using the PDN connection established in the PDN connection the present PDN connectivity procedure is allowed to be transmitted/received through the access network A and the access network B, and/or information indicating that the PDN connection established in the present PDN connectivity procedure is the multi-access PDN connection based on the NBIFOM of the operation mode indicated by the seventh identification information.

Note that the UE 10 may transmit the PDN connectivity accept message that further includes the connectivity type indicating the type of the PDN connection and/or the WLAN offload permission information (WLAN offload acceptability) indicating whether or not the WLAN offload can be performed. Furthermore, the TWAG 74 may transmit the connectivity type or the WLAN offload permission information including the PDN connection attribute information.

The UE 10 receives the PDN connectivity accept transmitted from the TWAG 74. Upon the reception of the PDN connectivity accept and/or on the basis of the seventh identification information included in the PDN connectivity accept, the UE 10 may transmit a PDN connectivity complete to the TWAG 74 (S1910).

The UE 10 may transmit the PDN connectivity complete including at least the PDN connectivity complete message ID (PDN connectivity complete), the Procedure transaction ID, and the PDN connection ID.

Here, the PDN connectivity complete message ID may be a message type representing the PDN connectivity complete message.

After the third PDN connectivity procedure is completed, the UE 10 and the PGW 30 establish the first PDN connection of a mode different from the NBIFOM operation mode requested by the UE 10. Upon the reception of the PDN connectivity accept and/or on the basis of the PDN connection attribute information and/or the seventh identification information and/or the Cause, the UE 10 may identify that the established PDN connection is the multi-access PDN connection based on the NBIFOM of an operation mode different from the NBIFOM operation mode requested by the UE 10. Upon the establishment of the first PDN connection, the UE 10 and the PGW 30 determine a PDN connection and/or a transfer path (such as an EPS bearer) for transmitting/receiving the IP flow by using the TFT, and transmit/receive user data corresponding to the IP flow identified on the basis of the TFT. More specifically, the UE 10 and the PGW 30 transmit/receive a flow identified on the basis of the TFT by using the first PDN connection.

Note that in the example of the sixth PDN connectivity procedure, a case has been described in which the transmission/reception of the TFT is included in the PDN connectivity procedure; however, the sixth PDN connectivity procedure is not limited to this case. The transmission/reception of the TFT may be performed after the multi-access PDN connection based on the NBIFOM is established.

Therefore, the UE 10 and the TWAG 74 may perform transmission/reception without including the TFT in the PDN connectivity request and/or the PDN connectivity response (PDN connectivity accept), and establish the multi-access PDN connection based on the NBIFOM. In other words, at a point in time when the PDN connection is established, there may be no IP flow transmitting/receiving user data by using the PDN connection. In this case, the UE 10 and the TWAG 74 transmit the TFT after the multi-access PDN connection based on the NBIFOM is established.

More specifically, when the PDN connection of the UE-Initiated mode is established, the UE 10 may transmit the TFT to the TWAG 74. In addition, the TWAG 74 receives the TFT from the UE 10 and transmits the TFT to the PGW 30. Thus, the UE 10 and the PGW 30 can determine a PDN connection and/or a transfer path (such as an EPS bearer) for transmitting/receiving the IP flow by using the TFT, and transmit/receive user data corresponding to the IP flow identified on the basis of the TFT.

On the other hand, when the PDN connection of the Network-Initiated mode is established, the PGW 30 may transmit the TFT to the TWAG 74. Here, the PGW 30 may receive, from the PCRF 60, the TFT determined on the basis of the operator policy. In addition, the TWAG 74 receives the TFT from the PGW 30 and transmits the TFT to the UE 10. Thus, the UE 10 and the PGW 30 can determine a PDN connection and/or a transfer path (such as an EPS bearer) for transmitting/receiving the IP flow by using the TFT, and transmit/receive user data corresponding to the IP flow identified on the basis of the TFT.

Furthermore, in the example of the third PDN connectivity procedure, a case has been described in which the UE 10 and the PGW 30 establish the first PDN connection of a mode different from the NBIFOM operation mode requested by the UE 10; however, the third PDN connectivity procedure is not limited to this case. The UE 10 may reject the establishment of the first PDN connection of the NBIFOM operation mode different from the request.

For example, when the UE 10 does not support the NBIFOM operation mode for the established first PDN connection and/or when the NBIFOM operation mode for the established first PDN connection does not comply with the policy of the UE 10, the UE 10 may reject the establishment of the first PDN connection of the NBIFOM operation mode different from the request.

In greater detail, the UE 10 may transmit a PDN connectivity reject to the TWAG 74, upon the reception of the PDN connectivity accept and/or on the basis of the seventh identification information included in the PDN connectivity accept and/or the PDN connection attribute information and/or the policy of the UE 10.

The UE 10 may transmit the PDN connectivity reject including at least one or more of the PDN connectivity reject message identity (PDN connectivity reject message ID), the Procedure transaction ID, and the Cause. Furthermore, the UE 10 may further include fourth identification information in the PDN connectivity reject. Moreover, the UE 10 may further include the PCO and/or the Tw1 value in the PDN connectivity reject. Note that the UE 10 may transmit the PCO including the fourth identification information.

The fourth identification information may be information representing that the UE 10 does not support the NBIFOM operation mode for the established first PDN connection and/or information representing that the NBIFOM operation mode for the established first PDN connection does not comply with the policy of the UE 10.

The PDN connectivity reject message ID may be a message type representing the PDN connectivity reject message. The Cause may be information representing a reason why the PDN connectivity request is rejected. Here, the UE 10 may notify the UE 10 of the fourth identification information included in the Cause. The Tw1 value may be a value of the Tw1 timer, included when the Cause represents insufficient resources.

The TWAG 74 may receive the PDN connectivity reject transmitted from the UE 10. Upon the reception of the PDN connectivity reject and/or on the basis of the fourth identification information included in the PDN connectivity reject, the TWAG 74 may delete the EPS bearer context, held by the TWAG 74, relating to the established PDN connection. Furthermore, the TWAG 74 may transmit, to the PGW 30, the fourth identification information included in the PDN connectivity reject.

The PGW 30 may receive the fourth identification information transmitted from the TWAG 74. Upon the reception of the fourth identification information and/or on the basis of the operator policy, the PGW 30 may delete the EPS bearer context, held by the PGW 30, relating to the established PDN connection.

Furthermore, the PGW 30 may perform the IP-CAN session update procedure with the PCRF 60, upon the reception of the fourth identification information. The PGW 30 may include the fourth identification information in the IP-CAN session update procedure.

The PCRF 60 may change the operator policy on the basis of the IP-CAN session update procedure. Note that on the basis of the change of the operator policy, the PGW 30 may delete the EPS bearer context, held by the PGW 30, relating to the established PDN connection.

2.4.4. Example of Fourth PDN Connectivity Procedure

An example of the fourth PDN connectivity procedure will be described with reference to FIG. 18.

As illustrated in (B) of FIG. 18, the UE 10 first performs the authentication procedure and the security association procedure for establishing the security association. Note that the UE 10 may perform the security association procedure when the initial state is the second initial state. In other words, when the initial state is the first initial state, the UE 10 need not perform the security association procedure. As described above, when the initial state is the first initial state, the UE 10 may omit the security association procedure since the security association has already been established.

Note that the security association procedure performed by the UE 10 may be similar to the security association procedure described in (A) of FIG. 15. Therefore, detailed description of the procedure will be omitted.

Next, the UE 10 transmits a PDN connectivity request to the TWAG 74 (S2102). The UE 10 may transmit the PDN connectivity request including at least the PDN connectivity request message identity (PDN connectivity request message ID), the Procedure transaction identity (Procedure transaction ID), the Request type (request type), and the PDN type. Furthermore, the UE 10 may include at least the first identification information and/or sixth identification information in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit the PCO including the first identification information and/or the sixth identification information and/or the TFT.

Here, the first identification information may be the UE NBIFOM capability representing that the UE 10 supports the NBIFOM. Note that the NBIFOM capability may be information indicating the possession of the function of establishing the multi-access PDN connection based on the NBIFOM.

In addition, the sixth identification information may be a Request NBIFOM representing that a request to determine the NBIFOM operation mode for the multi-access PDN connection based on the NBIFOM. Additionally/alternatively, the sixth identification information may be information representing that a request for an NBIFOM operation mode allowed for the multi-access PDN connection based on the NBIFOM to be established.

As described above, the UE 10 may transmit the PDN connectivity request including the first identification information and/or sixth identification information to request the establishment of the multi-access PDN connection based on the NBIFOM, without requesting a certain NBIFOM operation mode.

The PDN connectivity request message ID may be a message type representing the PDN connectivity request message. The Procedure transaction ID may be information for identifying the PDN connectivity procedure.

The APN may be an APN to which the UE 10 requests a connection. More specifically, the APN may be the APN 1. The UE 10 may include the APN 1, in order to establish the multi-access PDN connection based on the NBIFOM. Here, the APN 1 may be an APN that is allowed to establish the multi-access PDN connection based on the NBIFOM and/or an APN that is allowed to perform communication based on the NBIFOM.

The request type may be information for identifying the type of the PDN connectivity procedure to be requested. For example, since the UE 10 performs an initial connection by using the APN 1, the request type may be the type indicating an attach, rather than the type indicating a handover.

The PDN type may indicate an available IP version. For example, the PDN type may be IPv4, IPv6, or IPv4v6. The PCO may be protocol information associated with the PDN connection. Furthermore, the PCO may include identification information on the request. Note that the UE 10 may transmit the PCO including the first identification information and/or the sixth identification information.

The TFT may be information for identifying an IP flow that performs communication by using the PDN connection established in the present PDN connectivity procedure. Note that the IP flow to be identified may vary for each application. Thus, on the basis of the TFT, user data of a certain application can be identified.

More specifically, the TFT may be constituted of a five-tuple, or may be constituted of identification information such as the application ID. Note that the five-tuple may be constituted of a combination of one or more of a source IP address, a destination IP address, a source port number, a destination port number, and a protocol number.

Note that in the present example, when transmitting the PDN connectivity request, the UE 10 does not request a certain NBIFOM operation mode, and thus, the UE 10 may transmit the PDN connectivity request without including the TFT. In other words, when the UE 10 requests the establishment of the multi-access PDN connection based on the NBIFOM without requesting a certain NBIFOM operation mode, the UE 10 may transmit the PDN connectivity request without including the TFT. More specifically, when the UE 10 includes the first identification information and/or the sixth identification information, the UE 10 may transmit the PDN connectivity request without including the TFT. Note that conventionally, the UE 10 can perform transmission, with information indicating the IFOM support included in the PCO. Here, the IFOM support is identification information representing that the IP Flow Mobility (IFOM) is supported. Furthermore, the IFOM is a technique for switching a communication path of a certain IP flow by using the Dual Stack Mobile IPv6 (DSMIPv6) protocol. Thus, including the information indicating the IFOM support in the PCO allows the UE 10 to switch the access network through which the communication of a certain IP flow is performed.

In the present embodiment, when the UE 10 includes the first identification information and the sixth identification information in the PCO, the UE 10 does not include the IFOM support. In contrast, when the UE 10 includes the IFOM support in the PCO, the UE 10 does not include the first identification information and/or the sixth identification information. As described above, it may be possible to not configure both the first identification information and/or sixth identification information and the IFOM support to be effective to ensure a clear distinction between the use of the switching of the communication path on the basis of the NBIFOM and the use of the switching of the communication path on the basis of the IFOM.

Thus, the UE 10 can establish either the PDN connection supporting the IFOM or the PDN connection supporting the NBIFOM, in the establishment procedure of a single PDN connection. In other words, the single PDN connection is any one of the PDN connection supporting the NBIFOM, the PDN connection supporting the IFOM, or the single-access PDN connection.

The TWAG 74 receives the PDN connectivity request transmitted from the UE 10. Upon the reception of the PDN connectivity request and/or and/or on the basis of the first identification information and/or sixth identification information included in the PDN connectivity request, the TWAG 74 transmits a create session request to the PGW 30 (S2104).

Upon the reception of the PDN connectivity request and/or on the basis of the first identification information and/or sixth identification information included in the PDN connectivity request, the TWAG 74 may transmit the create session request including at least the first identification information and/or sixth identification information. Furthermore, the TWAG 74 may include the TFT in the create session request, upon the reception of the TFT transmitted from the UE 10.

Furthermore, the TFT may be information for identifying an IP flow that performs communication by using the PDN connection established in the present PDN connectivity procedure. Note that the IP flow to be identified may vary for each application. Thus, on the basis of the TFT, user data of a certain application can be identified.

More specifically, the TFT may be constituted of a five-tuple, or may be constituted of identification information such as the application ID. Note that the five-tuple may be constituted of a combination of one or more of a source IP address, a destination IP address, a source port number, a destination port number, and a protocol number.

Note that when neither the first identification information nor the sixth identification information is included in the PDN connectivity request, the TWAG 74 may transmit the create session request without including the first identification information and/or the sixth identification information. Moreover, when the first identification information and/or the sixth identification information is not included in the PDN connectivity request, the TWAG 74 may perform a procedure for establishing the single-access PDN connection.

The PGW 30 receives the create session request transmitted from the TWAG 74. Upon the reception of the create session request, and/or on the basis of the first identification information and/or sixth identification information included in the create session request, the PGW 30 may perform the IP-CAN session update procedure with the PCRF 60.

Upon the reception of the create session request and/or on the basis of the first identification information and/or sixth identification information included in the create session request, the PGW 30 may perform the IP-CAN session update procedure including at least the first identification information and/or the sixth identification information.

Note that the PGW 30 may perform the IP-CAN session update procedure to notify the PCRF 60 of information on the UE 10 and/or TWAG 74.

The PGW 30 may transmit, to the PCRF 60, a control message in the IP-CAN session procedure, including information indicating whether the PDN connection to be established is the multi-access PDN connection based on the NBIFOM or the single-access PDN connection, and/or the sixth identification information.

More specifically, when the multi-access PDN connection based on the NBIFOM is to be established, the PGW 30 transmits, to the PCRF 60, the information indicating the access network B, the PDN connection ID, the information indicating that the PDN connection is the multi-access PDN connection based on the NBIFOM, and the first identification information and/or sixth identification information. Alternatively, when the single-access PDN connection is to be established, the PGW 30 transmits, to the PCRF 60, the information indicating the access network B, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

Furthermore, upon the reception of the first identification information and/or sixth identification information, the PCRF 60 may transmit, to the PGW 30, a control message in the IP-CAN session update procedure with the PGW 30, the control message including at least the seventh identification information. The detailed description of the seventh identification information will be described later.

Note that the PCRF 60 may perform the IP-CAN session update procedure to notify the PGW 30 of the charging information and/or the QoS control information and/or the routing information.

Upon the reception of the create session request or the completion of the IP-CAN session update procedure, and/or on the basis of the first identification information and/or sixth identification information included in the create session request and/or the seventh identification information included in the IP-CAN session update procedure, the PGW 30 transmits a create session response to the TWAG 74 (S2106).

Upon the reception of the create session request or the completion of the IP-CAN session update procedure, and/or on the basis of the first identification information and/or sixth identification information included in the create session request and/or the seventh identification information included in the IP-CAN session update procedure, the PGW 30 may transmit the create session response including at least the seventh identification information.

Furthermore, the PGW 30 may include the PDN Address (PDN address) and/or the PDN connection ID and/or the TFT in the create session response.

Note that a method by which the PGW 30 acquires the seventh identification information is not limited to the above-described method for acquiring the seventh identification information from the PCRF 60 in the IP-CAN session update procedure, and another example may be employed. For example, the PGW 30 may create the seventh identification information and transmit the create session response including the seventh identification information, without acquiring the seventh identification information from the PCRF 60 in the IP-CAN session update procedure.

Here, the seventh identification information may be the Allowed Mode representing the NBIFOM operation mode that is allowed for the multi-access PDN connection based on the NBIFOM to be established. In other words, the seventh identification information may be the operation mode allowed by the operator.

Note that the PCRF 60 or the PGW 30 may determine the Allowed Mode and the seventh identification information on the basis of the operator policy. For example, a policy that allows for the establishment of only the PDN connection of the UE-Initiated mode, a policy that allows for the establishment of only the PDN connection of the Network- Initiated mode, a policy that allows for the establishment of both modes, a policy that prohibits the establishment of both modes, and the like may be managed.

Note that the PCRF 60 or the PGW 30 may acquire the operator policy from the HSS or the like. Alternatively, an operator policy created by an administrator may be stored.

In addition, for the operator policy, a policy different for each subscriber may be managed. Alternatively, a policy different for each APN may be managed. For example, for each APN, a different Allowed Mode for the PDN connection to be established may be managed.

On the basis of the Allowed Mode, the PCRF 60 or the PGW 30 may include the allowed operation mode in the seventh identification information.

In other words, when only the Network-Initiated mode is allowed, the PCRF 60 or the PGW 30 may include the Network-Initiated mode in the seventh identification information. Alternatively, when only the UE-Initiated mode is allowed, the PCRF 60 or the PGW 30 may include the UE-Initiated mode in the seventh identification information.

Note that when both the UE-Initiated mode and the Network-Initiated mode are allowed, the seventh identification information may include both the operation modes. Alternatively, when both the UE-Initiated mode and the Network-Initiated mode are allowed and a default operation mode is configured, the seventh identification information may include only the default operation mode. Note that which of the UE-Initiated mode and the Network-Initiated mode is defined as the default operation mode may be configured on the basis of the operator policy.

Note that, when none of the operation modes is allowed for establishment of the PDN connection, the PCRF 60 may transmit, to the PGW 30, the cause information indicating that the requested operation mode is not allowed.

When none of the operation modes is allowed for establishment of the PDN connection, the PGW 30 need not notify the TWAG 74 of the seventh identification information.

When none of the operation modes is allowed for establishment of the PDN connection, the PGW 30 may transmit, to the TWAG 74, the create session response including the cause information indicating that the requested operation mode is not allowed.

When none of the operation modes is allowed for establishment of the PDN connection, the PGW 30 may notify the TWAG 74 that there is no allowed operation.

As described above, on the basis of the Allowed Mode, the PCRF 60 or the PGW 30 may regard an operation mode that is allowed for establishment of the PDN connection as the seventh identification information.

Note that when the Network-Initiated mode is not included in the seventh identification information, the PCRF 60 need not transmit the TFT to the PGW 30.

In other words, note that only when the Network-Initiated mode is included in the seventh identification information, the PCRF 60 may transmit the TFT to the PGW 30.

Note that when the Network-Initiated mode is not included in the seventh identification information, the PGW 30 need not transmit the TFT to the TWAG 74. Thus, in this case, the PGW 30 need not include either the TFT or the PDN Address in the create session response.

In other words, note that only when the Network-Initiated mode is included in the seventh identification information, the PGW 30 may transmit the TFT to the TWAG 74. Thus, in this case, the PGW 30 may include the TFT and the PDN Address (PDN address) in the create session response.

The PDN Address may be an IP address assigned to the UE 10. For example, the PDN Address may be an IPv4 address, or an IPv6 prefix and an interface ID for constituting an IPv6 address. Here, the PGW 30 may assign the IP address of the UE 10. Moreover, the PGW 30 may include the IP address assigned to the UE 10 in the PDN Address.

Furthermore, the PDN connection ID may be information for uniquely identifying the PDN connection established between the UE 10 and the PGW 30. The PDN connection ID may be assigned by the PGW 30, or may be assigned by the TWAG 74. In other words, the PGW 30 may assign the PDN connection ID.

The TWAG 74 receives the create session response transmitted from the PGW 30. Upon the reception of the create session response and/or on the basis of the seventh identification information included in the create session response, the TWAG 74 transmits a PDN connectivity accept to the UE 10 (S2108).

Upon the reception of the create session response and/or on the basis of the seventh identification information included in the create session response, the TWAG 74 may transmit the PDN connectivity accept including at least a PDN connectivity accept message identity (PDN connectivity accept message ID), the Procedure transaction ID, the APN, the PDN Address (PDN address), the PDN connection ID, and the User Plane Connection ID (user plane connection ID). Furthermore, the TWAG 74 may include at least the seventh identification information in the PDN connectivity accept. Moreover, the TWAG 74 may include the PCO and/or the Cause and/or the TFT and/or the PDN connection attribute information, in the PDN connectivity accept. Note that the TWAG 74 may transmit the PCO including the seventh identification information and/or the TFT.

Here, the PDN connectivity accept message ID may be a message type representing the PDN connectivity accept message.

The APN may be an APN to which the UE 10 is allowed to connect. More specifically, the APN may be the APN 1. The APN 1 may be an APN that is allowed to establish the multi-access PDN connection based on the NBIFOM. The TWAG 74 may include the APN 1 in the PDN connectivity accept.

The PDN Address may be an IP address assigned to the UE 10. For example, the PDN Address may be an IPv4 address, or an interface ID for constituting an IPv6 address.

The PDN connection ID may be information for uniquely identifying the PDN connection established between the UE 10 and the PGW 30. The PDN connection ID may be an ID assigned by the PGW 30, or an ID assigned by the TWAG 74. In other words, the TWAG 74 may assign the PDN connection ID.

The User Plane Connection ID is information for identifying a user plane. The user plane is a transfer path used for transferring user data in the PDN connection. The TWAG 74 may assign the User Plane Connection ID.

The Cause may be information representing that the PDN type of the PDN Address assigned to the UE 10 is different from the PDN type requested by the UE 10 in the PDN connectivity request.

Note that the TWAG 74 and/or the PGW 30 may include the seventh identification information in the PCO. However, when the TWAG 74 and/or the PGW 30 includes the seventh identification information in the PCO, the TWAG 74 and/or the PGW 30 does not include the IFOM support. In contrast, when the TWAG 74 and/or the PGW 30 includes the IFOM support in the PCO, the TWAG 74 and/or the PGW 30 does not include the seventh identification information. As described above, it may be possible to not configure both the seven identification information and the IFOM support to be effective to ensure a clear distinction between the use of the switching of the communication path on the basis of the NBIFOM and the use of the switching of the communication path on the basis of the IFOM.

The PDN connection attribute information may be information indicating that the PDN connection established in the present PDN connectivity procedure is the multi-access PDN connection, and/or information indicating that user data transmitted/received by using the PDN connection established in the PDN connection the present PDN connectivity procedure is allowed to be transmitted/received through the access network A and the access network B, and/or if there is only one operation mode indicated by the seventh identification information, information indicating that the PDN connection established in the present PDN connectivity procedure is the multi-access PDN connection based on the NBIFOM of the operation mode indicated by the seventh identification information.

Note that the UE 10 may transmit the PDN connectivity accept message that further includes the connectivity type indicating the type of the PDN connection and/or the WLAN offload permission information (WLAN offload acceptability) indicating whether or not the WLAN offload can be performed. Furthermore, the TWAG 74 may transmit the connectivity type or the WLAN offload permission information including the PDN connection attribute information.

The UE 10 receives the PDN connectivity accept transmitted from the TWAG 74. Upon the reception of the PDN connectivity accept and/or on the basis of the seventh identification information included in the PDN connectivity accept, the UE 10 transmits a PDN connectivity complete to the TWAG 74 (S2110).

The UE 10 may transmit the PDN connectivity complete including at least the PDN connectivity complete message ID (PDN connectivity complete), the Procedure transaction ID, and the PDN connection ID.

Furthermore, when multiple INFOM operation modes are included in the seventh identification information, the UE 10 may include at least the fifth identification information in the PDN connectivity complete. In other words, when multiple INFOM operation modes are allowed, the UE 10 may select one of the allowed modes and transmit the fifth identification information including the selected mode.

Here, the fifth identification information may be the Mode Indication representing an NBIFOM operation mode for the multi-access PDN connection whose establishment is requested by the UE 10. Note that the UE 10 may include the UE-Initiated mode or the Network-Initiated mode in the fifth identification information.

Specifically, when the UE-Initiated mode and the Network-Initiated mode are included in the seventh identification information included in the PDN connectivity accept, the UE 10 may include the UE-Initiated mode or the Network-Initiated mode in the fifth identification information.

Which of the UE-Initiated mode and the Network-Initiated mode is to be included in the fifth identification information may be determined on the basis of the UE policy. Note that the UE policy may be any information configured for the UE 10. For example, the UE policy may be information configured by a user.

The PDN connectivity complete message ID may be a message type representing the PDN connectivity complete message.

After the fourth PDN connectivity procedure is completed, the UE 10 and the PGW 30 establish the first PDN connection of the operation mode determined on the basis of the operator policy. Alternatively, the UE 10 establishes the first PDN connection of an operation mode selected from the operation modes allowed on the basis of the operator policy. Note that upon the reception of the PDN connectivity accept and/or on the basis of the PDN connection attribute information and/or the seventh identification information and/or the operation mode selected on the basis of the seventh identification information, the UE 10 may identify the NBIFOM operation mode for the established PDN connection. Upon the establishment of the first PDN connection, the UE 10 and the PGW 30 determine a PDN connection and/or a transfer path (such as an EPS bearer) for transmitting/receiving the IP flow by using the TFT, and transmit/receive user data corresponding to the IP flow identified on the basis of the TFT. More specifically, the UE 10 and the PGW 30 transmit/receive a flow identified on the basis of the TFT by using the first PDN connection.

Note that in the example of the fourth PDN connectivity procedure, a case has been described in which the transmission/reception of the TFT is included in the PDN connectivity procedure; however, the fourth PDN connectivity procedure is not limited to this case. The transmission/reception of the TFT may be performed after the multi-access PDN connection based on the NBIFOM is established.

Therefore, the UE 10 and the TWAG 74 may perform transmission/reception without including the TFT in the PDN connectivity request and/or the PDN connectivity response (PDN connectivity accept), and establish the multi-access PDN connection based on the NBIFOM. In other words, at a point in time when the PDN connection is established, there may be no IP flow transmitting/receiving user data by using the PDN connection. In this case, the UE 10 and the TWAG 74 transmit the TFT after the multi-access PDN connection based on the NBIFOM is established.

More specifically, when the PDN connection of the UE-Initiated mode is established, the UE 10 may transmit the TFT to the TWAG 74. In addition, the TWAG 74 receives the TFT from the UE 10 and transmits the TFT to the PGW 30. Thus, the UE 10 and the PGW 30 can determine a PDN connection and/or a transfer path (such as an EPS bearer) for transmitting/receiving the IP flow by using the TFT, and transmit/receive user data corresponding to the IP flow identified on the basis of the TFT.

On the other hand, when the PDN connection of the Network-Initiated mode is established, the PGW 30 may transmit the TFT to the TWAG 74. Here, the PGW 30 may receive, from the PCRF 60, the TFT determined on the basis of the operator policy. In addition, the TWAG 74 receives the TFT from the PGW 30 and transmits the TFT to the UE 10. Thus, the UE 10 and the PGW 30 can determine a PDN connection and/or a transfer path (such as an EPS bearer) for transmitting/receiving the IP flow by using the TFT, and transmit/receive user data corresponding to the IP flow identified on the basis of the TFT.

Furthermore, in the example of the fourth PDN connectivity procedure, a case has been described in which the UE 10 and the PGW 30 establish the first PDN connection of an operation mode selected by the UE 10 from the operation modes determined on the basis of the operator policy or the operation modes allowed on the basis of the operator policy; however, the fourth PDN connectivity procedure is not limited to this case. The UE 10 may reject the establishment of the first PDN connection.

For example, when the UE 10 does not support the operation mode allowed on the basis of the operator policy and/or when the operation mode allowed on the basis of the operator policy does not comply with the policy of the UE 10, the UE 10 may reject the establishment of the first PDN connection.

In greater detail, the UE 10 may transmit a PDN connectivity reject to the TWAG 74, upon the reception of the PDN connectivity accept and/or on the basis of the seventh identification information included in the PDN connectivity accept and/or the PDN connection attribute information and/or the policy of the UE 10.

The UE 10 may transmit the PDN connectivity reject including at least one or more of a PDN connectivity reject message identity (PDN connectivity reject message ID), the Procedure transaction ID, and the Cause. Furthermore, the UE 10 may further include fourth identification information in the PDN connectivity reject. Moreover, the UE 10 may further include the PCO and/or the Tw1 value in the PDN connectivity reject. Note that the UE 10 may transmit the PCO including the fourth identification information.

The fourth identification information may be information representing that the UE 10 does not support the operation mode allowed on the basis of the operator policy and/or information representing that the operation mode allowed on the basis of the operator policy does not comply with the policy of the UE 10.

The PDN connectivity reject message ID may be a message type representing the PDN connectivity reject message.

The Cause may be information representing a reason why the PDN connectivity request is rejected. Here, the UE 10 may notify the UE 10 of the fourth identification information included in the Cause.

The Tw1 value may be a value of the Tw1 timer, included when the Cause represents insufficient resources.

The TWAG 74 may receive the PDN connectivity reject transmitted from the UE 10. Upon the reception of the PDN connectivity reject and/or on the basis of the fourth identification information included in the PDN connectivity reject, the TWAG 74 may delete the EPS bearer context, held by the TWAG 74, relating to the established PDN connection. Furthermore, the TWAG 74 may transmit, to the PGW 30, the fourth identification information included in the PDN connectivity reject.

The PGW 30 may receive the fourth identification information transmitted from the TWAG 74. Upon the reception of the fourth identification information and/or on the basis of the operator policy, the PGW 30 may delete the EPS bearer context, held by the PGW 30, relating to the established PDN connection.

Furthermore, the PGW 30 may perform the IP-CAN session update procedure with the PCRF 60, upon the reception of the fourth identification information. The PGW 30 may include the fourth identification information in the IP-CAN session update procedure.

The PCRF 60 may change the operator policy on the basis of the IP-CAN session update procedure. Note that on the basis of the change of the operator policy, the PGW 30 may delete the EPS bearer context, held by the PGW 30, relating to the established PDN connection.

2.4.5. Description of State after PDN Connectivity Establishment Procedure

Performing the above-described first to seventh PDN connectivity procedures leads to a first state and a second state, both of which will be described later.

Note that an initial state in the additional attach procedure may be the first state or the second state. The initial state in the additional attach procedure may not be limited to the first or second state.

2.4.6. Description of First State

The first state will be described with reference to FIG. 13. In the first state, the UE 10 has established the first PDN connection with the core network 90. However, the UE 10 has not yet established the second PDN connection. In greater detail, the UE 10 has established the first PDN connection with the PGW_A 1310. However, the UE 10 has not established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be constituted of a transfer path between the UE 10 and the PGW 30 through the access network B. Thus, the first PDN connection may be constituted of a transfer path that is a combination of a transfer path between the UE 10 and the TWAG 74 and a transfer path between the TWAG 74 and the PGW_A 1310. Here, the transfer path may be a bearer.

As described above, in the first state, the UE 10 may be in a state in which the multi-access PDN connection based on the NBIFOM is established via the access network B. In addition, in the first state early stage, the UE 10 may be in a state of not being connected to the core network 90 via the access network A.

Note that the UE 10 need not establish the single-access PDN connection via the access network B.

Alternatively, the UE 10 may be in a state in which the single-access PDN connection is established via the access network B. In this case, the UE 10 performs, in the WLAN access network, the attach procedure or the PDN connectivity procedure in the single-access PDN connection initiated by the UE 10 to establish the third PDN connection.

Note that the third PDN connection may be established with the gateway selected by using the APN 2. Alternatively, the third PDN connection may be established with a gateway selected by using another APN different from the APN 1 and the APN 2.

The first state has been described above; however, the first state is not limited to the above-described state, and only needs to be a state in which the multi-access PDN connection based on the NBIFOM has been established through the access network B and the PDN connection has not been established through the access network A, for example.

2.4.7. Description of Second State

The second state will be described with reference to FIG. 14. In the second state, the UE 10 has established the first PDN connection with the core network 90. Furthermore, the UE 10 has established the second PDN connection with the core network 90. In greater detail, the UE 10 has established the first PDN connection with the PGW_A 1310. Furthermore, the UE 10 has established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be constituted of a transfer path between the UE 10 and the PGW 30 through the access network B. Thus, the first PDN connection may be constituted of a transfer path that is a combination of a transfer path between the UE 10 and the TWAG 74 and a transfer path between the TWAG 74 and the PGW_B 1320. Here, the transfer path may be a bearer.

In addition, the second PDN connection may be constituted of a transfer path between the UE 10 and the PGW 30 through the access network A. Thus, the second PDN connection may be constituted of a transfer path that is a combination of a transfer path between the UE 10 and the eNodeB 45, a transfer path between the eNodeB 45 and the SGW 35, and a transfer path between the SGW 35 and the PGW_B 1320. Here, the transfer path may be a bearer.

As described above, in the first state, the UE 10 may be in a state in which the multi-access PDN connection based on the NBIFOM is established via the access network B. Furthermore, the UE 10 may be in a state in which the single-access PDN connection is established via the access network A.

Note that the UE 10 need not establish the single-access PDN connection via the access network B.

Alternatively, the UE 10 may be in a state in which the single-access PDN connection is established via the access network B. In this case, the UE 10 performs, in the WLAN access network, the attach procedure or the PDN connectivity procedure in the single-access PDN connection initiated by the UE 10 to establish the third PDN connection.

Note that the third PDN connection may be established with the gateway selected by using the APN 2. Alternatively, the third PDN connection may be established with a gateway selected by using another APN different from either the APN 1 or the APN 2.

The second state has been described above; however, the second state is not limited to the above-described state, and only needs to be a state in which the multi-access PDN connection based on the NBIFOM has been established through the access network B and the single-access PDN connection has been established through the access network A, for example.

3. Third Embodiment

A third embodiment in the present invention will be described. The PDN connection, such as the multi-access PDN connection established by the UE 10 via the TWAG 74 in the first embodiment, is established via the ePDG 65.

Note that the mobile communication system and the configuration of each device, such as the UE 10, the PGW 30, and the MME 40, included in the mobile communication system in the present embodiment may be similar to those in the first embodiment, and thus, descriptions thereof will be omitted.

Note that the configuration of the ePDG 65 may be similar to that of the TWAG 74 described with reference to FIG. 3 for the first embodiment. Note that a difference between the ePDG 65 and the TWAG 74 is that the ePDG 65 connects the WLAN ANb 75 to the core network 90 whereas the TWAG 74 connects the WLAN ANa 70 to the core network 90.

Note that the processes in the ePDG 65 in the present embodiment may be similar to the processes in the TWAG 74 described for the first embodiment. The processes in each device such as the UE 10, the PGW 30, the MME 40, and the PCRF 60 may be similar to the processes in each device in the first embodiment.

However, from among the processes of the UE 10 and the PGW 30, their respective processes performed for the TWAG 74 will be performed for the ePDG 65.

In addition, the PDN connectivity request message described for the first embodiment may be a control message in an IKEv2 tunnel establishment procedure and an IKEv2 authentication request message transmitted from the UE 10 to the ePDG 65.

Thus, various information items included in the IKEv2 authentication message in the present embodiment may be similar to the various information items included in the PDN connectivity request message described for the first embodiment. Furthermore, the processes in the UE 10 and the ePDG 65 for the transmission/reception of the IKEv2 authentication message may be similar to the processes in the UE 10 and the TWAG 74 for the transmission/reception of the PDN connectivity request message described for the first embodiment.

In addition, the PDN connectivity accept message described for the first embodiment may be the control message in the IKEv2 tunnel establishment procedure and a permission message for the IKEv2 authentication request message transmitted from the ePDG 65 to the UE 10.

Thus, various information items included in the permission message in the present embodiment may be similar to the various information items included in the PDN connectivity accept message described in the first embodiment. Furthermore, the processes in the UE 10 and the ePDG 65 for the transmission/reception of the permission message may be similar to the processes in the UE 10 and the TWAG 74 for the transmission/reception of the PDN connectivity accept message described for the first embodiment.

In addition, the PDN connectivity reject message described for the first embodiment may be the control message in the IKEv2 tunnel establishment procedure and a reject message for the IKEv2 authentication request message transmitted from the ePDG 65 to the UE 10.

Thus, various information items included in the permission message in the present embodiment may be similar to the various information items included in the PDN connectivity reject message described for the first embodiment. Furthermore, the processes in the UE 10 and the ePDG 65 for the transmission/reception of the reject message may be similar to the processes in the UE 10 and the TWAG 74 for the transmission/reception of the PDN connectivity reject message described for the first embodiment.

This allows the UE 10 to perform communication control for the multi-access PDN connection via the ePDG 65.

4. Fourth Embodiment

A fourth embodiment in the present invention will be described. The PDN connection, such as the multi-access PDN connection established by the UE 10 via the TWAG 74 in the second embodiment, is established via the ePDG 65.

Note that the mobile communication system and the configuration of each device, such as the UE 10, the PGW 30, and the MME 40, included in the mobile communication system in the present embodiment may be similar to those in the second embodiment, and thus, descriptions thereof will be omitted.

Note that the configuration of the ePDG 65 may be similar to that of the TWAG 74 described with reference to FIG. 3 for the second embodiment. Note that a difference between the ePDG 65 and the TWAG 74 is that the ePDG 65 connects the WLAN ANb 75 to the core network 90 whereas the TWAG 74 connects the WLAN ANa 70 to the core network 90.

Note that the processes in the ePDG 65 in the present embodiment may be similar to the processes in the TWAG 74 described for the second embodiment. The processes in each device such as the UE 10, the PGW 30, the MME 40, and the PCRF 60 may be similar to the processes in each device in the second embodiment. However, from among the processes of the UE 10 and the PGW 30, their respective processes performed for the TWAG 74 will be performed for the ePDG 65.

In addition, the PDN connectivity request message described for the second embodiment may be the control message in the IKEv2 tunnel establishment procedure and the IKEv2 authentication request message transmitted from the UE 10 to the ePDG 65.

Thus, various information items included in the IKEv2 authentication message in the present embodiment may be similar to the various information items included in the PDN connectivity request message described for the second embodiment. Furthermore, the processes in the UE 10 and the ePDG 65 for the transmission/reception of the IKEv2 authentication message may be similar to the processes in the UE 10 and the TWAG 74 for the transmission/reception of the PDN connectivity request message described for the second embodiment.

In addition, the PDN connectivity accept message described for the second embodiment may be the control message in the IKEv2 tunnel establishment procedure and the permission message for the IKEv2 authentication request message transmitted from the ePDG 65 to the UE 10.

Thus, various information items included in the permission message in the present embodiment may be similar to the various information items included in the PDN connectivity accept message described for the second embodiment. Furthermore, the processes in the UE 10 and the ePDG 65 for the transmission/reception of the permission message may be similar to the processes in the UE 10 and the TWAG 74 for the transmission/reception of the PDN connectivity accept message described for the second embodiment.

In addition, the PDN connectivity reject message described for the second embodiment may be the control message in the IKEv2 tunnel establishment procedure and the reject message for the IKEv2 authentication request message transmitted from the ePDG 65 to the UE 10.

Thus, various information items included in the permission message in the present embodiment may be similar to the various information items included in the PDN connectivity reject message described for the second embodiment. Furthermore, the processes in the UE 10 and the ePDG 65 for the transmission/reception of the reject message may be similar to the processes in the UE 10 and the TWAG 74 for the transmission/reception of the PDN connectivity reject message described for the second embodiment.

This allows the UE 10 to perform communication control for the multi-access PDN connection via the ePDG 65.

5. Modification

Additionally, the programs run on the devices in the embodiments are each configured to control a CPU (program causing a computer to function) so as to realize the functions of the above-described embodiments. The information handled by these devices is temporarily held in a transitory storage device (RAM, for example) at the time of processing, and is then stored in various storage devices such as a ROM and an HDD, read out by the CPU as necessary, and edited and written.

Here, a semiconductor medium (a ROM, a non-volatile memory card, or the like, for example), an optical recording medium/magneto-optical recording medium (a Digital Versatile Disc (DVD), a Magneto Optical Disc (MO), a Mini Disc (MD), a Compact Disc (CD), a BD, or the like, for example), a magnetic recording medium (magnetic tape, a flexible disk, or the like, for example), and the like can be given as examples of recording media for storing the programs. In addition to realizing the functions of the above-described embodiments by executing loaded programs, the functions of the present invention are realized by the programs running cooperatively with an operating system, other application programs, or the like in accordance with instructions included in those programs.

When delivering these programs to market, the programs can be stored in a portable recording medium, or transferred to a server computer connected via a network such as the Internet. In this case, the storage device serving as the server computer is of course also included in the present invention.

Additionally, each device in the above-described embodiments may be partially or completely realized as a Large Scale Integration (LSI) circuit, which is a typical integrated circuit. The functional blocks of each device may be individually realized as chips, or may be partially or completely integrated into a chip. Furthermore, a circuit integration technique is not limited to the LSI, and the integrated circuit may be realized with a dedicated circuit or a general-purpose processor. Furthermore, if advances in semiconductor technology produce circuit integration technology capable of replacing the LSI, it is of course possible to use integrated circuits based on the technology.

Additionally, although, for the above-described embodiments, the LTE and the WLAN (IEEE 802.11a/b/n, for example) have been described as examples of the radio access network, the connections may be made with WiMAX instead of the WLAN.

REFERENCE SIGNS LIST

9 Communication system
10 UE
30 PGW
35 SGW
40 MME
45 eNB
50 HSS
55 AAA
60 PCRF
65 ePDG
70 WLAN ANa
74 TWAG
75 WLAN ANb
80 LTE AN
90 Core network
100 PDN

The invention claimed is:

1. A User Equipment (UE) comprising:
WLAN interface circuitry configured to:
  transmit a Packet Data Network (PDN) connectivity request message to a Trusted WLAN Access Gateway (TWAG), in order to establish a PDN connection; and
  receive a PDN connectivity accept message from the TWAG, wherein
the PDN connectivity request message includes first information indicating a requested Network-based IP Flow Mobility (NBIFOM) mode from among a plurality of NBIFOM modes,
the PDN connectivity accept message is a response message to the PDN connectivity request message, and includes second information indicating an NBIFOM mode from among the plurality of NBIFOM modes,
the PDN connectivity request message further includes a request type and a Protocol Configuration Option (PCO),
the UE is configured to set the request type, prior to transmission of the request type in the PDN connectivity request message, to information indicating an initial connectivity request, the request type being set in a PDN connectivity establishment procedure for establishing the PDN connection, wherein the request type is not set to information indicating a handover, and
the PCO includes information indicating a request for use of NBIFOM.

2. The LE according to claim 1, wherein each of the first information and the second information indicates a UE-initiated NBIFOM mode or a Network-initiated NBIFOM mode.

3. The UE according to claim 2, wherein
in a case that the UE requests the UE-initiated NBIFOM mode, the UE-initiated NBIFOM mode is selected as the NBIFOM mode that the second information indicates, by a PDN Gateway (POW) or a Policy and Charging Rules Function (PCRF), and
in a case that the UE requests the Network-initiated NBIFOM mode, the Network-initiated NBIFOM mode is selected as the NBIFOM mode that the second information indicates, by the PGW or the PCRF.

4. The UE according to claim 2, wherein
in a case that the UE requests the UE-initiated NBIFOM mode, the NBIFOM mode that the second information indicates is selected by a PDN Gateway (POW) or a Policy and Charging Rules Function (PCRF), according to an operator's policy.

5. The UE according to claim 1, wherein
the PDN connectivity accept message further includes information indicating that the request for use of NBIFOM is accepted, and
based on the reception of the PDN connectivity accept message, the UE is configured to:
  recognize that NBIFOM is applied to the PDN connection, and
  recognize the second information as an NBIFOM mode for the PDN connection.

6. The UE according to claim 1, wherein the WLAN interface circuitry is configured to:
  transmit an authentication request message to an enhanced Packet Data Gateway (ePDG), in order to establish a Packet Data Network (PDN) connection; and
  receive an authentication response message from the ePDG,
the authentication request message includes the first information indicating a requested Network-based IP Flow Mobility (NBIFOM) mode, and
the authentication response message is a message to be received after the transmission of the authentication request message, and includes the second information indicating an NBIFOM mode.

7. The UE according to claim 6, wherein the authentication request message further includes information indicating a request for use of NBIFOM.

8. The LIE according to claim 6, wherein each of the first information and the second information indicates a UE-initiated NBIFOM mode or a Network-initiated NBIFOM mode.

9. The UE according to claim 8, wherein
in a case that the UE requests the UE-initiated NBIFOM mode, the UE-initiated NBIFOM mode is selected as the NBIFOM mode that the second information indicates, by the PDN Gateway (PGW) or the Policy and Charging Rules Function (PCRF), and
in a case that the UE requests the Network-initiated NBIFOM mode, the Network-initiated NBIFOM mode is selected as the NBIFOM mode that the second information indicates, by the PGW or the PCRF.

10. The UE according to claim 8, wherein
in a case that the UE requests the UE-initiated NBIFOM mode, the NBIFOM mode that the second information indicates is selected by a PDN Gateway (POW) or a Policy and Charging Rules Function (PCRF), according to an operator's policy.

11. The UE according to claim 6, wherein
the authentication response message further includes information indicating that the request for use of NBIFOM is accepted, and
based on the reception of the authentication response message, the LIE is configured to:
  recognize that NBIFOM is applied to the PDN connection, and
  recognize the second information as an NBIFOM mode for the PDN connection.

* * * * *